US012722268B2

(12) United States Patent
Lourenco et al.

(10) Patent No.: US 12,722,268 B2
(45) Date of Patent: Sep. 1, 2026

(54) POWER TOOL ACCESSORY SYSTEM WITH BRACE

(71) Applicant: BLACK & DECKER INC., New Britain, CT (US)

(72) Inventors: Marco Lourenco, Baltimore, MD (US); Darren B. Moss, York, PA (US); Aland Santamarina, Woodbine, MD (US); Samuel Willits, Towson, MD (US); Thomas R. Kaye, Jr., Fallston, MD (US)

(73) Assignee: Black & Decker Inc., New Britain, CT (US)

(*) Notice: Subject to any disclaimer, the term of this patent is extended or adjusted under 35 U.S.C. 154(b) by 763 days.

(21) Appl. No.: 17/658,276

(22) Filed: Apr. 7, 2022

(65) Prior Publication Data

US 2022/0331942 A1 Oct. 20, 2022

Related U.S. Application Data

(60) Provisional application No. 63/263,419, filed on Nov. 2, 2021, provisional application No. 63/217,874, filed (Continued)

(51) Int. Cl.
*B25F 3/00* (2006.01)
*B25F 5/02* (2006.01)

(Continued)

(52) U.S. Cl.
CPC .................. *B25F 3/00* (2013.01); *B25F 5/02* (2013.01); *B23D 29/005* (2013.01); *B23D 29/02* (2013.01); *B26B 15/00* (2013.01)

(58) Field of Classification Search
CPC . B25F 3/00; B25F 5/02; B23D 29/005; B23D 29/02; B26B 15/00

(Continued)

(56) References Cited

U.S. PATENT DOCUMENTS 2,760,265 A * 8/1956 Draenert .................. C14B 5/00 30/247
2,787,265 A * 4/1957 Neidt ................ B23D 57/0076 30/373

(Continued)

FOREIGN PATENT DOCUMENTS

AU 3195999 A * 10/1999 ............ H02K 7/145
CA 3211071 A1 * 9/2022 ............ A61B 17/92

(Continued)

OTHER PUBLICATIONS

Extended European Search Report, EP Application No. 22168026.7, Sep. 9, 2022, 8 pages, EPO.

(Continued)

*Primary Examiner* — Robert F Long
(74) *Attorney, Agent, or Firm* — Brake Hughes Bellermann LLP

(57) ABSTRACT

A power tool accessory system for a power tool includes a power tool accessory with a housing, an input shaft rotatably driven by a power tool, and a working tool driven to perform an operation upon rotation of the input shaft. The system also includes a brace configured to removably couple the housing to the power tool while the input shaft rotates. The brace includes a clamp assembly configured to be fixedly coupled to a base of the power tool handle, and an arm assembly with a first end portion configured to be coupled to the housing and a second end portion configured to be coupled to the clamp assembly. The second end portion is removable from the clamp assembly while the clamp assembly remains fixedly coupled to the power tool to enable removal of the power tool accessory from the power tool.

19 Claims, 74 Drawing Sheets

Related U.S. Application Data on Jul. 2, 2021, provisional application No. 63/175,938, filed on Apr. 16, 2021.

(51) Int. Cl.
*B23D 29/00* (2006.01)
*B23D 29/02* (2006.01)
*B26B 15/00* (2006.01)

(58) Field of Classification Search
USPC ..... 173/1–2, 13, 18–20, 184, 29–31, 38–39, 173/45–53; 81/464
See application file for complete search history.

(56) References Cited

U.S. PATENT DOCUMENTS 2,840,904 A * 7/1958 Hutchins ................ A01G 3/067 30/228
3,025,599 A * 3/1962 Sauers ................ B23D 29/005 215/354
3,767,095 A 10/1973 Jones
4,251,120 A * 2/1981 Wolff ........................ B25F 5/02 408/124
4,317,282 A * 3/1982 Pace ......................... B25F 3/00 30/500
4,344,606 A * 8/1982 Dillon ...................... B23K 7/08 266/66
4,403,892 A * 9/1983 Kane .................... B25H 1/0057 173/32
4,768,405 A * 9/1988 Nickipuck ............ B25B 15/001 81/177.85
4,833,782 A 5/1989 Smith
4,841,643 A * 6/1989 Colella ................ B23Q 1/0009 30/500
4,976,173 A * 12/1990 Yang ........................ B25F 3/00 81/177.8
4,991,472 A * 2/1991 Hollingsworth ........ B25B 21/02 81/464
5,033,552 A * 7/1991 Hu .......................... B25B 21/00 241/37.5
5,058,781 A * 10/1991 Aronie ................ B05C 17/0103 222/326
5,189,520 A 2/1993 Okayasu et al.
5,226,708 A 7/1993 Katahira et al.
5,371,947 A * 12/1994 Dickey ................ B23D 59/007 30/500
5,394,063 A 2/1995 Nakazawa
5,469,211 A 11/1995 Maruichi et al.
5,566,768 A * 10/1996 Bourke .............. B23D 57/0076 30/500
5,573,358 A * 11/1996 Gobbers ............... B23B 45/003 408/239 R
5,588,732 A 12/1996 Sasaki et al.
5,755,293 A * 5/1998 Bourke ............. B23D 57/0076 30/376
6,050,694 A 4/2000 Confrey
6,305,481 B1 * 10/2001 Yamazaki ................. F16D 7/08 192/56.62
6,315,425 B1 11/2001 Confrey
D454,040 S 3/2002 Wadsworth
6,364,580 B1 4/2002 Dils et al.
6,502,949 B1 1/2003 Horiyama et al.
6,525,511 B2 2/2003 Kubale et al.
6,575,590 B1 6/2003 Wadsworth
6,757,011 B1 6/2004 Takeda et al.
6,979,155 B2 12/2005 Dils et al.
7,052,216 B1 * 5/2006 Fields .................. B25H 1/0057 173/147
D525,116 S 7/2006 Shyu et al.
7,150,587 B2 12/2006 Dils et al.
7,185,998 B2 3/2007 Oomori et al.
7,293,362 B2 * 11/2007 Konen ................. B23D 29/002 30/388
7,357,526 B2 4/2008 Zeiler
7,934,847 B2 5/2011 Oomori et al.
8,237,404 B2 8/2012 Takano et al.
8,479,964 B2 7/2013 Furusawa et al.
8,517,558 B2 8/2013 Oomori et al.
8,919,787 B1 * 12/2014 Wilcher ................. B23D 49/11 279/143
D730,141 S 5/2015 Moss et al.
9,065,155 B2 6/2015 Takano et al.
9,616,557 B2 * 4/2017 Hays ................... B25B 23/0064
9,649,702 B2 * 5/2017 Batho .................. B23D 29/005
9,701,032 B2 7/2017 Moss et al.
10,131,048 B2 11/2018 Gerber et al.
D842,063 S 3/2019 Debellis
10,294,067 B1 5/2019 Debellis
10,343,210 B2 * 7/2019 Chiang .................. B21J 15/043
10,576,594 B2 * 3/2020 Hill ....................... B25B 21/002
10,675,741 B2 * 6/2020 Chiang ................... B26B 15/00
10,865,814 B2 12/2020 Kimura
10,987,795 B2 4/2021 Sergyeyenko et al.
12,011,820 B2 * 6/2024 Moss ...................... B25B 21/00
2002/0122707 A1 * 9/2002 Sakai .................... B25B 23/045 224/268
2002/0129949 A1 * 9/2002 Bongers-Ambrosius .................... B23Q 11/0046 173/217
2004/0074938 A1 * 4/2004 Sakai ..................... B25H 3/006 224/268
2005/0028391 A1 * 2/2005 Peterson ................ B23D 29/00 30/500
2005/0081364 A1 * 4/2005 Kopras ................... B25F 5/029 29/560
2006/0112566 A1 * 6/2006 Peterson ................ B23D 27/04 30/194
2007/0022595 A1 * 2/2007 Kopras ..................... B27C 5/10 29/560
2007/0237572 A1 * 10/2007 Thiessen ............ F16M 11/2014 403/96
2008/0032190 A1 * 2/2008 Furuta ................. H01M 50/244 429/163
2008/0190164 A1 8/2008 Boon et al.
2009/0108048 A1 * 4/2009 Zemlok ................... G16Z 99/00 227/176.1
2010/0031781 A1 * 2/2010 Ito ............................ B25F 5/02 173/217
2010/0032179 A1 * 2/2010 Hanspers .................. B25F 5/00 173/11
2010/0125991 A1 * 5/2010 Preti .................. B25B 27/0014 29/243.525
2010/0202842 A1 * 8/2010 Whitehead ................ B25F 3/00 408/139
2011/0174099 A1 * 7/2011 Ross ...................... A61B 17/00 74/89.32
2013/0051104 A1 2/2013 Nakano et al.
2013/0133908 A1 * 5/2013 Schenk ................. B23B 45/008 173/47
2013/0134009 A1 * 5/2013 Mueller ................ F16H 57/029 192/112
2013/0192860 A1 * 8/2013 Puzio ................. H01H 36/0073 335/219
2013/0213683 A1 * 8/2013 Brewster ................. B25F 5/026 173/198
2013/0277455 A1 * 10/2013 Thompson ............ B05B 9/0866 239/289
2014/0190715 A1 * 7/2014 Wong ...................... B24B 23/04 173/39
2014/0332243 A1 * 11/2014 Baskar ...................... B25F 5/02 173/29
2016/0001346 A1 * 1/2016 Holder ................. B21D 39/046 72/466.2
2016/0023289 A1 * 1/2016 Moss ........................ B25F 3/00 30/500
2016/0271781 A1 * 9/2016 Kobayashi .............. F16H 25/20
2016/0318165 A1 * 11/2016 Thorson ................ B25B 23/141
2016/0375510 A1 * 12/2016 Batho ..................... B26B 15/00 30/194
2017/0021488 A1 * 1/2017 Gerber ...................... B25F 3/00

(56) References Cited

U.S. PATENT DOCUMENTS

| | | | | |
|---|---|---|---|---|
| 2018/0281168 | A1* | 10/2018 | Sergyeyenko | B25F 5/027 |
| 2018/0345432 | A1* | 12/2018 | Hill | B23Q 5/045 |
| 2019/0030702 | A1 | 1/2019 | Gerber et al. | |
| 2019/0084138 | A1* | 3/2019 | Chiang | B25C 11/00 |
| 2019/0120275 | A1* | 4/2019 | Junkers | F16B 2/005 |
| 2020/0094332 | A1 | 3/2020 | Kumura | |
| 2020/0139459 | A1 | 5/2020 | Nagasaka et al. | |
| 2020/0306845 | A1 | 10/2020 | Kimura | |
| 2021/0031059 | A1* | 2/2021 | Dobashi | A62B 3/005 |
| 2021/0213598 | A1* | 7/2021 | Sergyeyenko | B25F 5/027 |
| 2021/0237253 | A1* | 8/2021 | Moss | B25B 21/00 |
| 2022/0111500 | A1* | 4/2022 | Hale | B25F 3/00 |
| 2022/0143858 | A1* | 5/2022 | Moss | B23D 15/04 |
| 2022/0193883 | A1* | 6/2022 | Öberg | B25F 5/02 |
| 2022/0314415 | A1* | 10/2022 | Allgaier | B25H 1/0078 |
| 2022/0331942 | A1 | 10/2022 | Lourenco et al. | |
| 2023/0128074 | A1* | 4/2023 | Zheng | B25F 5/001 173/217 |
| 2024/0066676 | A1* | 2/2024 | Lourenco | B25F 5/02 |
| 2025/0135561 | A1* | 5/2025 | Castanos | B23D 29/005 |
| 2025/0170742 | A1* | 5/2025 | Waechter | B25F 5/001 |

FOREIGN PATENT DOCUMENTS

| | | | | | |
|---|---|---|---|---|---|
| CA | 2934325 | C | * | 10/2023 | F16B 43/00 |
| CN | 2644063 | | | 9/2004 | |
| CN | 104802138 | | | 7/2015 | |
| CN | 104802139 | | | 1/2017 | |
| CN | 105264723 | B | | 1/2018 | |
| CN | 105142835 | B | | 6/2018 | |
| CN | 108145663 | A | | 6/2018 | |
| CN | 110247332 | A | | 9/2019 | |
| CN | 209647665 | | | 11/2019 | |
| CN | 110653852 | A | | 1/2020 | |
| CN | 107756333 | B | | 8/2020 | |
| CN | 114192840 | A | * | 3/2022 | B25F 5/00 |
| DE | 899746 | C | * | 9/1954 | |
| DE | 2719574 | A1 | | 11/1978 | |
| DE | 29820433 | | | 1/1999 | |
| DE | 29820433 | U1 | * | 1/1999 | A01B 1/065 |
| DE | 112012001523 | T5 | | 1/2014 | |
| DE | 202013011818 | | | 7/2014 | |
| DE | 102017201560 | A1 | | 8/2018 | |
| DE | 102017201563 | A1 | | 8/2018 | |
| DE | 102017201565 | A1 | | 8/2018 | |
| DE | 102019132282 | | | 5/2020 | |
| DE | 202020105616 | U1 | | 11/2020 | |
| EP | 0131851 | A1 | | 1/1985 | |
| EP | 0899063 | A2 | | 3/1999 | |
| EP | 1084798 | A2 | | 3/2001 | |
| EP | 1637291 | A1 | | 3/2006 | |
| EP | 1934023 | A1 | | 6/2008 | |
| EP | 2114641 | A1 | | 11/2009 | |
| EP | 2366491 | B1 | | 9/2012 | |
| EP | 2586569 | A2 | * | 5/2013 | B25F 3/00 |
| EP | 2995386 | | | 3/2016 | |
| EP | 2977155 | B1 | | 1/2018 | |
| EP | 2586569 | | | 12/2018 | |
| EP | 3576905 | A1 | | 12/2019 | |
| EP | 2995386 | B1 | * | 8/2020 | B05C 17/0103 |
| EP | 3768469 | A1 | | 1/2021 | |
| EP | 3603893 | B1 | | 5/2021 | |
| EP | 4074461 | A1 | | 10/2022 | |
| EP | 4119300 | | | 1/2023 | |
| FR | 2502550 | A1 | * | 10/1982 | B44C 7/027 |
| JP | 3801596 | | | 7/2006 | |
| JP | 2009015099 | | | 1/2009 | |
| JP | 5084568 | | | 11/2012 | |
| JP | 2015215442 | | | 12/2015 | |
| JP | 2015226941 | | | 12/2015 | |
| JP | 2016109893 | | | 6/2016 | |
| JP | 3207747 | | | 12/2016 | |
| JP | 2017009822 | | | 1/2017 | |
| JP | 2018005205 | | | 1/2018 | |
| JP | 7195170 | | | 12/2022 | |
| WO | 2013070937 | A2 | | 5/2013 | |
| WO | WO-2018114592 | A1 | * | 6/2018 | B25F 3/00 |
| WO | 2020137158 | A1 | | 7/2020 | |
| WO | 2020142634 | A1 | | 7/2020 | |
| WO | WO-2023003900 | A1 | * | 1/2023 | B25H 3/021 |

OTHER PUBLICATIONS

Extended European Search Report, EP Application No. 24210433.9, Mar. 28, 2025, 7 pages, EPO.

* cited by examiner 186a
184a
170a
18a
182a
12
180
182b
18
18b
170b
186b
184b
140

1310
1312
1314
1318
1376
1374
1370
1340
1372
1337
1322
1309
1334
1330
1335
1300
1302
1301
CG
1313
1490
1432
DEWALT
DEWALT 1432
1495
1481
1470
1480
1482
1472
1481
1497
1476
1474
1478
B
1492
1494
1493
1484
1490

1432
1495
1493
1486
1494
1481
1470
1480
1482
1484
1490
1472
1481
1497
1476
1474
1478
B
1492

POWER TOOL ACCESSORY SYSTEM WITH BRACE

RELATED APPLICATION

This application claims priority, under 35 U.S.C. § 119(e) to U.S. Provisional Patent Application No. 63/175,938, filed Apr. 16, 2021, titled "Power Tool Accessory System with Brace," U.S. Provisional Patent Application No. 63/217,874, filed Jul. 2, 2021, titled "Power Tool Accessory System with Brace," and U.S. Provisional Patent Application No. 63/263,419, filed Nov. 2, 2021, titled "Power Tool Accessory System with Brace," each of which is incorporated by reference.

TECHNICAL FIELD

This application relates to a power tool accessory system with a plurality of accessories and a brace that removably and rigidly couples the accessories to a power tool housing.

BACKGROUND

Commonly owned U.S. Pat. No. 9,701,032, which is incorporated by reference discloses a power tool accessory (e.g., a shear accessory) that includes an accessory housing, an input shaft, a working tool, and a brace. The input shaft is driven by a power tool and drives the working tool. The brace rigidly connects the accessory housing to a power tool housing. The brace includes a collar coupled to the accessory housing, a clamp assembly that may be rigidly connected to the power tool housing, and an arm assembly connecting the collar to the clamp assembly. The collar allows selective rotation of the accessory housing relative to the collar while the brace rigidly couples the accessory housing to the power tool housing.

SUMMARY

In an aspect, a power tool accessory system is disclosed for use with a power tool having a tool housing and an end effector that is rotatable relative to the tool housing. The power tool accessory system includes a power tool accessory including an accessory housing, an input shaft at least partially received in the accessory housing and configured to be coupled to and rotatably driven by the end effector, and a working tool coupled to the accessory housing and configured to be driven to perform an operation upon rotation of the input shaft. The system further includes a brace configured to removably and rigidly couple the accessory housing to the tool housing while the input shaft rotates relative to the accessory housing, the brace including a clamp assembly configured to be rigidly coupled to the power tool housing, and an arm assembly having a first end portion configured to be coupled to accessory housing and a second end portion configured to be coupled to the clamp assembly. The second end portion of the arm assembly is configured to be removable from the clamp assembly while the clamp assembly remains rigidly coupled to the tool housing to enable removal of the power tool accessory from the end effector.

In another aspect, a brace is configured to removable and rigidly couple a housing of a power tool accessory to a tool housing of a power tool, the power tool accessory having a rotatable input shaft configured to be coupled to a rotatable end effector of the power tool. The brace includes a clamp assembly configured to be rigidly coupled to the power tool housing, and an arm assembly having a first end portion configured to be coupled to accessory housing and a second end portion configured to be coupled to the clamp assembly. The second end portion of the arm assembly is configured to be removable from the clamp assembly while the clamp assembly remains rigidly coupled to the tool housing to enable removal of the power tool accessory from the end effector.

In another aspect, a power tool accessory system is disclosed for use with a power tool having a tool housing and an end effector that is rotatable relative to the tool housing. The power tool accessory system includes a power tool accessory including an accessory housing, an input shaft at least partially received in the accessory housing and configured to be coupled to and rotatably driven by the end effector, and a working tool coupled to the accessory housing and configured to be driven to perform an operation upon rotation of the input shaft. The system further includes a brace configured to removably and rigidly couple the accessory housing to the tool housing while the input shaft rotates relative to the accessory housing, the brace including a clamp assembly configured to be rigidly coupled to a base of a handle of the power tool housing, and an arm assembly having a first end portion configured to be coupled to accessory housing and a second end portion configured to be coupled to the clamp assembly. The clamp assembly comprises a first leg configured to face toward a first lateral side of the base, a second leg configured to face toward an opposite second lateral side of the base, a fastener configured to couple the first leg to the second leg, and a first pin carried by the first leg and facing inward toward and configured to engage the first lateral side of the base, the first pin adjustably positionable along a length of the first leg. In other implementations, the clamp assembly may further include a second pin carried by the second leg and facing inward toward and configured to engage the second lateral side of the base, the second pin adjustably positionable along a length of the second leg.

In another aspect, a brace is configured to removable and rigidly couple a housing of a power tool accessory to a tool housing of a power tool, the power tool accessory having a rotatable input shaft configured to be coupled to a rotatable end effector of the power tool. The brace includes a clamp assembly configured to be rigidly coupled to a base of a handle of the power tool housing, the clamp assembly including a first leg configured to face toward a first lateral side of the base, a second leg configured to face toward an opposite second lateral side of the base, a fastener configured to couple the first leg to the second leg, and a first pin carried by the first leg and facing inward toward and configured to engage the first lateral side of the base, the first pin adjustably positionable along a length of the first leg, and an arm assembly having a first end portion configured to be coupled to accessory housing and a second end portion configured to be coupled to the clamp assembly.

In another aspect, a power tool accessory system is disclosed for use with a power tool having a tool housing and an end effector that is rotatable relative to the tool housing. The power tool accessory system includes a power tool accessory including an accessory housing, an input shaft at least partially received in the accessory housing and configured to receive an input of rotational motion from the end effector, and a working tool coupled to the accessory housing and configured to be driven to perform an operation upon rotation of the input shaft. The system further includes a brace configured to removably and rigidly couple the accessory housing to the tool housing while the input shaft is directly coupled to the end effector for rotation relative to the accessory housing, the brace including a clamp assembly configured to be rigidly coupled to the power tool housing, and an arm assembly having a first end portion configured to be coupled to accessory housing and a second end portion configured to be coupled to the clamp assembly. The system further includes a flexible shaft assembly having a first end portion configured to be coupled to the end effector and a second end portion configured to be coupled to the input shaft of the power tool accessory when the brace is removed from the tool housing, the flexible shaft assembly including a flexible shaft configured to transmit rotation from the end effector to the input shaft.

In another aspect, a power tool accessory system is disclosed for use with a power tool includes a tool housing and an end effector that is rotatable relative to the tool housing. The power tool accessory system includes a power tool accessory including an accessory housing, an input shaft at least partially received in the accessory housing and configured to be coupled to and rotatably driven by the end effector, and a working tool coupled to the accessory housing and configured to be driven to perform an operation upon rotation of the input shaft. The system further includes a brace configured to removably and rigidly couple the accessory housing to the tool housing while the input shaft rotates relative to the accessory housing, the brace including a first end portion configured to be coupled to the accessory housing and a second end portion carrying a connector configured to be removably and rigidly coupled to the power tool housing, wherein the connector on the second end portion of the arm assembly is configured to be removable from the clamp assembly from the power tool housing so that the arm assembly is moveable relative to the power tool housing while the input shaft of the power tool accessory remains received in the end effector.

Implementations of one or more of the above aspects may include one or more of the following features. The arm assembly may be configured to be removable from the clamp assembly, without the use of a secondary tool, while the clamp assembly remains rigidly coupled to the tool housing. The power tool accessory may comprise a plurality of interchangeable power tool accessories, each power tool accessory including an accessory housing, an input shaft at least partially received in the accessory housing and configured to be coupled to and rotatably driven by the end effector, and a working tool coupled to the accessory housing and configured to be driven to perform an operation upon rotation of the input shaft, and wherein the first end portion of the arm assembly is configured to be removably and interchangeably coupled to each of the plurality of power tool accessories.

The brace may further comprise a collar configured to couple the arm assembly to the accessory housing. The collar may be configured to allow selective rotation of the accessory housing relative to the collar while the input shaft is coupled to the end effector and the arm assembly rigidly couples the collar to the clamp assembly. The collar may include a locking element having a locked configuration in which the accessory housing is rigidly fixed to the collar and an unlocked configuration in which the accessory housing is rotatable relative to the collar. The locking element may include a rotatable knob with a head that is configured to releasably engage the accessory housing. The collar may include a frictional engaging member configured to retain the accessory housing in a desired rotational position relative to the collar and to allow the accessory housing to be rotated relative to the collar upon application of a sufficient rotational torque to the accessory housing. The frictional engaging member may comprise an elastomeric ring disposed between the collar and the accessory housing. The first end portion may be pivotable relative to the collar. The second end portion may be pivotably relative to the clamp assembly. The arm assembly may include a first arm portion pivotally couplable to the accessory housing and a second arm portion pivotally couplable to the clamp assembly, wherein one of the first arm portion and the second arm portion is telescopically adjustable relative to the other of the first arm portion and the second arm portion to adjust a length of the arm assembly.

The clamp assembly may be configured to be rigidly coupled to a base of a handle of the power tool, such that the arm assembly is at an angle to the input shaft when the arm is coupled to the accessory housing and to the clamp assembly. The clamp assembly may include a first leg configured to face toward a first lateral side of the base, a second leg configured to face toward an opposite second lateral side of the base, and a threaded member configured to couple the first leg to the second leg such that rotation of the threaded member is configured to draw the legs toward one another to clamp the clamp assembly to the base. Each of the first leg and the second leg may be configured to extend along the base from a forward point axially forward of the handle on a same side of the handle as the end effector to a rearward point axially rearward of the handle on an opposite side of the handle from the end effector. The threaded member may be coupled the first leg and the second leg at the rearward point. The threaded member may be coupled to the first leg and the second leg at the forward point. The threaded member may be coupled to the first leg and the second leg at one of the forward point and the rearward point and further comprising a supplemental connector coupled to the first leg and the second leg at the other of the forward point and the rearward point. The supplemental connector may comprise a wire, a cord, a chain, or a supplemental threaded rod.

The threaded member may include an internally threaded cylinder coupled to one of the first leg and the second leg and an externally threaded rod threadably received in the threaded cylinder. The first leg may carry a first pin facing inward toward and be configured to engage the first lateral side of the base and a second pin facing inward toward and configured to engage the second lateral side of the base. At least one of the first pin and the second pin may be adjustably positionable along a length of at least one of the first leg and the second leg. The clamp assembly may include a single leg configured to be coupled to one lateral side of the base. The clamp assembly may further include a threaded fastener configured to be received through an opening in the single leg and in a threaded hole in a lateral side of the base.

The second end portion of the arm assembly may be removably coupled to the clamp assembly by a quick release connector to enable removal of the arm assembly from the clamp assembly without use of a secondary tool. The quick release connector may comprise a U-shaped opening open at one end thereof and defined in one of the arm assembly and the clamp assembly, and a fastener coupled to one of the arm assembly and the clamp assembly, the fastener movable between a first position in which the arm assembly is not removable from the clamp assembly and a second position in which the arm assembly is removable from the clamp assembly. The fastener may comprise a threaded shaft coupled to one of the arm assembly and the clamp assembly and received in U-shaped opening. The U-shaped opening may include a narrow slot portion having a first width at the open end of the U-shaped opening and an enlarged portion in communication with the narrow slot portion and having a second width that is greater than the first width. The fastener may include a shaft receivable in the U-shaped opening, the shaft having a first dimension with a first width that is less than the first width of the narrow slot portion to enable the shaft to be removed through the narrow slot portion when the fastener is in the second position, and a second dimension with a second width that is greater than the first width of the narrow slot portion to prevent removal of the shaft through the narrow slot portion when the fastener is in the first position. The fastener may comprise a projection configured to block the open of the U-shaped opening when in the first position and to unblock the open end of the U-shaped opening when in the second position. The projection may be spring biased toward the first position. An actuator may be coupled to the projection.

Advantages may include one or more of the following. The braces disclosed in this application each may include an arm assembly that can be removable from a clamping assembly, without the use of a secondary tool, while the clamping assembly remains rigidly coupled to the tool housing. This enables the arm assembly and accessory to be quickly and efficiently removed from the tool housing without the use of a secondary tool, while the clamping assembly remains coupled to the tool housing, when it is desired to use the power tool without the power tool accessory. This also allows the arm assembly and power tool accessory to be quickly and efficiently reattached to the clamping assembly, without the use of a secondary tool, when it is desired to use the power tool accessory. This avoids the user having to decouple and recouple the entire clamping assembly, which can be more time consuming and lead to less efficient operation of the power tool accessory system. These and other advantages and features will be apparent from the description, the drawings, and the claims.

In another aspect, a power tool accessory system is disclosed for use with a power tool having a tool housing, an end effector that is rotatable relative to the tool housing, and a handle extending transverse from the tool housing. The power tool accessory system includes a power tool accessory including an accessory housing, an input shaft at least partially received in the accessory housing and configured to be coupled to and rotatably driven by the end effector, and a working tool coupled to the accessory housing and configured to be driven to perform an operation upon rotation of the input shaft. A brace is configured to removably couple the accessory housing to the power tool while the input shaft rotates relative to the accessory housing. The brace includes a clamp assembly configured to be fixedly coupled to a base of the handle, and an arm assembly having a first end portion configured to be coupled to the accessory housing and a second end portion configured to be coupled to the clamp assembly. The second end portion of the arm assembly is configured to be removable from the clamp assembly while the clamp assembly remains fixedly coupled to the tool housing to enable removal of the power tool accessory from the end effector.

Implementations of this aspect may include one or more of the following features.

The arm assembly may be configured to be removable from the clamp assembly, without the use of a secondary tool, while the clamp assembly remains fixedly coupled to the tool housing. The power tool accessory may include a plurality of interchangeable power tool accessories, each power tool accessory including an accessory housing, an input shaft at least partially received in the accessory housing and configured to be coupled to and rotatably driven by the end effector, and a working tool coupled to the accessory housing and configured to be driven to perform an operation upon rotation of the input shaft, and wherein the first end portion of the arm assembly is configured to be removably and interchangeably coupled to each of the plurality of power tool accessories.

The brace may further include a collar configured to couple the arm assembly to the accessory housing with the first end portion of the arm assembly pivotable relative to the collar. The collar may be configured to allow selective rotation of the accessory housing relative to the collar while the input shaft is coupled to the end effector and the arm assembly couples the collar to the clamp assembly. The collar may include a locking element having a locked configuration in which the accessory housing is non-rotatably fixed relative to the collar and an unlocked configuration in which the accessory housing is rotatable relative to the collar. An indexing assembly may be disposed between the collar and the arm assembly and configured to facilitate angular adjustment of the collar relative to the arm assembly. The indexing assembly may include a first wear plate with first ridges coupled to the collar and a second wear plate with a second plurality of radial ridges configured to engage the first plurality of radial ridges.

At least one of the first end portion of the arm assembly may be pivotable relative to the accessory housing or the second end portion of the arm assembly may be pivotable relative to the clamp assembly. The arm assembly may include a first arm portion couplable to the accessory housing and a second arm portion couplable to the clamp assembly with one of the first arm portion and the second arm portion being telescopically adjustable relative to the other of the first arm portion and the second arm portion to adjust a length of the arm assembly.

The clamp assembly may include a first leg configured to face toward a first lateral side of the base, a second leg configured to face toward an opposite second lateral side of the base, and a threaded member configured to couple the first leg to the second leg such that rotation of the threaded member is configured to draw the legs toward one another to clamp the clamp assembly to the base. Each of the first leg and the second leg may be configured to extend along the base from a forward point axially forward of the handle on a same side of the handle as the end effector to a rearward point axially rearward of the handle on an opposite side of the handle from the end effector. The clamp assembly may include a single leg configured to be coupled to one lateral side of the base by a fastener. The second end portion of the arm assembly may include a U-shaped opening configured to facilitate removal of the arm assembly from the clamp assembly while the claim assembly remains fixedly coupled to the base. A tool-free connector may removably couple the arm assembly to the clamp assembly.

In another aspect, a brace is configured to removably and rigidly couple an accessory housing of a power tool accessory to a tool housing of a power tool, the power tool accessory having a rotatable input shaft configured to be coupled to a rotatable end effector of the power tool. The brace includes a clamp assembly configured to be fixedly coupled to a base of a handle of the power tool housing, and an arm assembly having a first end portion configured to be coupled to the accessory housing and a second end portion configured to be removably coupled to the clamp assembly, such that the arm assembly is at an angle to the input shaft when the arm is coupled to the accessory housing and to the clamp assembly. The second end portion of the arm assembly is configured to be removable from the clamp assembly while the clamp assembly remains fixedly coupled to the tool housing to enable removal of the power tool accessory from the end effector.

Implementations of this aspect may include one or more of the following features. The arm assembly may be configured to be removable from the clamp assembly, without the use of a secondary tool, while the clamp assembly remains fixedly coupled to the tool housing. The brace may further include a collar configured to couple the arm assembly to the accessory housing with the first end portion of the arm assembly pivotable relative to the collar. The collar may be configured to allow selective rotation of the accessory housing relative to the collar while the input shaft may be coupled to the end effector and the arm assembly may couple the collar to the clamp assembly. The arm assembly may include a first arm portion couplable to the accessory housing and a second arm portion couplable to the clamp assembly with one of the first arm portion and the second arm portion being telescopically adjustable relative to the other of the first arm portion and the second arm portion to adjust a length of the arm assembly.

In another aspect, a power tool accessory system is disclosed for use with a power tool having a tool housing, an end effector that is rotatable relative to the tool housing, and a handle extending transverse from the tool housing. The power tool accessory system includes a plurality of power tool accessories, each including an accessory housing, an input shaft at least partially received in the accessory housing and configured to be coupled to and rotatably driven by the end effector, and a working tool coupled to the accessory housing and configured to be driven to perform an operation upon rotation of the input shaft. A brace is configured to removably and interchangeably couple the accessory housing of each power tool accessory to the power tool while the input shaft rotates relative to the accessory housing. The brace includes a clamp assembly configured to be fixedly coupled to a base of the handle, a collar configured to be coupled to the accessory housing to allow selective rotation of the accessory housing relative to the collar while the input shaft is coupled to the end effector, and an arm assembly having a first end portion pivotably coupled to the collar and a second end portion configured to be removably and pivotably coupled to the clamp assembly. The arm assembly is at an angle to the input shaft when the arm is coupled to the accessory housing and to the clamp assembly and is telescopically adjustable to adjust a length of the arm assembly. The brace is configured to rigidly couple the accessory housing of each accessory to the tool housing to inhibit movement of each accessory housing relative to the tool housing while the input shaft is being rotated by the end effector.

DETAILED DESCRIPTION

Figure 1A:
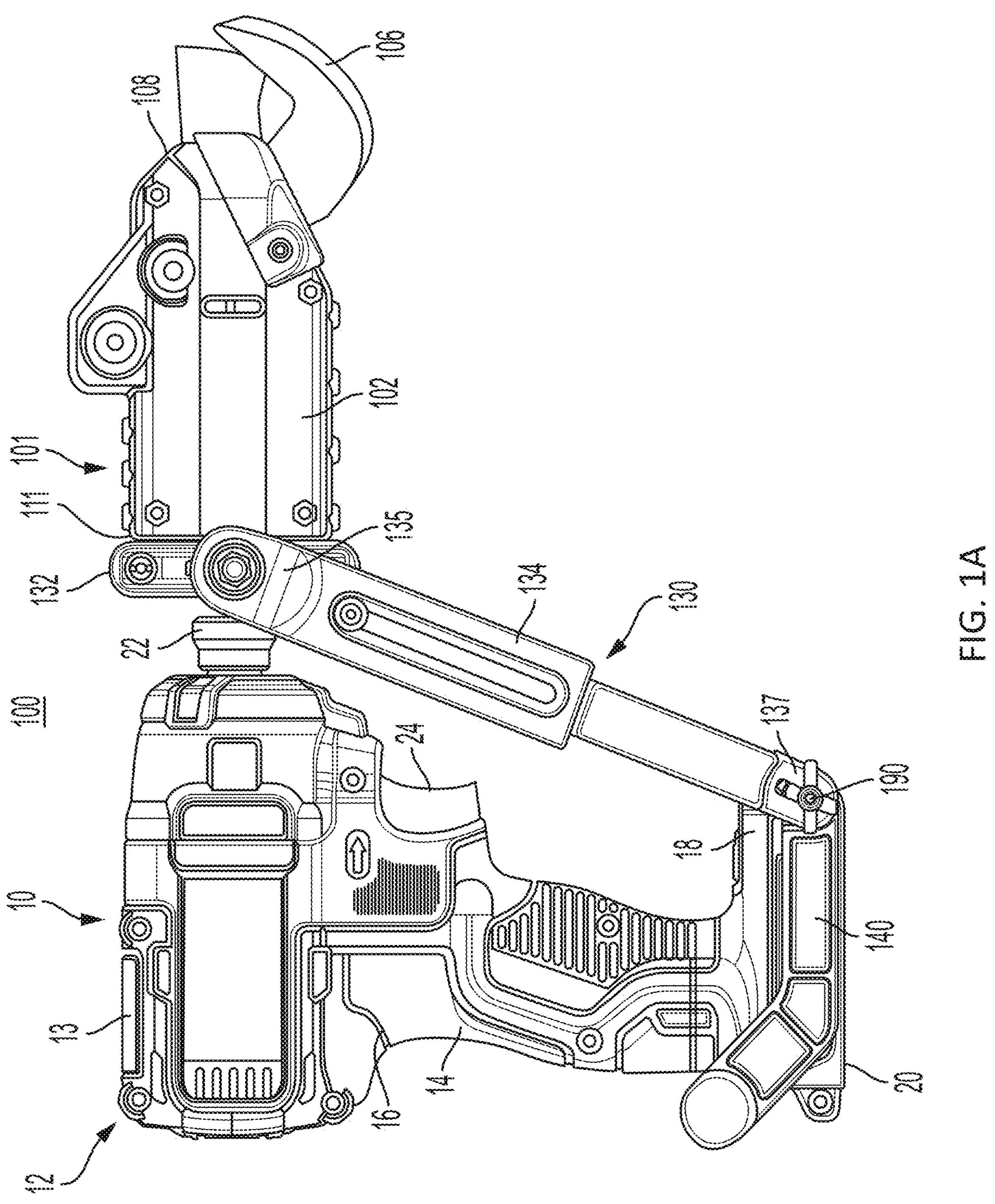
FIG. 1A is a side view of an embodiment of a power tool accessory system.
Figure 1B:
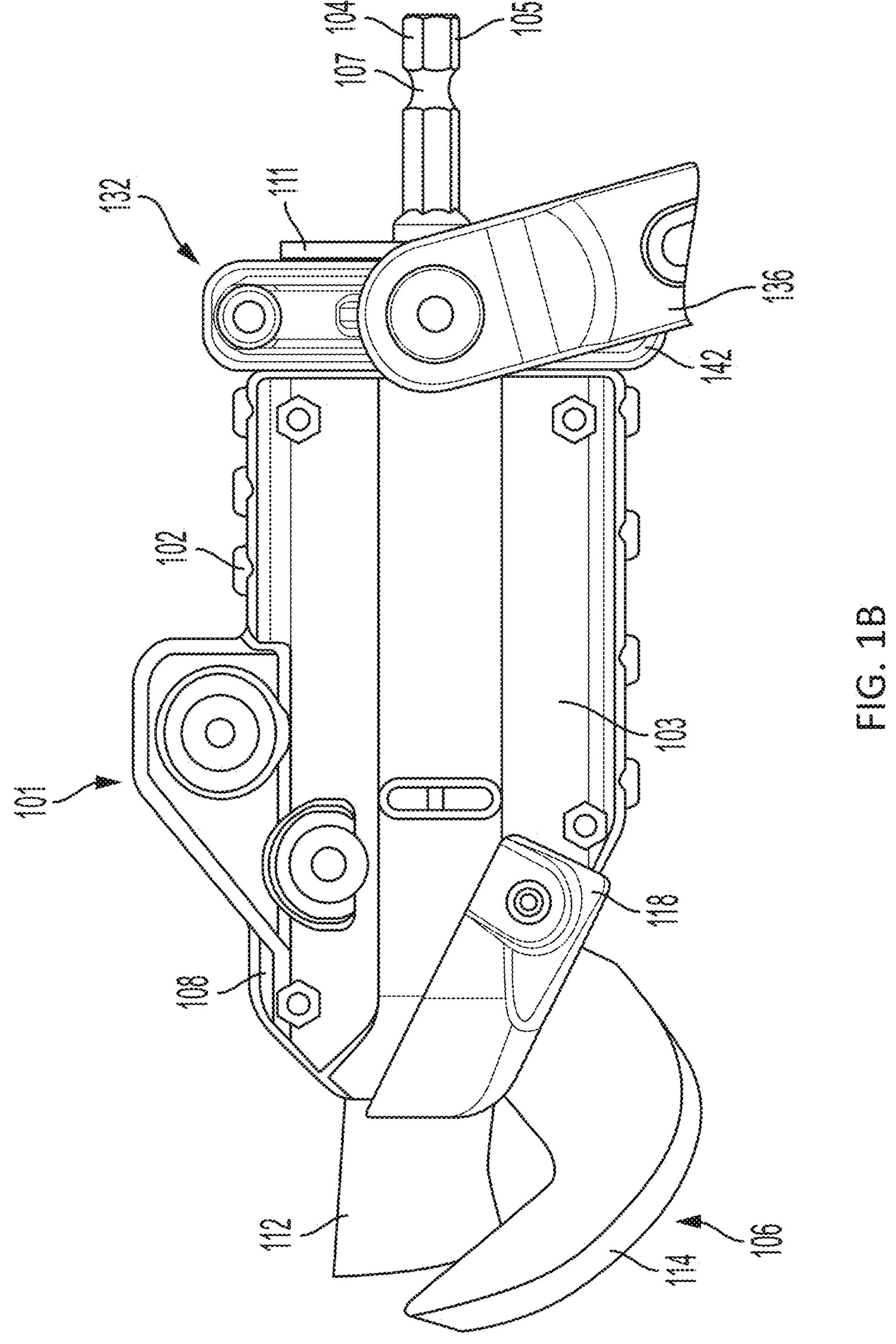
FIG. 1B is a side view of an exemplary power tool accessory of the power tool accessory system of FIG. 1A.
Figure 2:
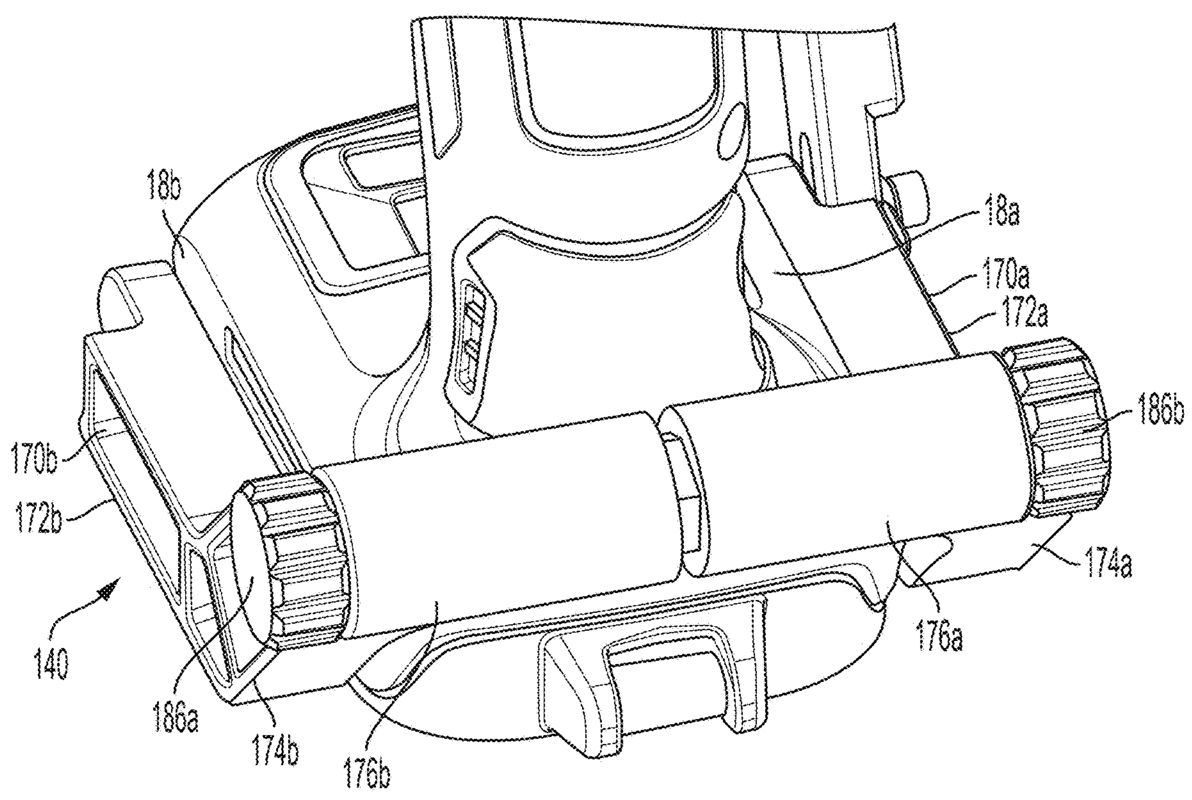
FIG. 2 is a perspective view of an embodiment of a clamping assembly of the power tool accessory system of FIG. 1A.
Figure 3:
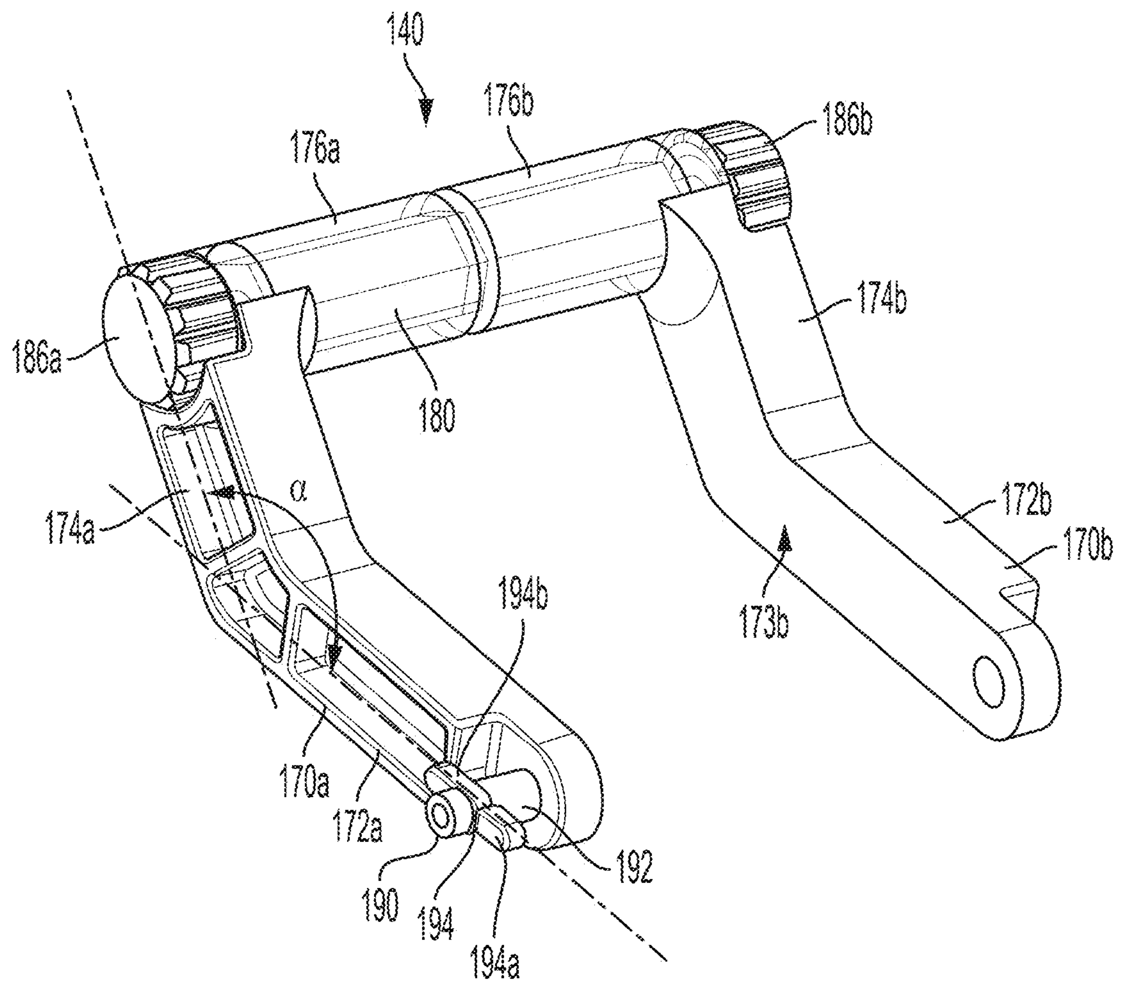
FIG. 3 is another perspective view of the clamping assembly of FIG. 2.
Figure 4:
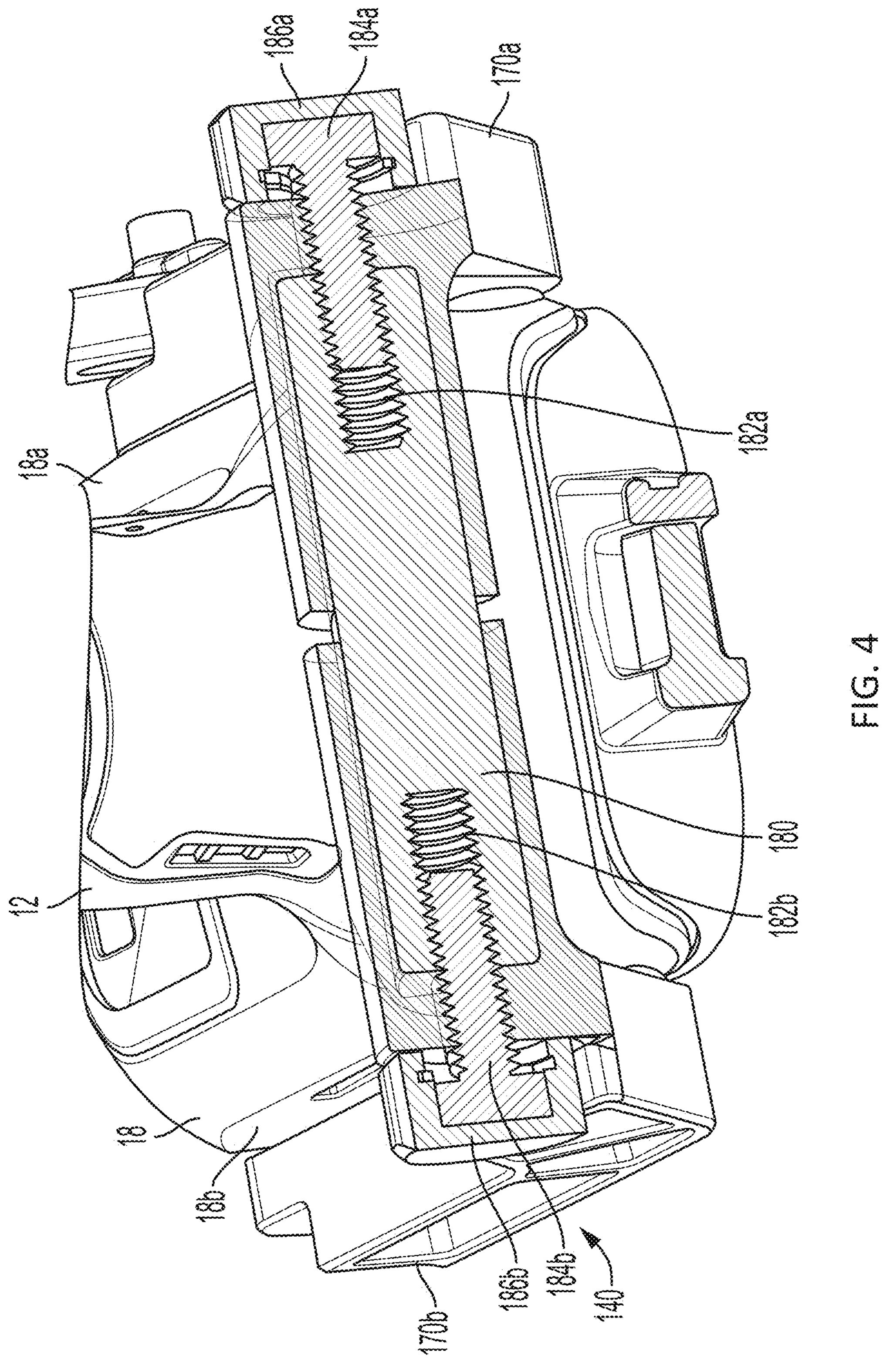
FIG. 4 is a perspective view, partially in section, of the clamping assembly of FIG. 2.

Referring to FIGS. 1A and 1B, a first embodiment of a power tool accessory system 100 includes a first power tool accessory 101 and a brace 130 that are removably coupled to a power tool 10. The power tool 10 includes a power tool housing 12 having a motor and transmission housing 13 that contains a motor and a transmission (not shown) and a handle 14. The handle 14 has a top end 16 coupled to the motor and transmission housing 13 and a base 18 away from the motor and transmission housing 13. The base 18 may include a battery receptacle 20 configured to receive a removable battery pack. An end effector 22 (e.g., a tool bit holder) extends from the motor and transmission housing 13 and may be partially received in the motor and transmission housing 13. The end effector 22 is coupled to the transmission so that the motor imparts rotary motion to the end effector 22. A trigger switch 24 is coupled to the housing 12 and is actuatable by a user to control power delivery from a power source, such as a battery pack, to the motor.

DETAILED DESCRIPTION

Referring to FIGS. 1A and 1B, a first embodiment of a power tool accessory system 100 includes a first power tool accessory 101 and a brace 130 that are removably coupled to a power tool 10. The power tool 10 includes a power tool housing 12 having a motor and transmission housing 13 that contains a motor and a transmission (not shown) and a handle 14. The handle 14 has a top end 16 coupled to the motor and transmission housing 13 and a base 18 away from the motor and transmission housing 13. The base 18 may include a battery receptacle 20 configured to receive a removable battery pack. An end effector 22 (e.g., a tool bit holder) extends from the motor and transmission housing 13 and may be partially received in the motor and transmission housing 13. The end effector 22 is coupled to the transmission so that the motor imparts rotary motion to the end effector 22. A trigger switch 24 is coupled to the housing 12 and is actuatable by a user to control power delivery from a power source, such as a battery pack, to the motor.

The power tool accessory 101 includes an accessory housing 102 and an input shaft 104 at least partially received in a rear end 111 of the accessory housing 102. The input shaft 104 is receivable in the end effector 22 so that the input shaft 104 is rotationally driven by rotational movement of the end effector 22. In an embodiment, the input shaft 104 includes a hex shaped shank 105 with an annular groove 107 for being received in the end effector 22 in the form of a quick release bit holder or a chuck. The power tool accessory

100 also includes a working tool 106 that extends at least partially outward from a front end 108 of the accessory housing 102. In one embodiment, the working tool 102 comprises shear blades including a first stationary shear 112 that is rigidly mounted to the accessory housing 102, and a second moveable shear 114 that is pivotally mounted in the accessory housing 102. The moveable shear 114 can pivot relative to the stationary shear 112 to effect a scissor-like cutting action. The shear cutting accessory 101 may have a construction substantially similar to the power tool accessory disclosed in the aforementioned U.S. Pat. No. 9,701,032.

The brace 130 is configured to adjustably, removably, and rigidly couple the accessory housing 102 to the power tool housing 12 while the input shaft rotates relative to the accessory housing. The brace 130 includes a collar 132 coupled to a rear end 111 of the accessory housing 102, a clamping assembly 140 configured to be removably and rigidly attached to the base 18 of the handle 14 of the power tool housing 12, and an arm assembly 134 having a first end portion 135 pivotally coupled to the collar 132 and an opposite second end portion 137 coupled to the clamping assembly 140. As described further below, the second end portion 137 of the arm assembly 134 is configured to be removable from the clamp assembly 140, without the use of a secondary tool, while the clamp assembly 140 remains rigidly coupled to the tool housing 12 to enable removal of the power tool accessory 101 from the end effector.

Figure 6:
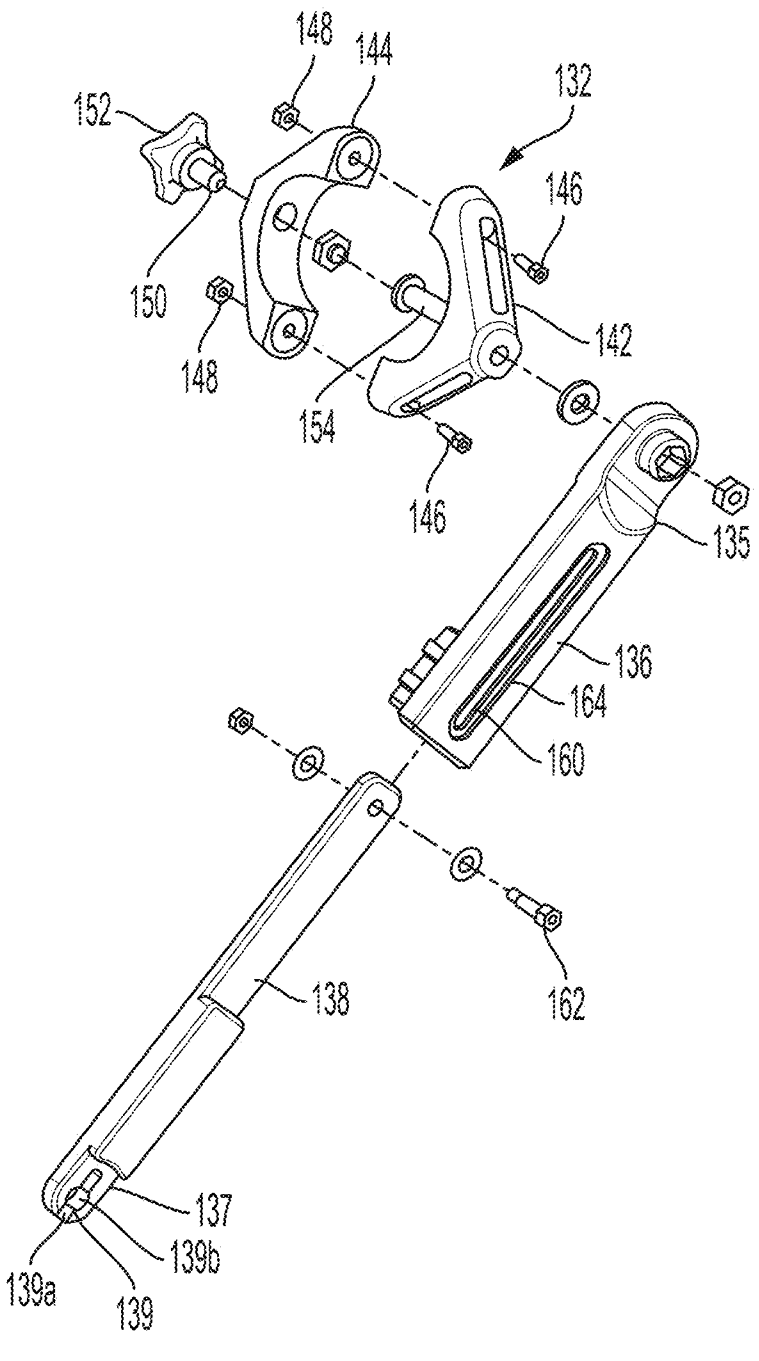
FIG. 6 is an exploded view of an embodiment of an arm assembly and collar of the power tool accessory system of FIG. 1A.
Figure 7:
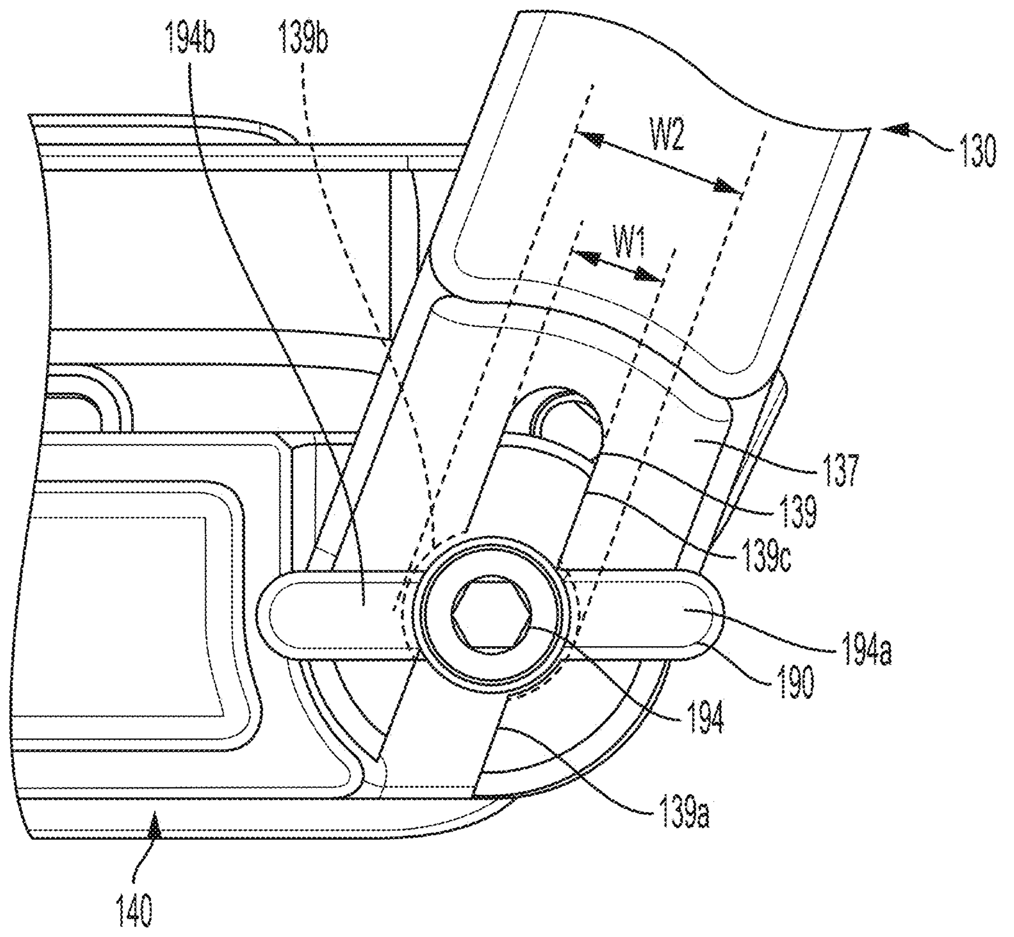
FIG. 7 is a close-up side view of a portion of the clamping assembly of FIG. 2 and the arm assembly of FIG. 6.

Referring also to FIG. 6, the collar 132 includes a first concave ear 142 and a second concave ear 144 that are connected to one another by screws 146 and nuts 148. The first concave ear 142 and the second concave ear 144 are positioned on left and right sides of the accessory housing 102, respectively. The ears 142, 144 loosely surround the accessory housing 102 so that the accessory housing 102 can rotate relative to the collar 132. A knob 152 with a threaded stem 150 is coupled to the second concave ear 144 with the threaded bolt extending radially inward through an aperture in the second concave ear 144. The knob 152 and the threaded stem 150 can be rotated between a locked position and an unlocked position. In the locked position, the threaded stem 150 engages the accessory housing 102 to prevent rotation of the accessory housing 102 relative to the collar 132. In the unlocked position, the threaded stem 150 does not engage the accessory housing 102 to allow rotation of the accessory housing 102 relative to the collar 132. This enables the accessory housing 102 to be rotated and locked in a plurality of different rotational positions relative to the collar 132 and the power tool 10 while the brace 130 rigidly attaches the accessory 100 to the power tool housing 12. Thus, the accessory 100 can be used to make cuts in a plurality of different directions without changing the orientation of the power tool 10.

In other embodiments, the rear end 111 of the accessory housing 102 may include a plurality of recesses that receive the threaded stem 150 to provide indexed rotational adjustment of the accessory housing 102 relative to the collar 132. The threaded stem 150 may alternatively or additionally be replaced with a spring biased pin, ball, or detent that engages recesses in the accessory housing 102 to provide a quick-release indexed rotational adjustment of the angular position of the accessory housing 102 relative to the collar 132. Other embodiments that enable indexed rotational adjustment of the accessory housing 102 relative to the collar 132 can be found, for example, in FIGS. 9A-16 and 35 of U.S. patent application Ser. No. 14/186,088, filed Feb. 21, 2014, which is incorporated by reference in its entirety.

The arm assembly 134 includes a first arm portion 136 and a second arm portion 138. The first arm portion 136 includes the first end portion 135 and is pivotably attached to the collar 132 by a pivot pin 154 that extends radially outward from the first ear 142. The second arm portion 138 is telescopically received in a longitudinal opening 160 in the first arm portion 136. A positioning pin 162 is received in an aperture 164 in the second arm portion 138 and slides in a longitudinal slot 166 in the first arm portion 136. The telescopic connection between the first arm portion 136 and the second arm portion 138 allows the length of the arm assembly 134 to be adjustable by a user. In other embodiments, the longitudinal slot may be configured with bulging recesses and the positioning pin may be spring biased to allow for indexed movement of the second arm portion 138 relative to the first arm portion 136. Examples of such an indexed coupling mechanism can be found, e.g., in FIGS. 42-43 of the aforementioned U.S. patent application Ser. No. 14/186,088, filed Feb. 21, 2014, which is incorporated by reference in its entirety.

Figure 5A:
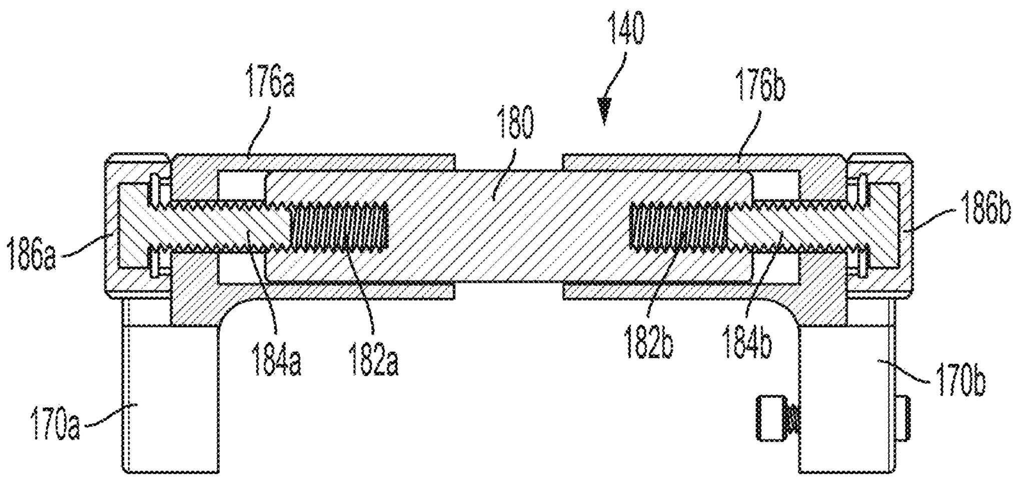
FIGS. 5A and 5B are cross-sectional views of the clamping assembly of FIG. 2.
Figure 5B:
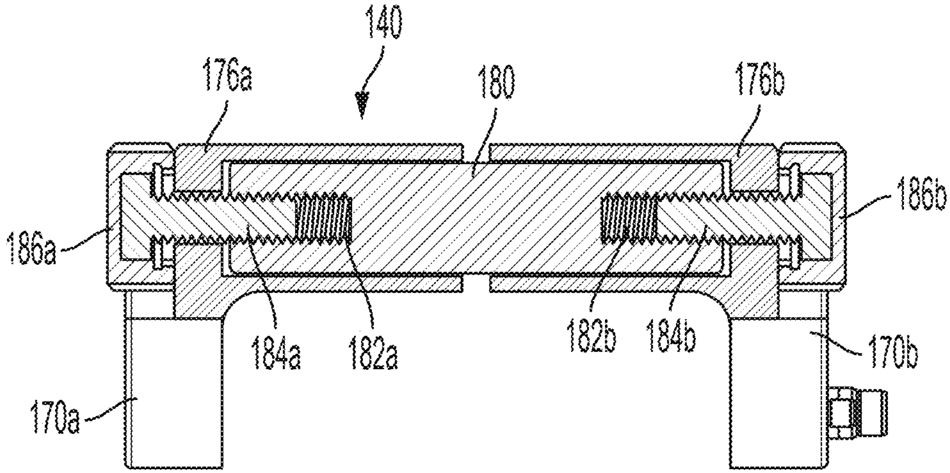

Referring also to FIGS. 2-5B, the clamping assembly 140 includes a first leg 170*a* configured to face toward a first lateral side 18*a* of the base 18 of the handle 14 and a second leg 170*b* configured to face toward an opposite second lateral side 18*b* of the base 18 of the handle 14. Each leg 170*a*, 170*b* includes a horizontal portion 172*a*, 172*b* that is generally parallel to and adjacent the base 18, an angled portion 174*a*, 174*b* that extends upward and rearward from the horizontal portion 172*a*, 172*b* at an angle α, and an inward projecting cylindrical portion 176*a*, 176*b* that extend inward toward one another rearward of the handle 12 and the base 18 (i.e., on an opposite side of the handle 12 as the end effector 22. The horizontal portions 172*a*, 172*b* each carry a pin 173*a*, 173*b* (e.g., a conical pin) that frictionally engage and bite into the first and second lateral sides 18*a*, 18*b* of the base 18. The cylindrical portions 176*a*, 176*b* are movably coupled to one another by a threaded member 180. The threaded member 180 comprises a rod non-rotatably received in the cylindrical portions 176*a*, 176*b* and having first and second threaded openings 182*a*, 182*b* at opposite ends thereof. The threaded member 178 further includes first and second threaded screws 184*a*, 184*b* threadably received in the threaded openings 182*a*, 182*b*. Each threaded screw 184*a*, 184*b* includes a knurled knob 186*a*, 186*b* coupled to the head of the screw 184*a*, 184*b* outside of the cylindrical portion 176*a*, 176*b*. As shown in FIG. 5B, rotating one or both knobs 186*a*, 186*b* in a tightening (e.g., clockwise) direction draws the first and second legs 170*a*, 170*b* toward one another to clamp the clamp assembly to the base 18. As shown in FIG. 5A, rotating one or both knobs 186*a*, 186*b* in a loosening (e.g., counterclockwise) direction moves the first and second legs 170*a*, 170*b* away from one another to remove the clamp assembly to the base 18.

Referring also to FIG. 7-10, the horizontal portion 172*a* of the first leg 172*b* carries a quick release connector 190 configured to removably couple the second end portion 137 of the arm assembly 134 to the clamp assembly 140 while the clamp assembly 140 remains rigidly coupled to the based 18 of the handle 14 of the power tool housing 12. The second end portion 137 of the arm assembly 134 defines a generally U-shaped slot 139. The U-shaped slot 139 includes first and second elongated portions 139*a*, 139*b* each having a first width W1 and a central semi-circular portion 139*c* having a second width W2 that is greater than the first width W1. The second elongated portion 139 is open to the edge of the second end portion 137 of the arm assembly 134. The quick release connector 190 includes a threaded rod and a head

Figure 9:
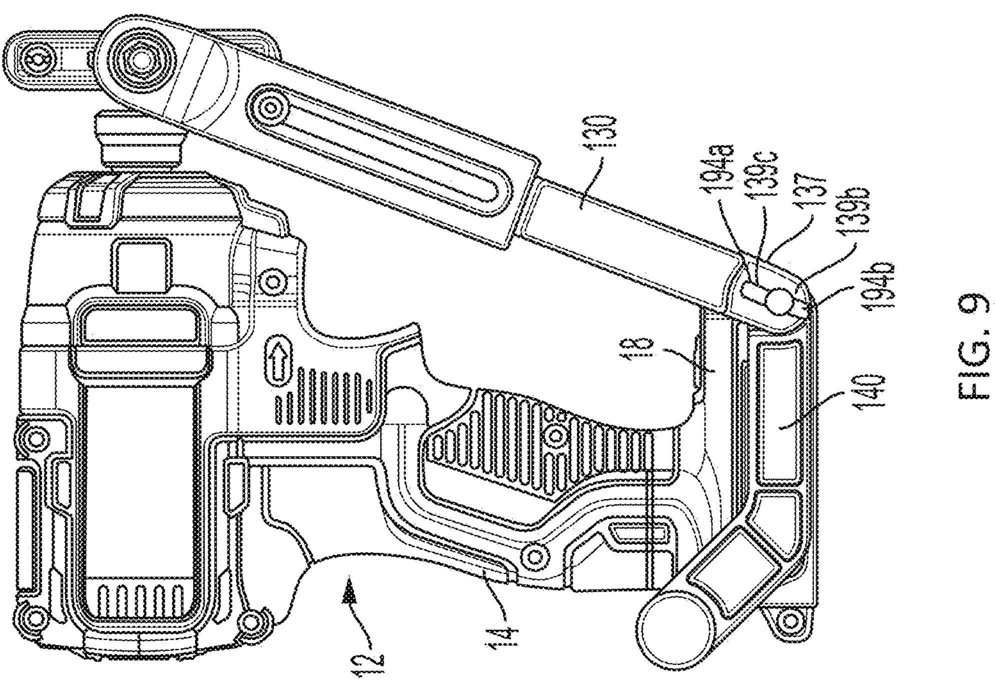
FIGS. 8 and 9 are side views of the power tool accessory system of FIG. 1A.
Figure 8:
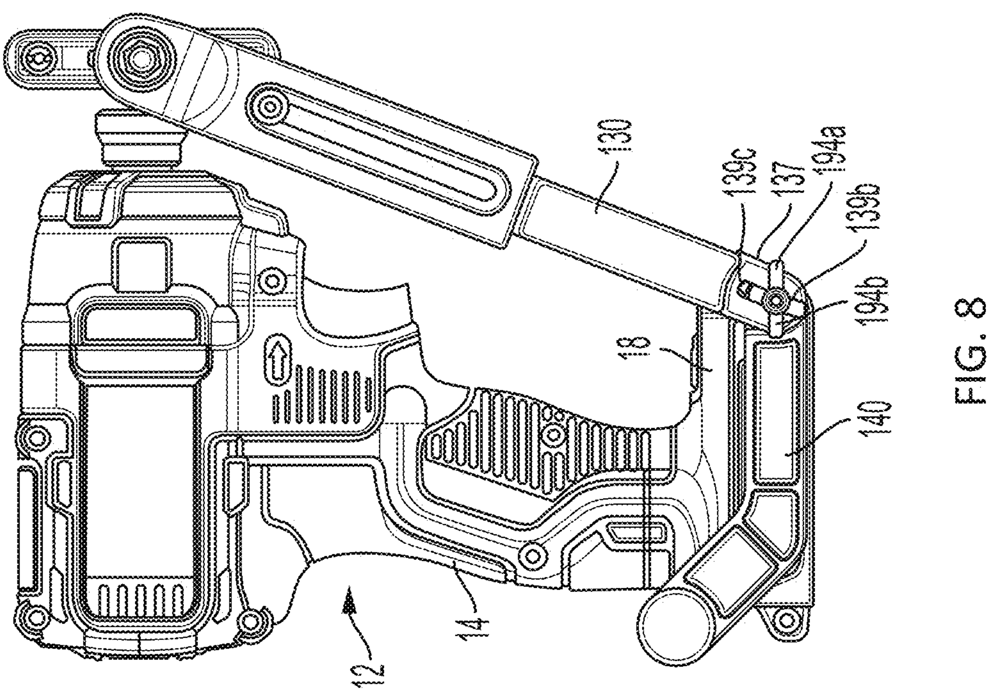
Figure 10:
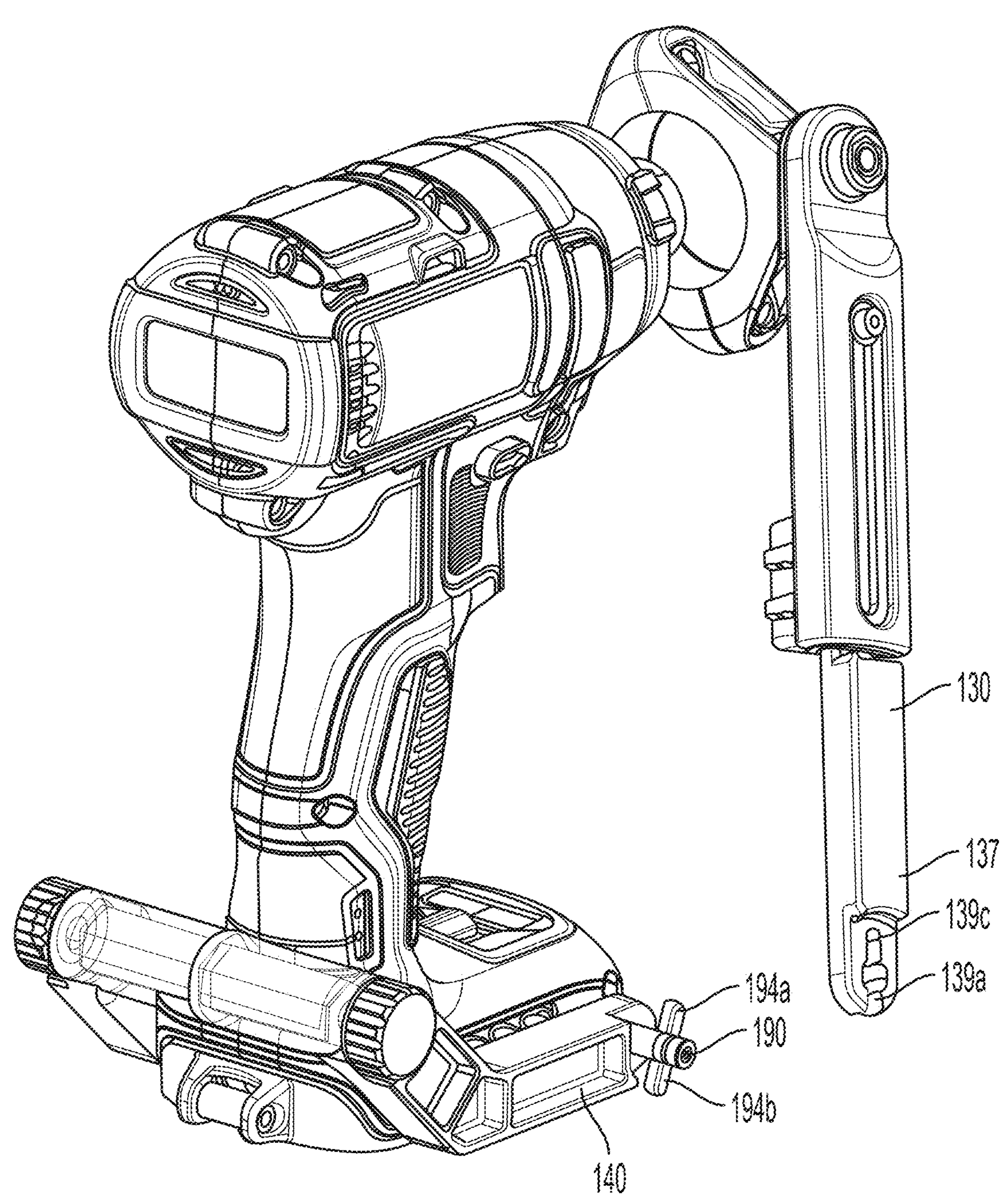
FIG. 10 is a perspective view of the power tool accessory system of FIG. 1A with the arm assembly decoupled from the clamping assembly.

192 having lateral gripping wings 194*a*, 194*b*. The threaded rod and head 192 can be tightened to clamp the arm assembly 134 to the first leg 170*a* or loosened to unclamp the arm assembly 134 from the first leg 170*a*. As shown in FIG. 8, when the gripping wings 194*a*, 194*b* are not aligned with the elongated portions 139*a*, 139*b* of the slot 139, removal of the arm assembly 134 from the clamp assembly 140 is prevented. As shown in FIGS. 9 and 10, when the gripping wings 194*a*, 194*b* are aligned with the elongated portions 139*a*, 139*b* of the slot 139, the arm assembly 134 can be removed from the clamp assembly 140 while the clamp assembly 140 remains rigidly coupled to the base 18 of the power tool housing 12.

Figures 11A, 11B, 11C, 11D:
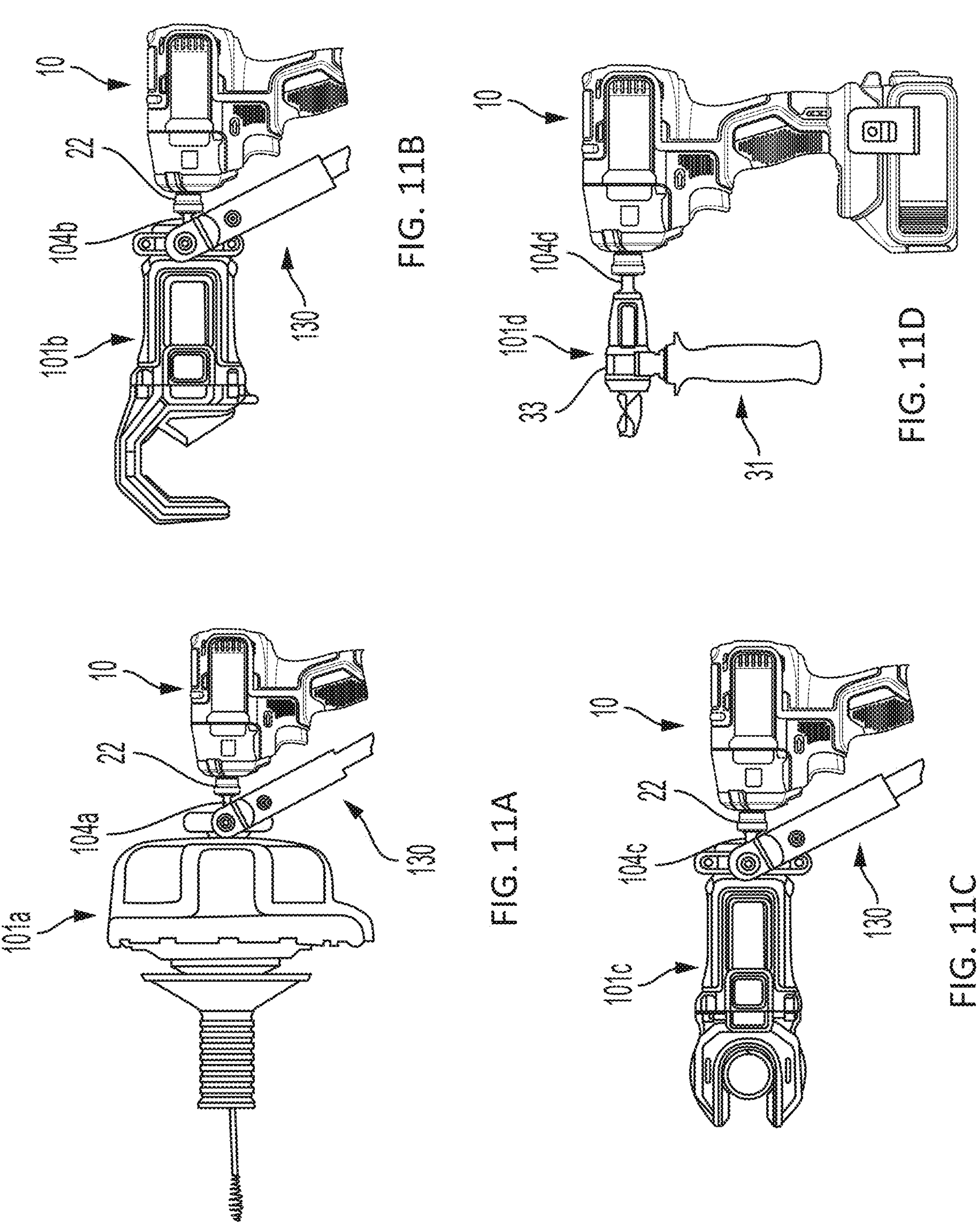
FIGS. 11A-11D are side views of other exemplary power tool accessories usable with the power tool accessory system of FIG. 1A.

Referring also to FIGS. 11A-11D, in another implementation, the power tool accessory system 100 may further includes a plurality of additional power tool accessories such as a drain cleaning accessory 101*a*, a PVC cutting accessory 101*b*, a pipe cutting accessory 101*c*, and a nibbler accessory 101*d*. Each accessory may be removably coupled to the collar 132 and may be rotatable relative to the collar while the collar remains stationary relative to the tool housing, in the manner described above. As shown in FIG. 11A, the drain cleaning accessory 101*a* may have a design similar to the drum assembly 110 and feed handle assembly 130 of the drain cleaning device 100 disclosed in U.S. Pat. No. 10,626,593, which is incorporated by reference. The drain cleaning accessory 101*a* differs from the draining cleaning device 100 in that drum assembly is coupled to and rotatably driven by an input shaft 104*a* that is similar to the aforementioned input shaft 104. The input shaft 104*a* is removably coupled for rotation to the end effector 22 of the power tool 10. The brace 130 non-rotatably couples the housing of the drain cleaning accessory 101*a* to the housing 12 of the power tool via the collar 132 coupled to the housing of the drain cleaning accessory 101*a*, the arm assembly 134, and the clamp assembly 140 (not shown in FIG. 11A).

As shown in FIG. 11B, the PVC cutting accessory 101*b* may have a design similar to the power tool accessory 101 for cutting elongated members disclosed in U.S. Provisional Patent No. 63/112,478, filed Nov. 11, 2020, which is incorporated by reference. The PVC cutting accessory 101*b* differs from the power tool accessory 101 in that it has an input shaft 104*b* removably coupled for rotation to the end effector 22 of the power tool 10. The brace 130 non-rotatably couples the housing of the PVC cutting accessory 101*b* to the housing 12 of the power tool via the collar 132 coupled to the housing of the PVC cutting accessory 101*b*, the arm assembly 134, and the clamp assembly 140 (not shown in FIG. 11B).

As shown in FIG. 11C, the pipe cutting accessory 101*c* may have a design similar to the power tool accessory for cutting tubular members disclosed in U.S. Provisional Patent No. 63/107,985, filed Oct. 30, 2020, which is incorporated by reference. The pipe cutting accessory 101*c* differs from the power tool accessory for cutting tubular members in that it has an input shaft 104*c* removably coupled for rotation to the end effector 22 of the power tool 10. The brace 130 non-rotatably couples the housing of the pipe cutting accessory 101*c* to the housing 12 of the power tool via the collar 132 coupled to the housing of the pipe cutting accessory 101*c*, the arm assembly 134, and the clamp assembly 140 (not shown in FIG. 11B).

As shown in FIG. 11D, the nibbler accessory 101*d* may have a design similar to the rotary nibbler disclosed in U.S. Pat. No. 4,679,323, which is incorporated by reference. The nibbler accessory 101*d* differs from the rotary nibbler in that it has an input shaft 104*d* in place or coupled to the spindle 14 and removably coupled for rotation to the end effector 22 of the power tool 10. Also, instead of the brace 130, the nibbler accessory 101*d* may be stabilized relative to the power tool housing by a side handle 31 that is coupled to the housing of the nibbler accessory 101*d* by a collar 33. It should be understood that the side handle 31 and collar 33 of FIG. 11D could be used in addition to or in place of the brace 130 in any of the foregoing embodiments and/or that the brace 130 from any of the foregoing embodiments could be used in addition to or in place of the side handle 31 and collar 33 to stabilize the nibbler accessory 101*d*. It should also be understood that any of the foregoing power tool accessories 101, 101*a*, 101*b*, 101*c*, 101*d* may be used interchangeably with the power tool 10, brace 130, and/or handle, including without removing the clamp assembly 140 from the power tool.

Figure 12A:
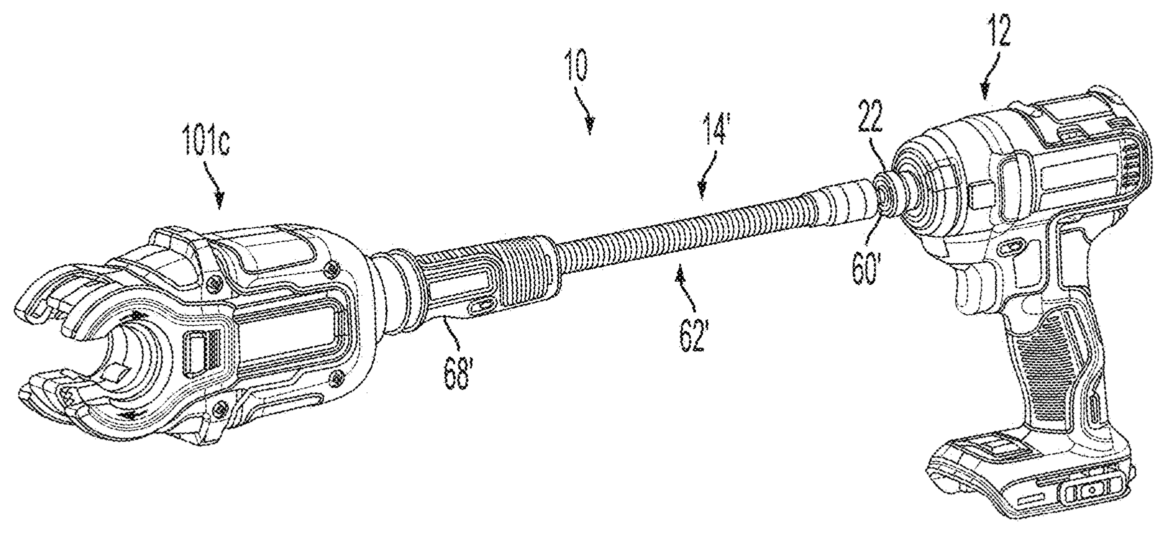
FIG. 12A is a perspective view of the power tool accessory of FIG. 1C coupled to a power tool by a flexible shaft assembly.
Figure 12B:
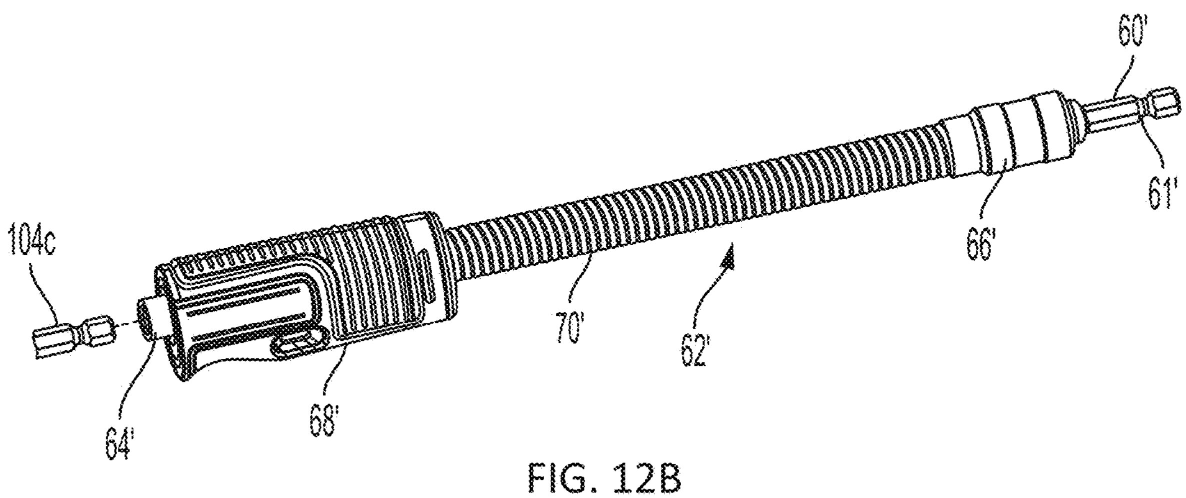
FIG. 12B is a perspective view of the flexible shaft assembly of FIG. 12A.
Figure 13:
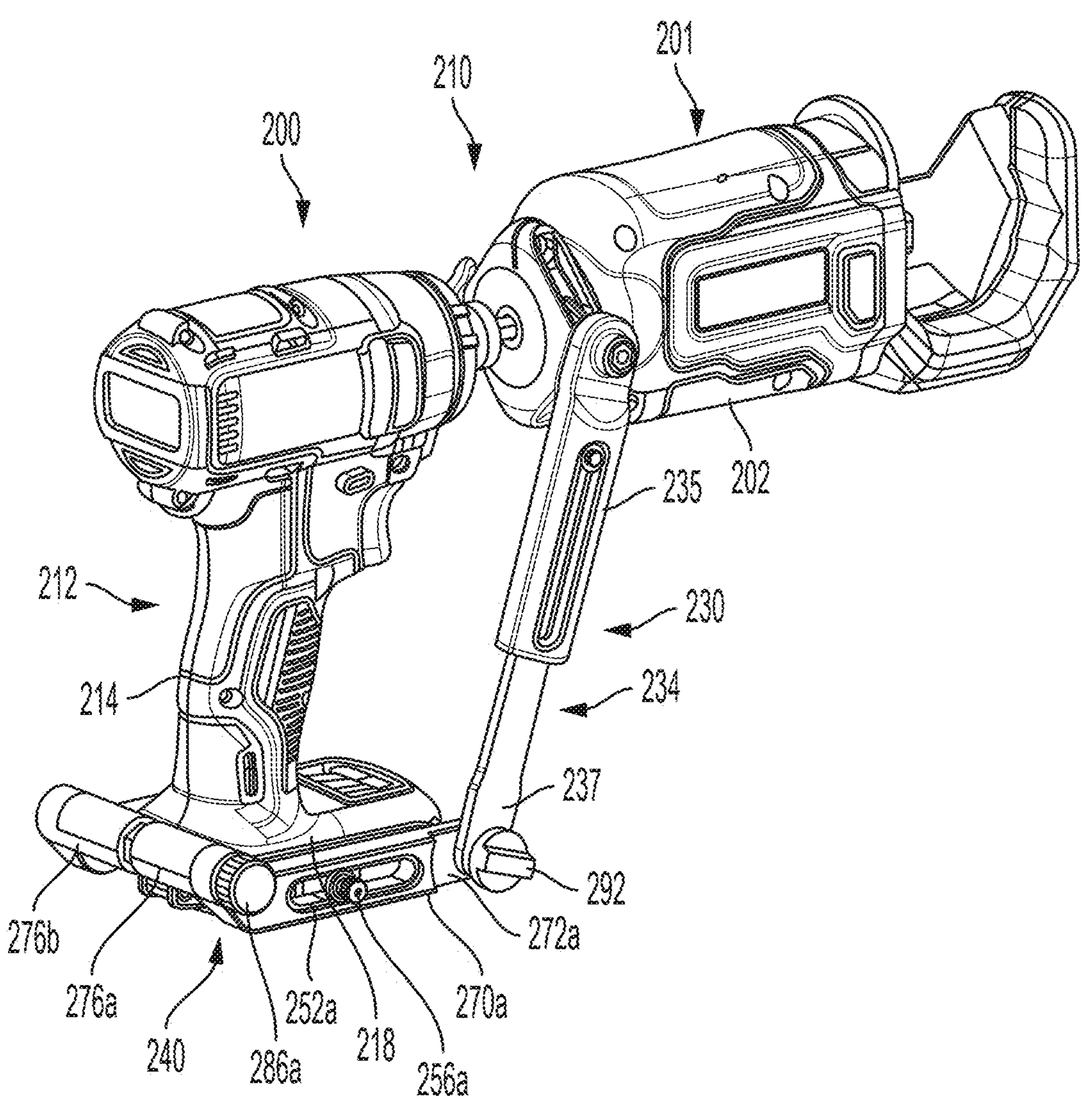
FIG. 13 is a perspective view of another embodiment of a power tool accessory system.
Figure 14:
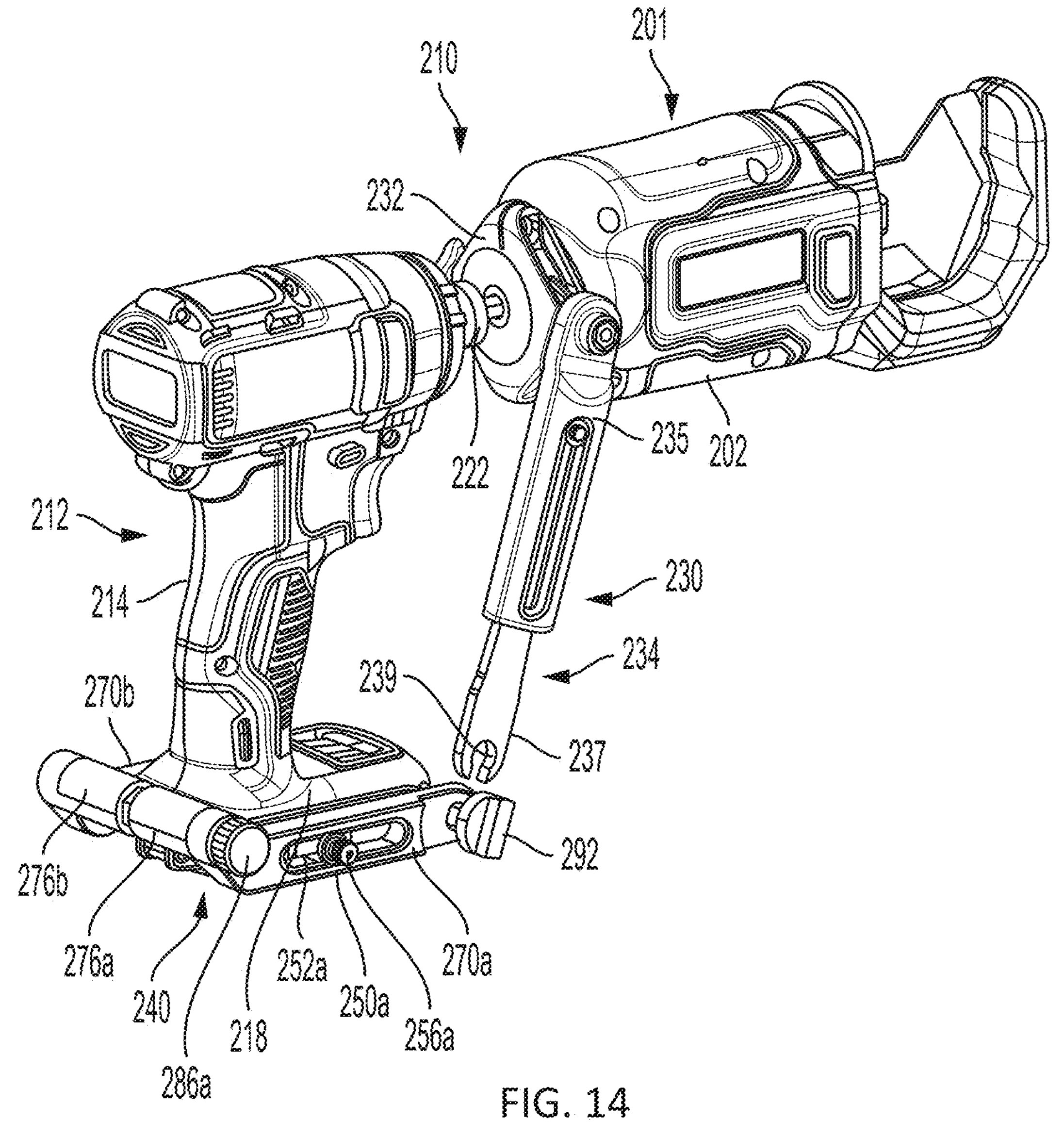
FIG. 14 is a perspective view of the power tool accessory system of FIG. 13, with the arm assembly decoupled from the clamping assembly.
Figure 15:
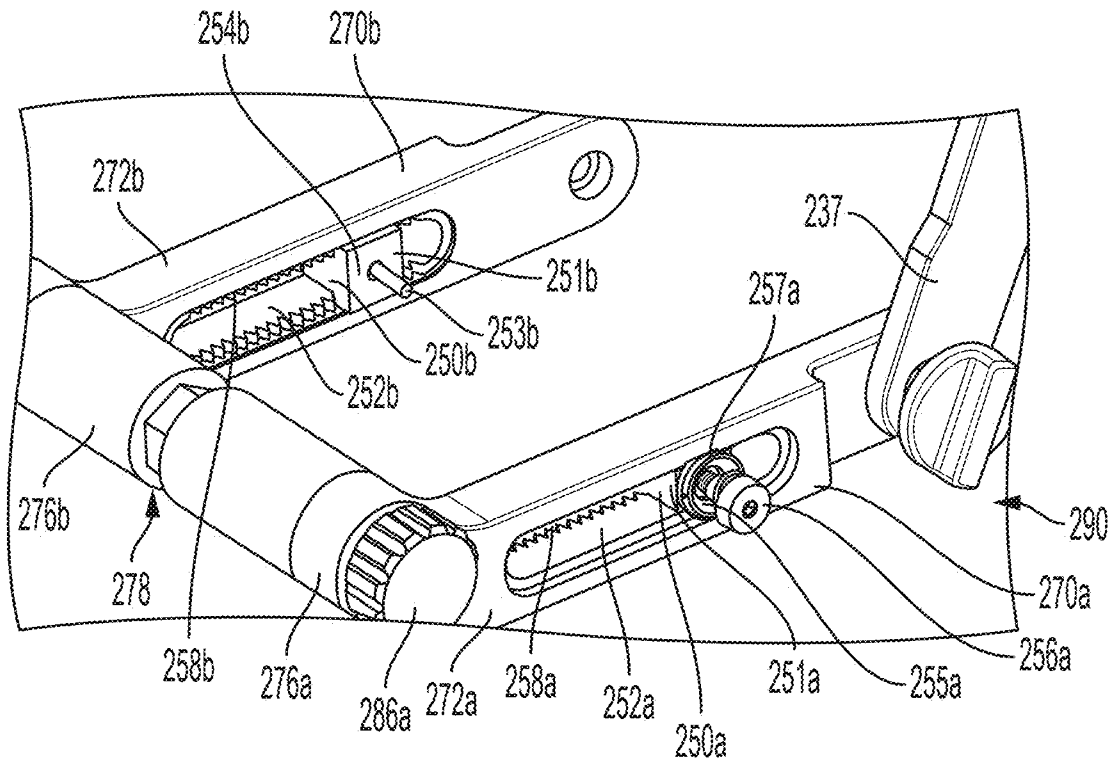
FIG. 15 is a perspective view of an embodiment of a clamping assembly of the power tool accessory system of FIG. 14.
Figure 16:
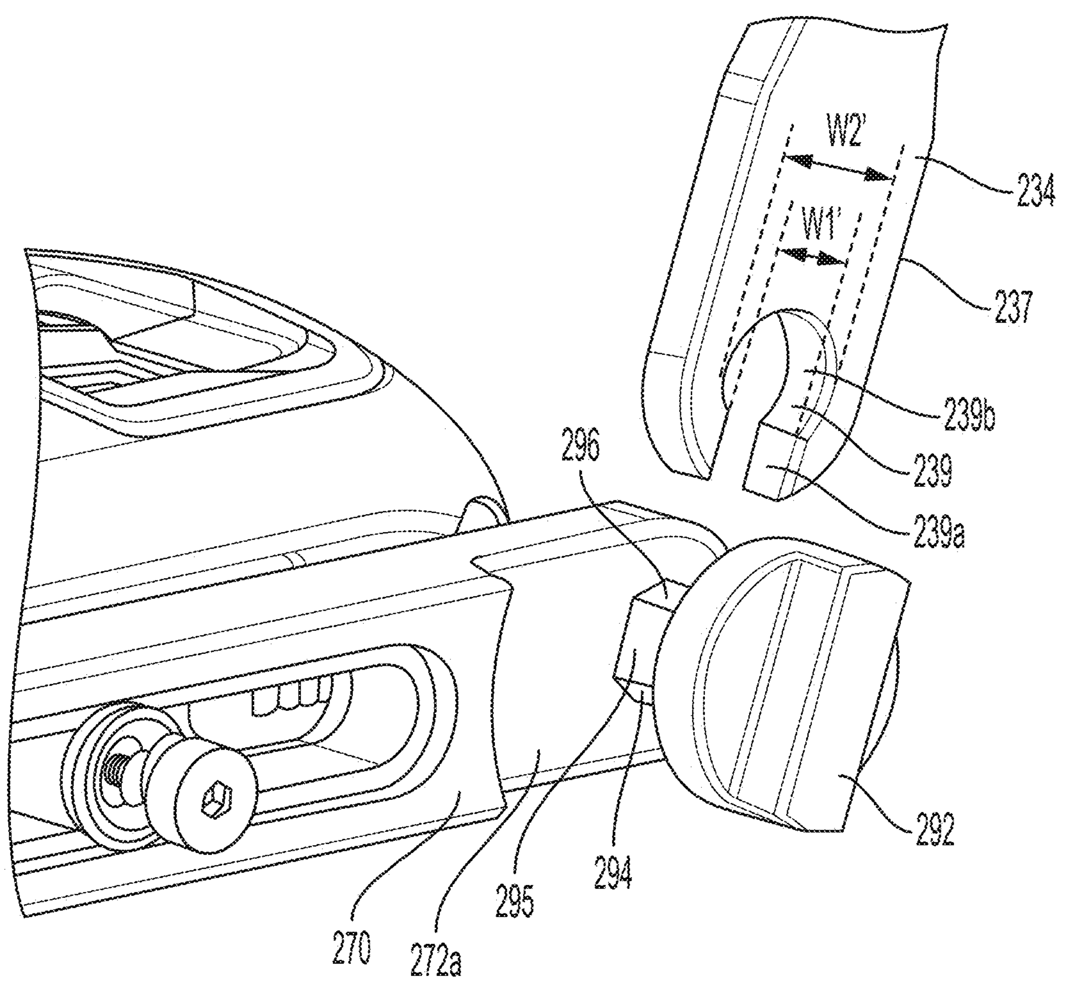
FIG. 16 is a close-up perspective view of a portion of the arm assembly of FIG. 14 and the clamping assembly of FIG. 15.
Figure 17:
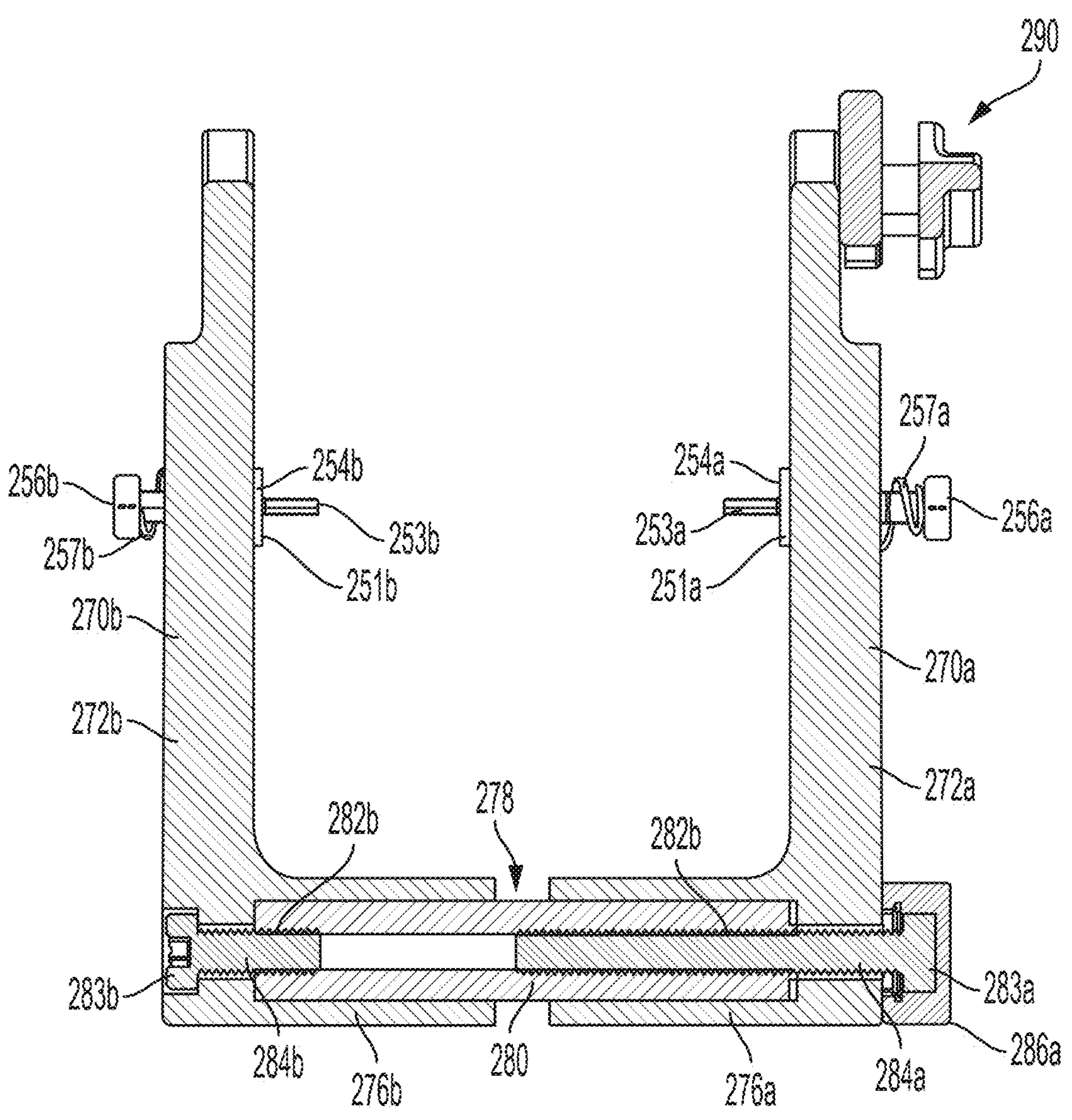
FIG. 17 is a cross-sectional view of the clamping assembly of FIG. 15.

Referring also to FIGS. 12A-12B, the power tool accessory system 10 may further include one or more components of the modular bit holder system disclosed in U.S. patent application Ser. No. 16/858,896, filed Apr. 27, 2020, which is incorporated by reference. For example, as shown in FIG. 12A-12B, the pipe cutting accessory 101*c* described above may be removably and drivably coupled to the end effector 22 of the power tool 12 by a flexible shaft tool bit holder 14' similar to the flexible shaft tool bit holder 14 described in the aforementioned U.S. patent application Ser. No. 16/858,896. The flexible shaft tool bit holder 14' includes an input shaft 60' removably couplable to the end effector 22, a flexible intermediate shaft assembly 62', and a quick release tool bit holder 64' rotatably drivable by the second input shaft 60', via the flexible intermediate shaft assembly 62'. The second input shaft 60' has a polygonal (e.g., hexagonal) shape and an annular ball groove 61' so that the input shaft 60' is configured to be received in the end effector 22 (e.g., a quick release bit holder) of the power tool 10. The flexible intermediate shaft assembly 62' includes a generally cylindrical, rigid rear bushing 66', a generally cylindrical rigid front bushing 68', a flexible sheath 70' fixedly connected to and between the rear bushing 66' and the front bushing 68', and an inner flexible shaft (not shown) received through the flexible sheath 70', supported at its rear end by the rear bushing 66' and at its front end by the front bushing 68'. The inner flexible shaft, but not the flexible sheath 70', is rotatably drivable by the second input shaft 60' and transmits rotation to the tool bit holder 64'. The inner flexible shaft and the flexible sheath 70' each are bendable into a plurality of curved and straight configurations, and may be semi-rigidly retained in such configurations, e.g., they may have a gooseneck structure. The tool bit holder 64' is configured to be removably coupled to the input shaft 104*c* of the pipe cutting accessory 101*c* to transmit rotation to the input shaft 104*c*. Thus, the pipe cutting accessory 101*c* may be usable at an extended distance from the end effector 22 of the power tool 10 and may be positioned at a wide variety of angles and configurations to facilitate reaching tight spaces. It should be understood that the flexible shaft tool bit holder 14' may be used with any of the aforementioned power tool accessories 101, 101*a*, 101*b*, 101*c*, 101*d* as an alternative to being used with the above-described brace and/or side handle.

Referring to FIGS. 13-17, in another embodiment, a power tool accessory system 200 includes a power tool accessory 201 (which is substantially similar to the power tool accessory 101*b*, described above) and a brace 230 that are removably coupled to a power tool 210 (which is the substantially the same as the power tool 10, described above). The brace 230 is configured to adjustably, removably, and rigidly couple the accessory housing 202 to the power tool housing 212 while the input shaft of the accessory 201 rotates relative to the accessory housing 202. The brace 230 includes a collar 232 coupled to a rear end 211 of the accessory housing 202 (which is substantially similar to the collar 132, described above), a clamping assembly 240 configured to be removably and rigidly attached to the base 218 of the handle 214 of the power tool housing 212, and an arm assembly 234 having a first end portion 235 pivotally coupled to the collar 232 and an opposite second end portion 237 coupled to the clamping assembly 240. As described further below, the second end portion 237 of the arm assembly 234 is configured to be removable from the clamp assembly 240, without the use of a secondary tool, while the clamp assembly 240 remains rigidly coupled to the tool housing 212 to enable removal of the power tool accessory 201 from the end effector 222 of the power tool 210.

The clamping assembly 240 is substantially similar to the clamping assembly 140 described above, except for the following differences. First, each of the first leg 270*a* and second leg 270*b* includes a horizontal portion 272*a*, 272*b* that face toward a first and second lateral sides 218*a*, 218*b* of the base 218 of the handle 214. Each horizontal portion 272*a*, 272*b*, includes a moveable pin assembly 250*a*, 250*b*. Each movable pin assembly 250*a*, 250*b* includes a block-shaped pin carrier 251*a*, 251*a* that can be moved axially along a longitudinal slot 252*a*, 252*b* in each leg 270*a*, 270*b*. Each slot 252*a*, 252*b* includes a plurality of teeth or detents 258*a*, 258*b* that face the base 218 of the tool housing 212. Each pin carrier 251*a*, 251*b* carries an inwardly projecting pin 253*a*, 253*b* on an inner face 254*a*, 254*b* of the carrier 251*a*, 251*b* and at least one tooth or detent for engaging the teeth or detents on the slots 252*a*, 252*b*. Coupled to an outer face 255*a*, 255*b* of each carrier 251*a*, 251*b* is an actuator or knob 256*a*, 256*b* that is biased outward from the leg 270*a*, 270*b* by a spring 257*a*, 257*b*. In use, each actuator 256*a*, 256*b* can be pressed inward toward the base 218, which disengages the tooth or detent on the carrier 251*a*, 251*b* from the teeth or detents 258*a*, 258*b* on the slot 252*a*, 252*b*, allowing the carrier to be moved axially along the slot 252*a*, 252*b*. Once the carrier is in its desired position, the actuator can be released and the teeth or detents will retain the carrier in place. The pins 251*a*, 251*b* on the carrier may engage an opening on the base 218 of the tool housing 212, such as an opening that usually receives a fastener to retain a belt clip.

Second, each leg 270*a*, 270*b* includes an inward projecting cylindrical portion 276*a*, 276*b* that extend inward toward one another rearward of the handle 214 and the base 218 (i.e., on an opposite side of the handle 212 as the end effector 222. The cylindrical portions 276*a*, 276*b* are movably coupled to one another by a threaded member 278. The threaded member 278 includes a rod 280 non-rotatably received in the cylindrical portions 276*a*, 276*b* and having first and second threaded openings 282*a*, 282*b* at opposite ends thereof. The threaded member 278 further includes first and second threaded screws 284*a*, 284*b* threadably received in the threaded openings 282*a*, 282*b*. One of the threaded screws 284*b* has a head 283*a* recessed in one of the cylindrical portions 276*b* and is tightly fastened to the cylindrical portion 276*b* so as not to be user adjustable. The other threaded screw 284*a* has a head 283*a* exposed from the other cylindrical portion 276*a* and includes a knurled knob 286*a* coupled to the head of the screw 284*a* so that the screw 284*a* is user adjustable. Rotating the knob 286*a* in a tightening direction draws the first and second legs 270*a*, 270*b* toward one another to clamp the clamp assembly to the base 218. Rotating the knob 286*a* in a loosening direction moves the first and second legs 270*a*, 270*b* away from one another to remove the clamp assembly to the base 218.

Third, the horizontal portion 272*a* of the first leg 270*a* carries a quick release connector 290 configured to removably couple the second end portion 237 of the arm assembly 234 to the clamp assembly 240 while the clamp assembly 240 remains rigidly coupled to the base 218 of the handle 214 of the power tool housing 212. The second end portion 237 of the arm assembly 234 defines a generally U-shaped slot 239. The U-shaped slot 239 is generally key-hole shaped with an elongated portion 239*a* having a first width W1' and a semi-circular portion 239*b* having a second width W2' that is greater than the first width W1'. The elongated portion 239*a* is open to the edge of the second end portion 237 of the arm assembly 234. The quick release connector 290 includes a rotatable knob 292 and shaft 294. The shaft 294 has a double-D shaped cross-section with two flat faces 295 separated by a first distance D1 that is less than or equal to the first width W1' and two curved faces 296 separated by a second distance D2 that is greater than the first width W1' and less than or equal to the second width W2'. The knob 292 can be rotated between a first position (shown in FIG. 13) and a second position (shown in FIGS. 14 and 16). In the first position, the shaft 294 is captured in the semi-circular portion 239*b* of the U-shaped slot 239 with the flat faces 295 extending transverse to the elongated portion 239*a* of the U-shaped slot 239 to prevent removal of the arm assembly 234 from the clamp assembly 240. In the second position, the flat faces 295 are aligned with the elongated portion 239*a* of the U-shaped slot 239 to enable tool-free and quick removal of the arm assembly 234 from the clamp assembly 240 while the clamp assembly remains rigidly coupled to the base 218 of the power tool housing 212.

Figure 18:
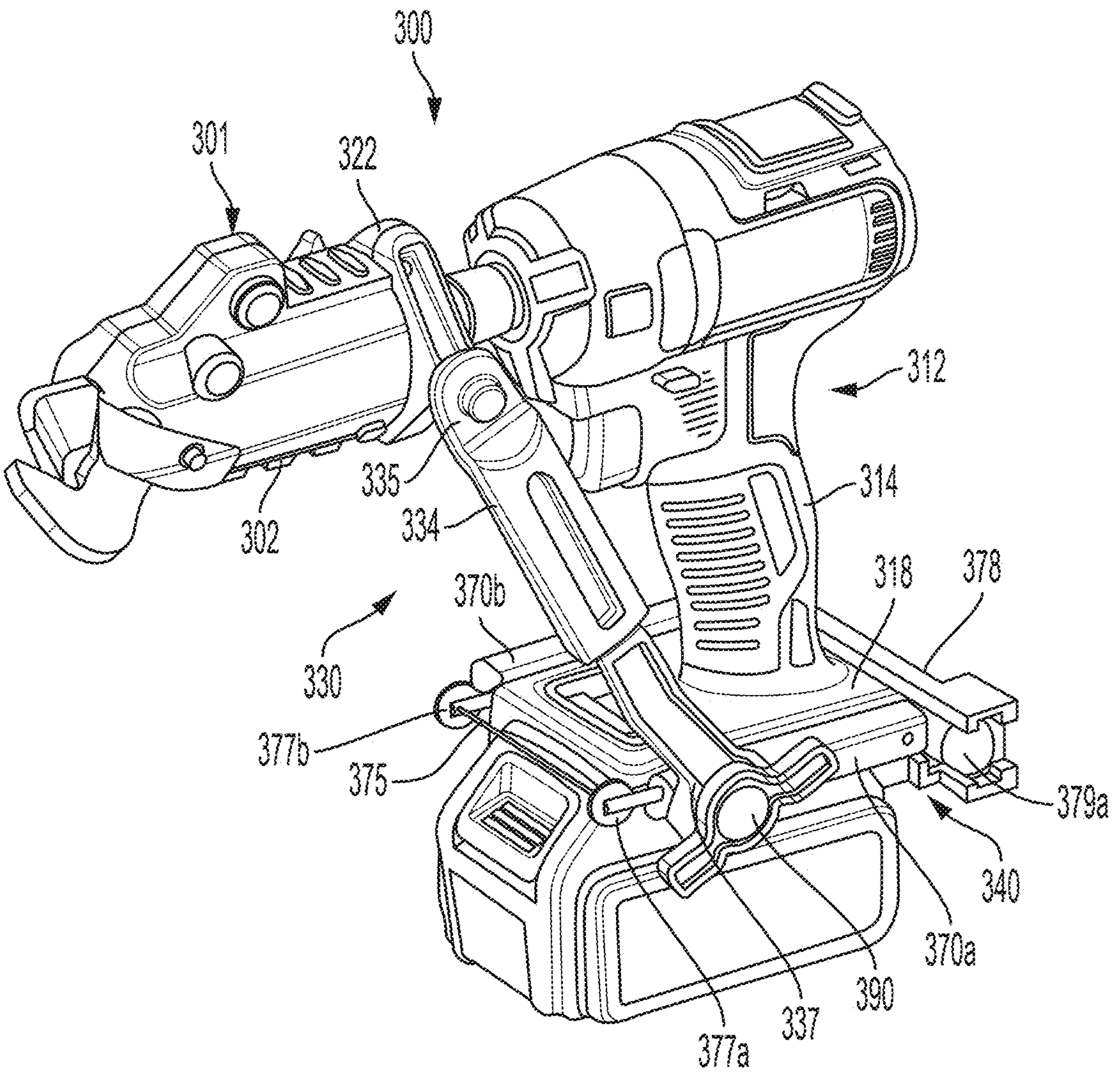
FIG. 18 is a perspective view of another embodiment of a power tool accessory system.
Figure 19:
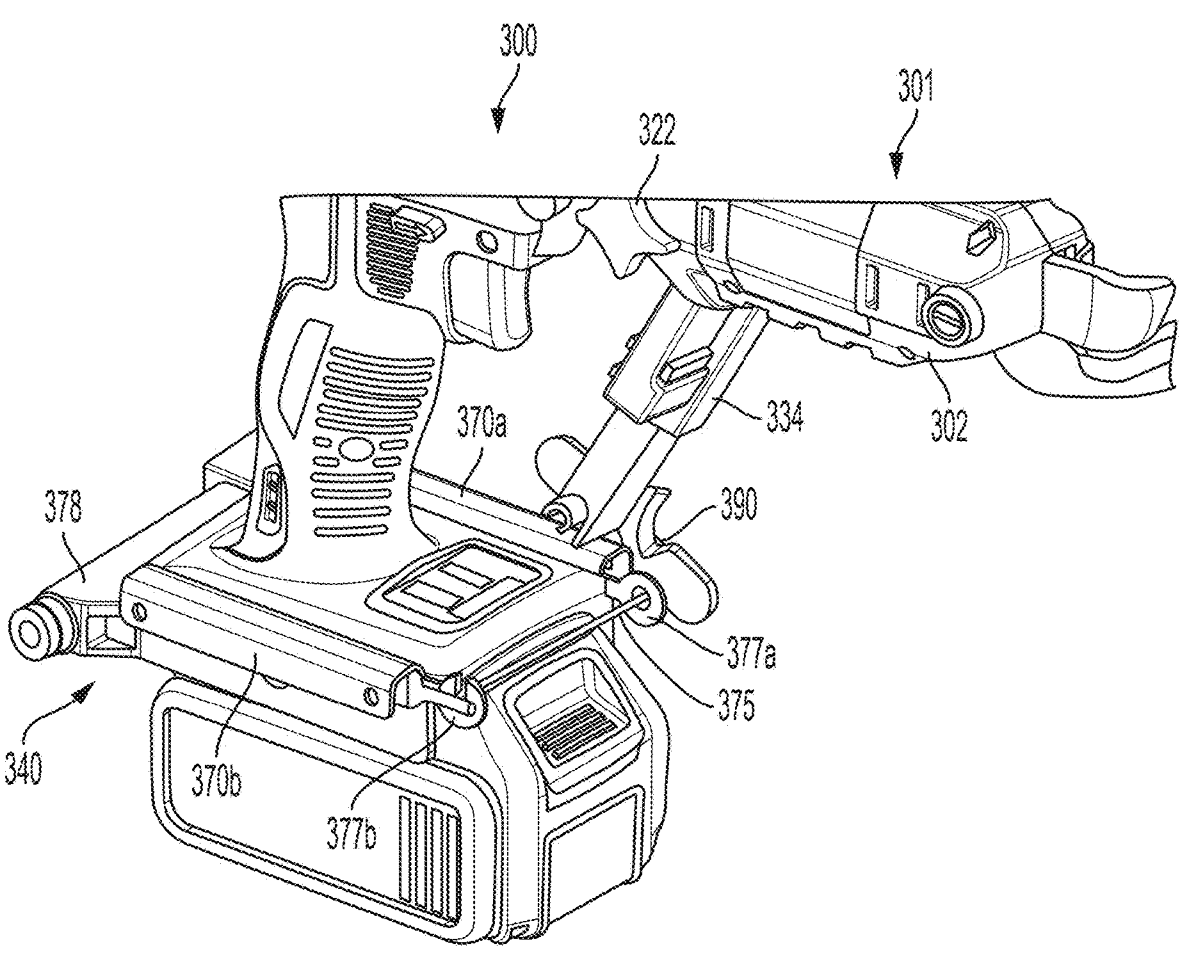
FIG. 19 is another perspective view of the power tool accessory system of FIG. 18.
Figure 20:
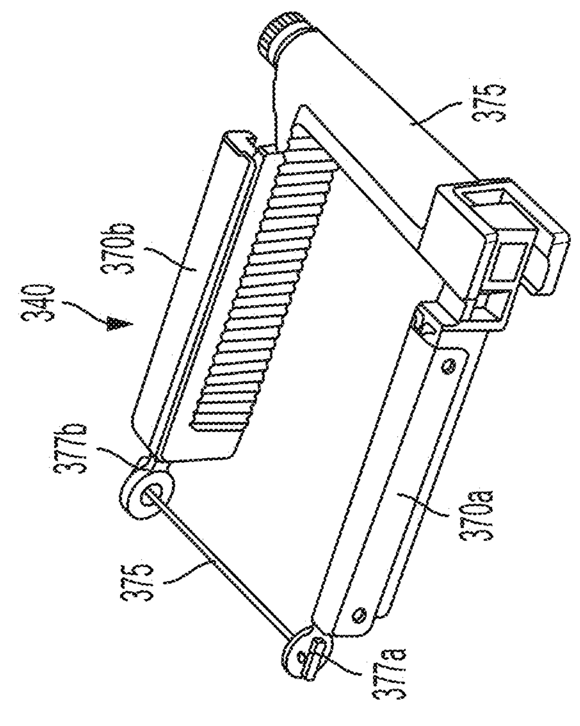
FIG. 20 is an exploded view of embodiments of an arm assembly and a clamping assembly of the power tool accessory system of FIG. 18.
Figure 20:
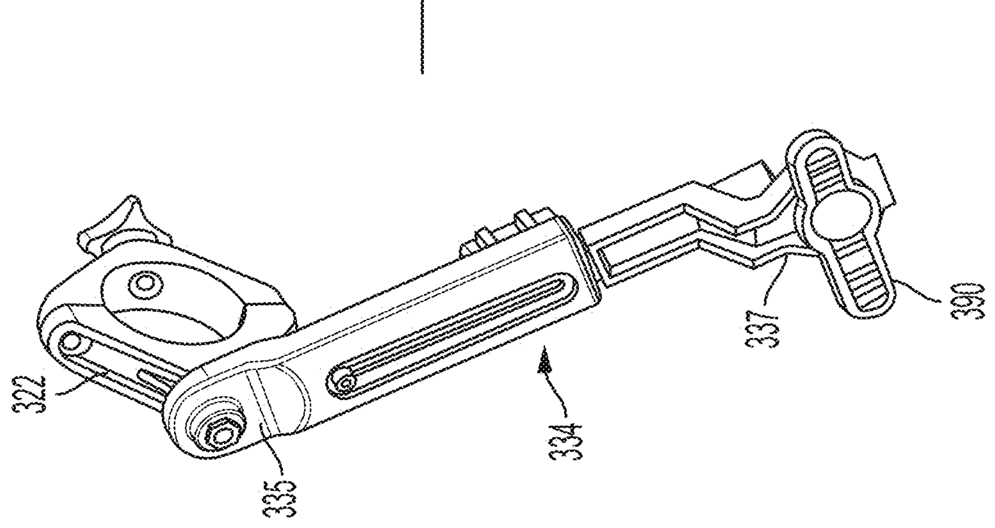

Referring to FIGS. 18-20, in another embodiment, a power tool accessory system 300 includes a power tool accessory 301 (which is substantially similar to one of the power tool accessories described above) and a brace 330 that are removably coupled to a power tool 310 (which is the substantially the same as the power tool 10, described above). The brace 330 is configured to adjustably, removably, and rigidly couple the accessory housing 302 to the power tool housing 312 while the input shaft of the accessory 301 rotates relative to the accessory housing 302. The brace 330 includes a collar 332 coupled to a rear end 311 of the accessory housing 302 (which is substantially similar to the collar 132, described above), a clamping assembly 340 configured to be removably and rigidly attached to the base 318 of the handle 314 of the power tool housing 312, and an arm assembly 334 (which is substantially similar to one of the arm assemblies 134, 234 described above). The clamping assembly 340 is substantially similar to one of the clamping assemblies 140, 240 described above, except that it additionally includes a cord 375 connecting front ends 377*a*, 377*b* of the legs 370*a*, 370*b*, while rear ends 379*a*, 379*b* of the legs 370*a*, 370*b* are connected by a threaded member 378 (similar to one of threaded members 178, 278 described above). The cord 375 provides additional stability to the legs 370*a*, 370*b* when clamped to the based 318 of the power tool housing 312. The second end portion 337 of the arm assembly 334 includes a quick release connector 390 (which may be substantially similar to one of the above-described quick release connectors 190, 290) that enables the arm assembly 334 to be removable from the clamp assembly 340, without the use of a secondary tool, while the clamp assembly 340 remains rigidly coupled to the tool housing 312 to enable removal of the power tool accessory 301 from the power tool 310.

Figure 21:
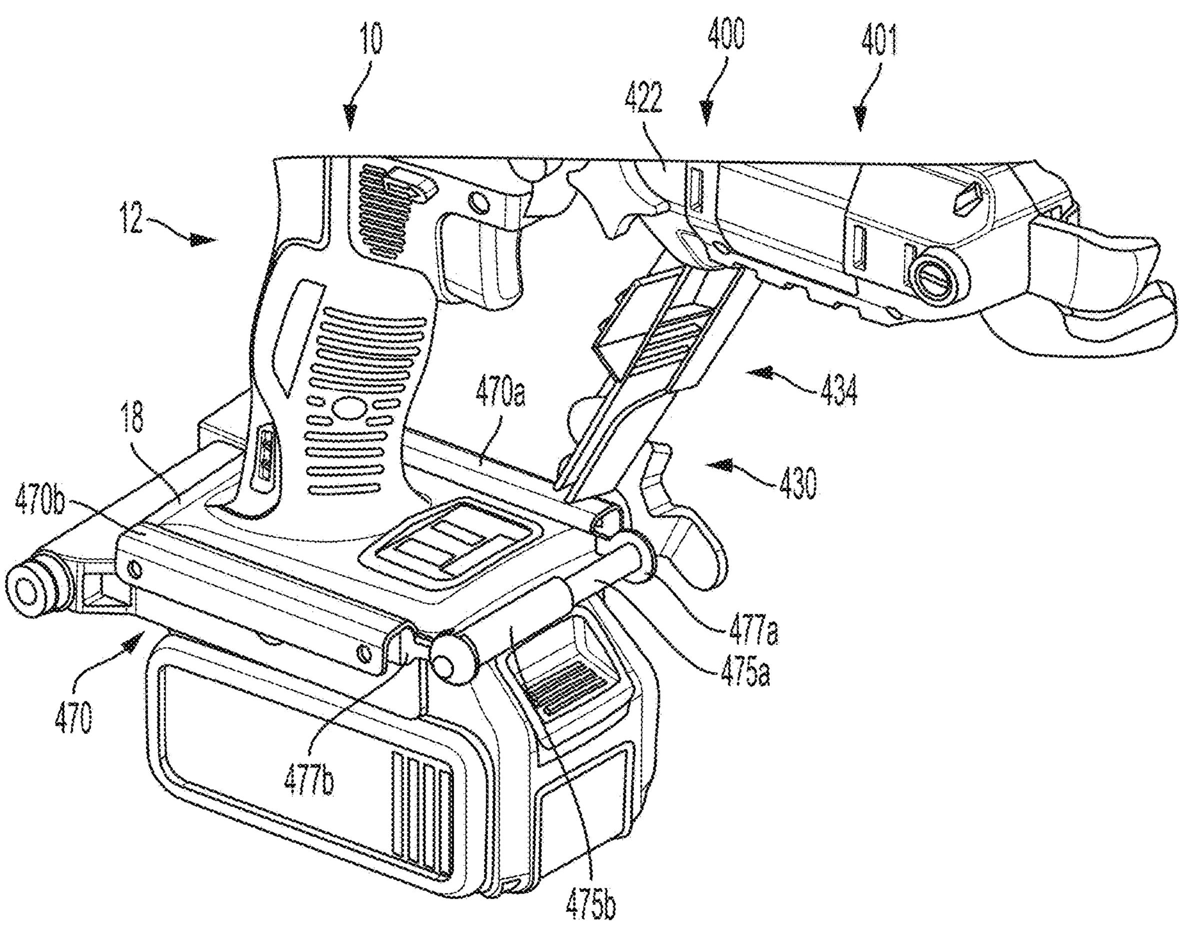
FIG. 21 is a perspective view of another embodiment of a power tool accessory system.
Figure 22:
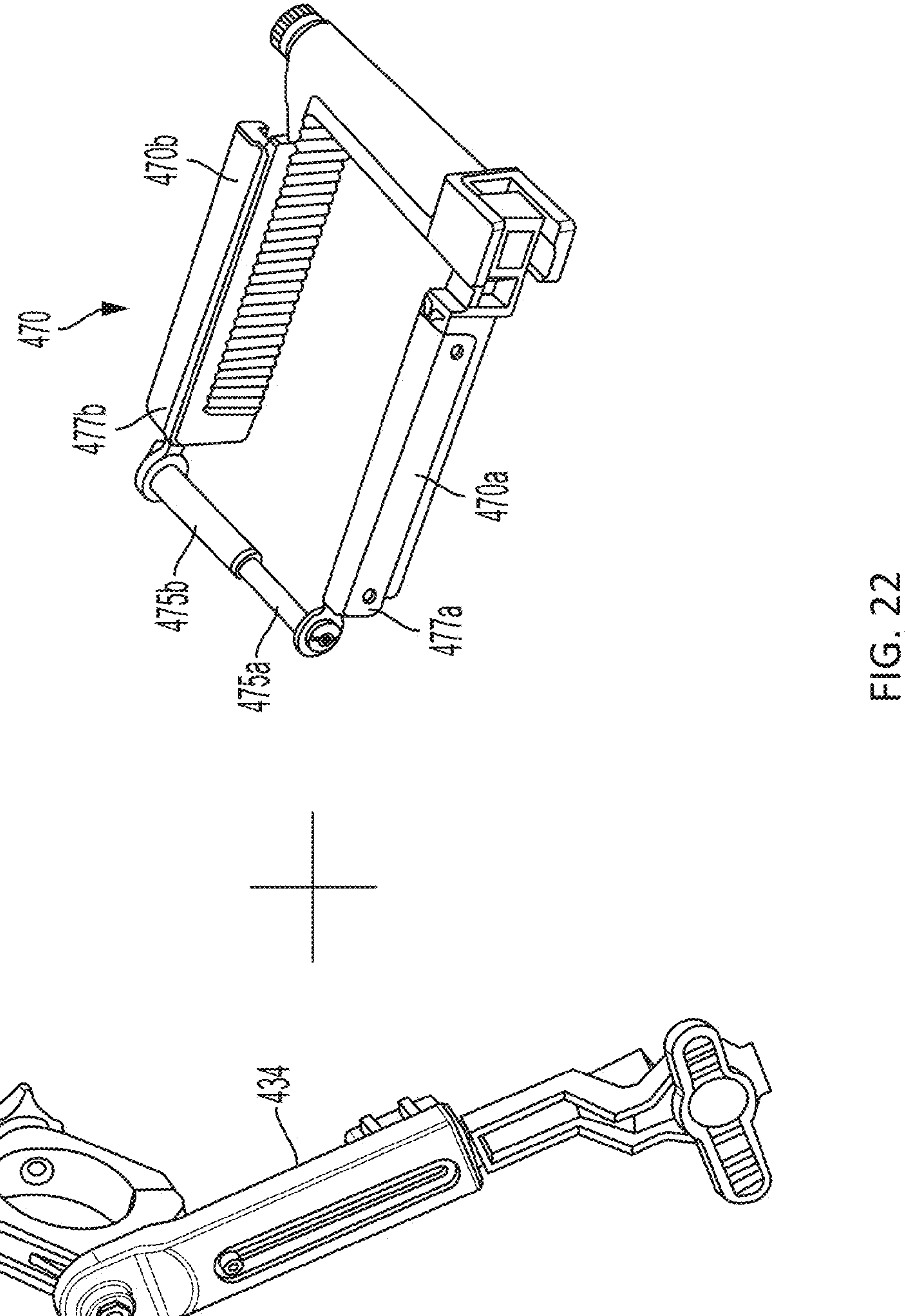
FIG. 22 is an exploded view of embodiments of an arm assembly and a clamping assembly of the power tool accessory system of FIG. 21.
Figure 23:
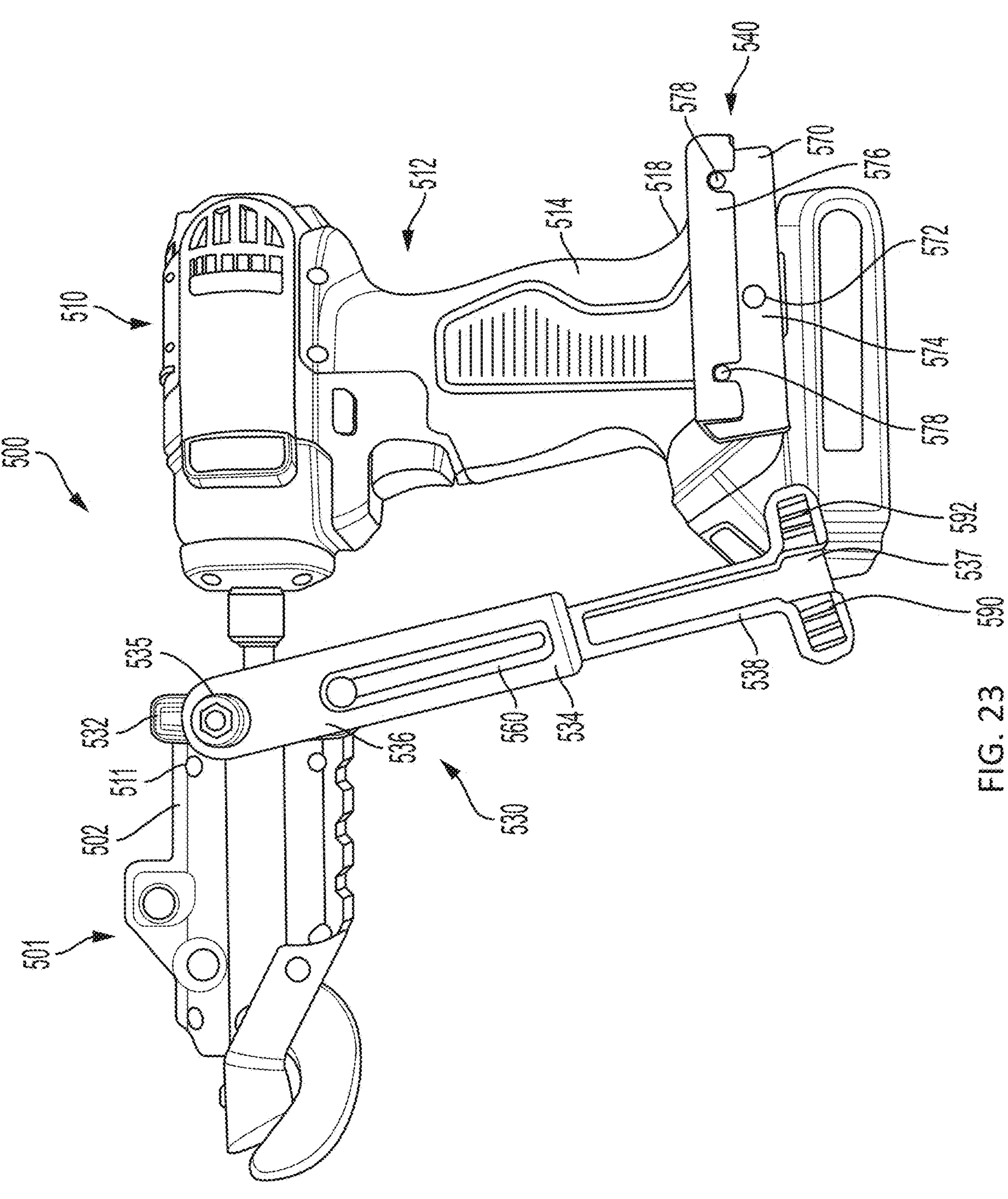
FIGS. 23 and 24 are side views of another embodiment of a power tool accessory system.
Figure 24:
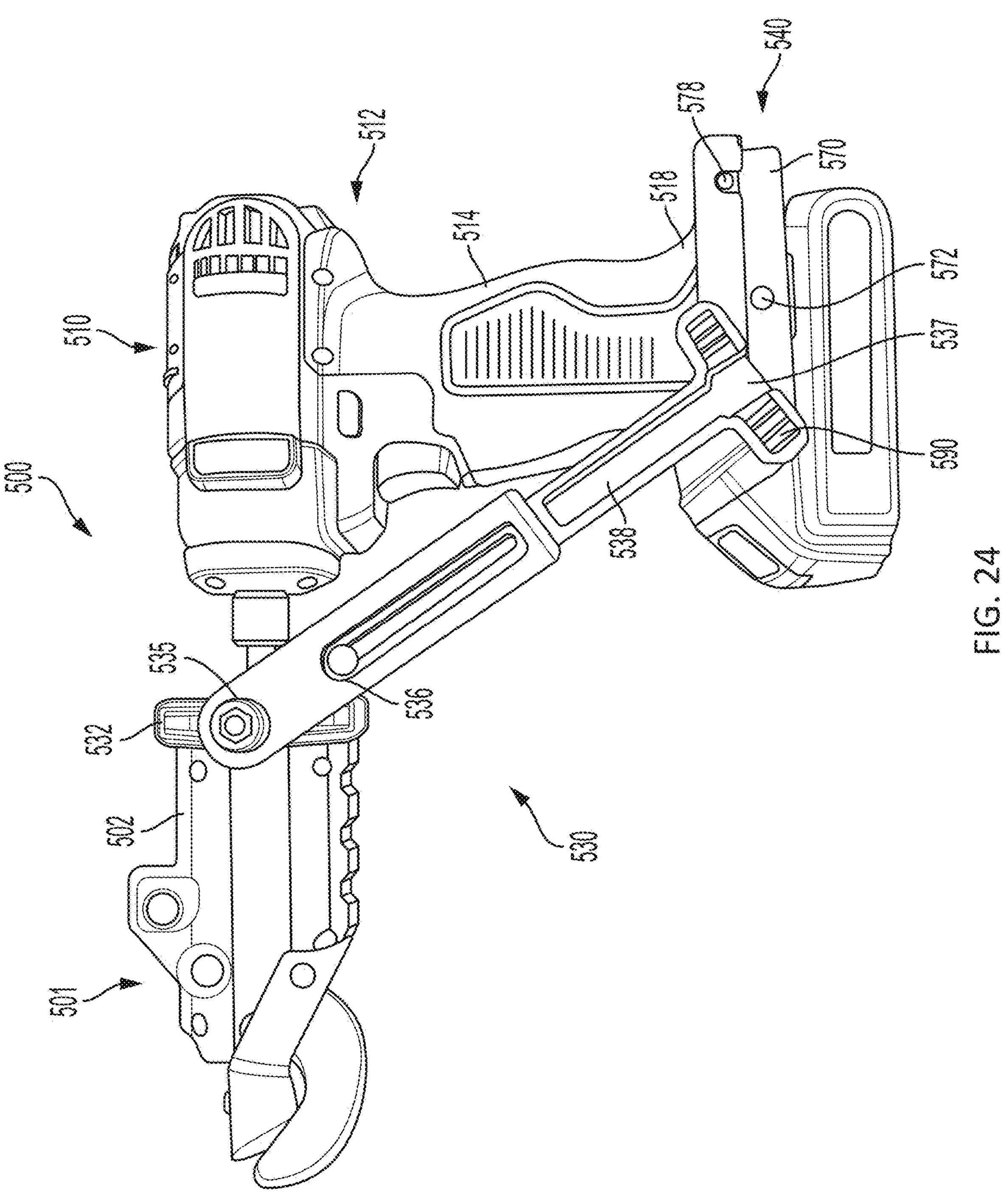
Figure 25:
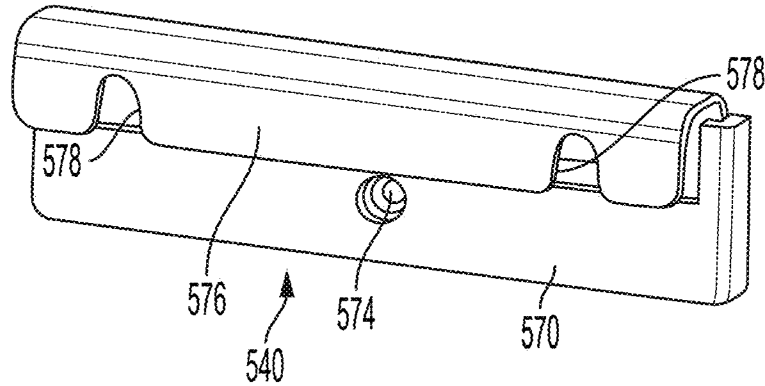
FIG. 25 is a perspective view of an embodiment of a clamping assembly of the power tool accessory system of FIGS. 23 and 24.
Figure 26:
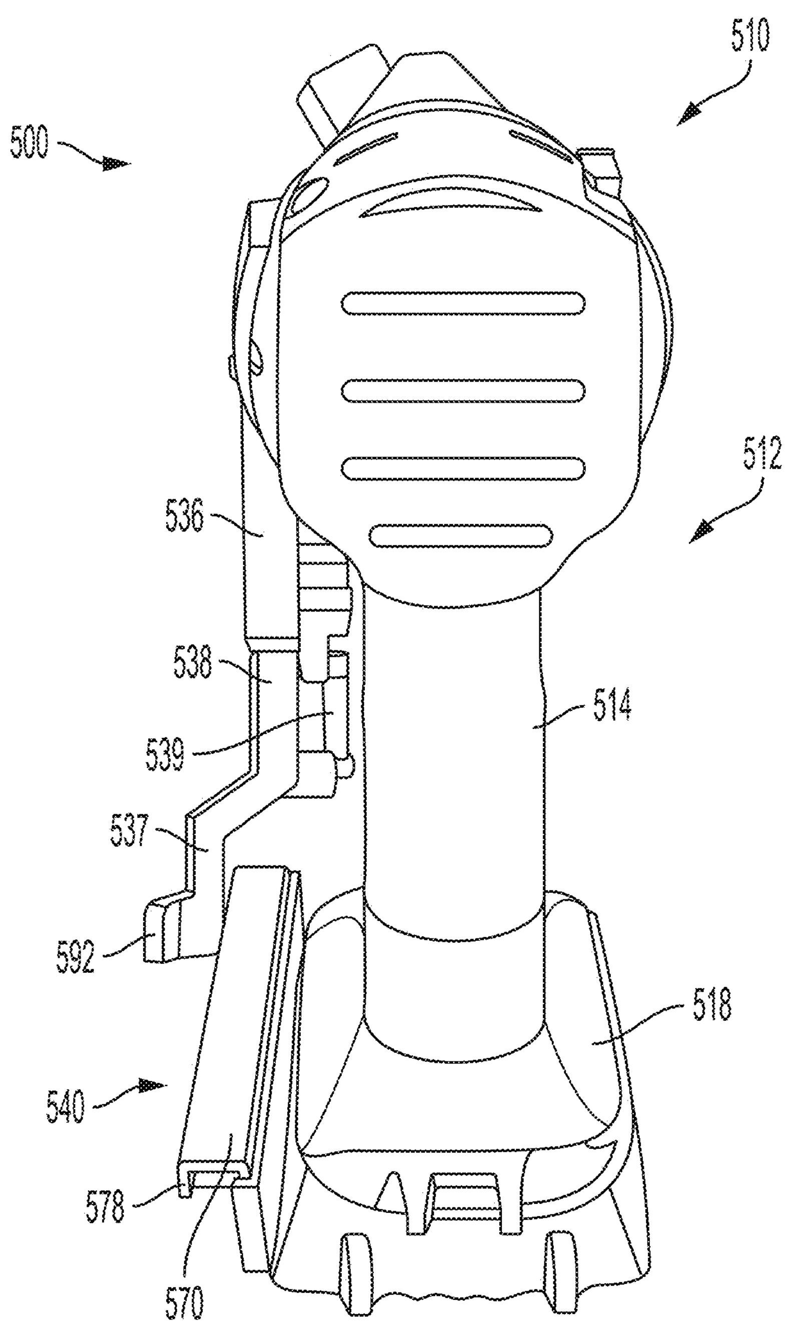
FIG. 26 is a rear view of the power tool accessory system of FIGS. 23 and 24.
Figure 27A:
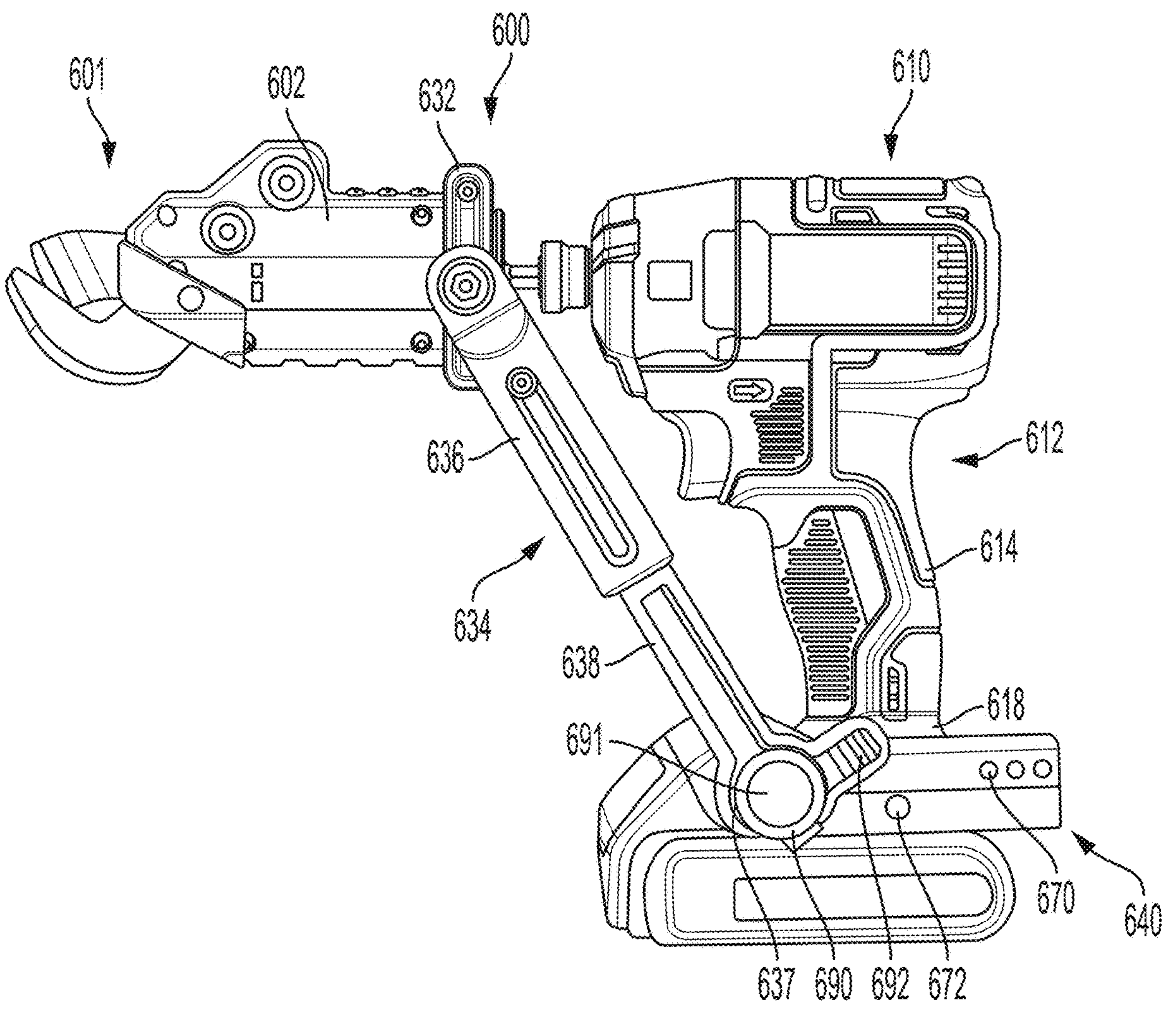
FIG. 27A is a side view of another embodiment of a power tool accessory system.
Figure 27B:
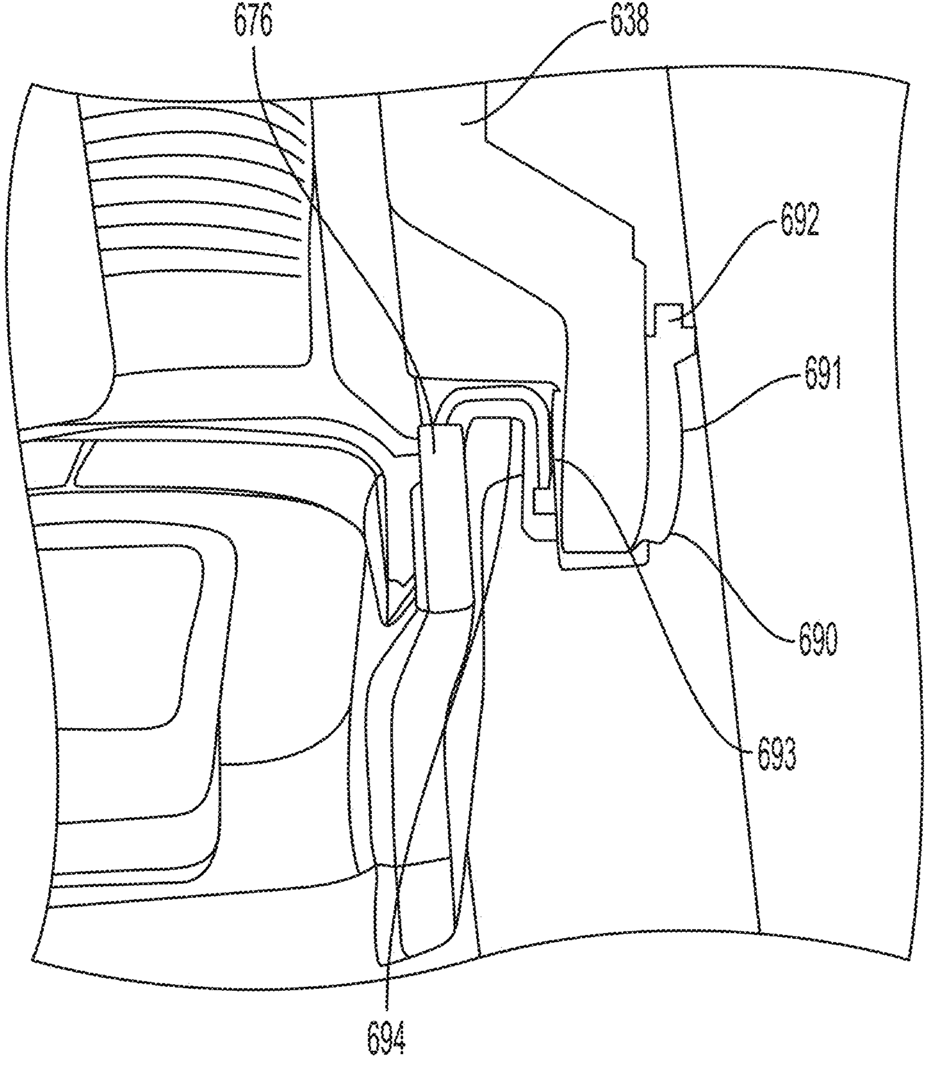
FIG. 27B is a close-up front view of a portion of the power tool accessory system of FIG. 27A.
Figure 28:
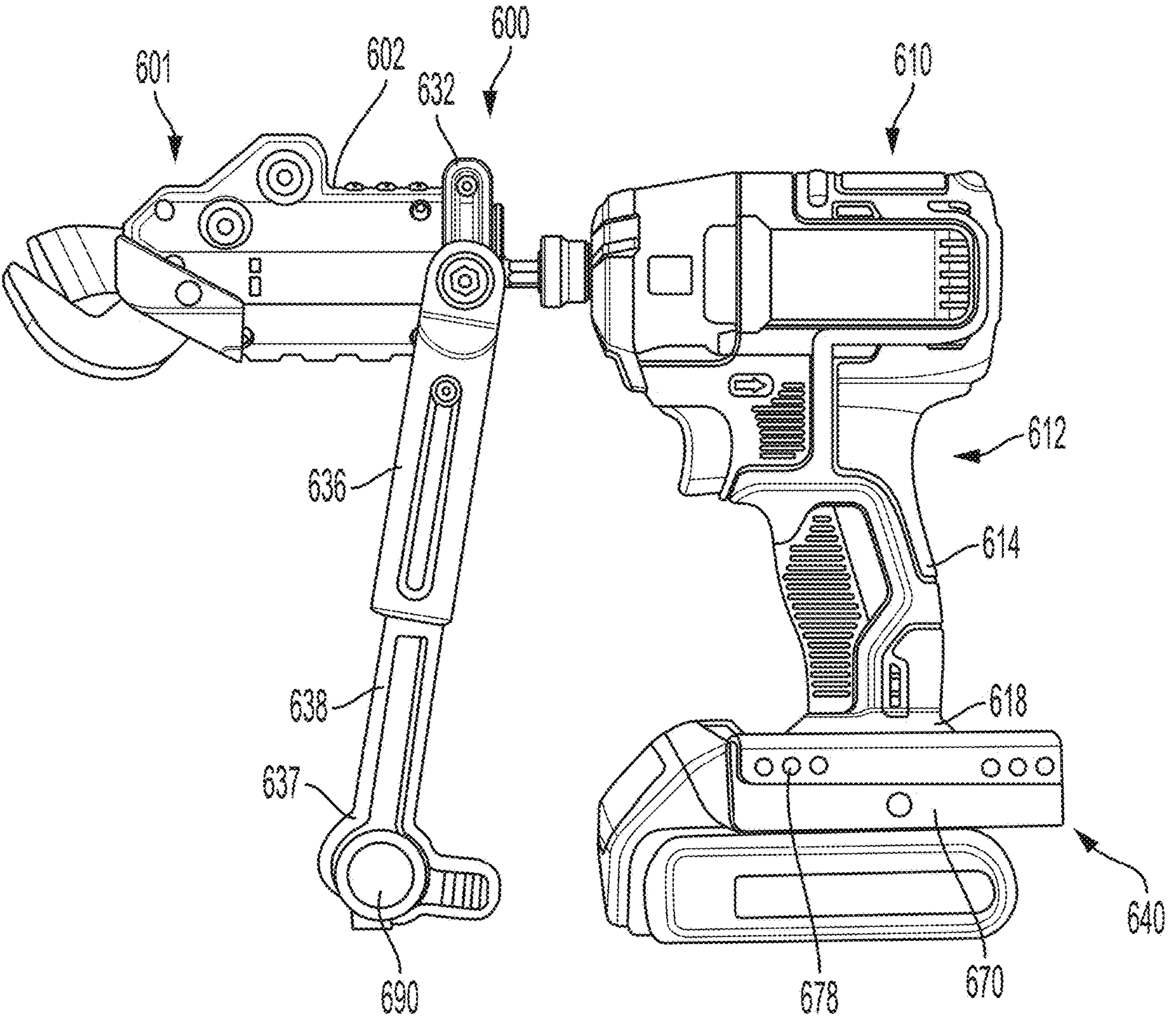
FIG. 28 is a side view of the power tool accessory system of FIG. 27A with the arm assembly decoupled from the clamping assembly.
Figure 29:
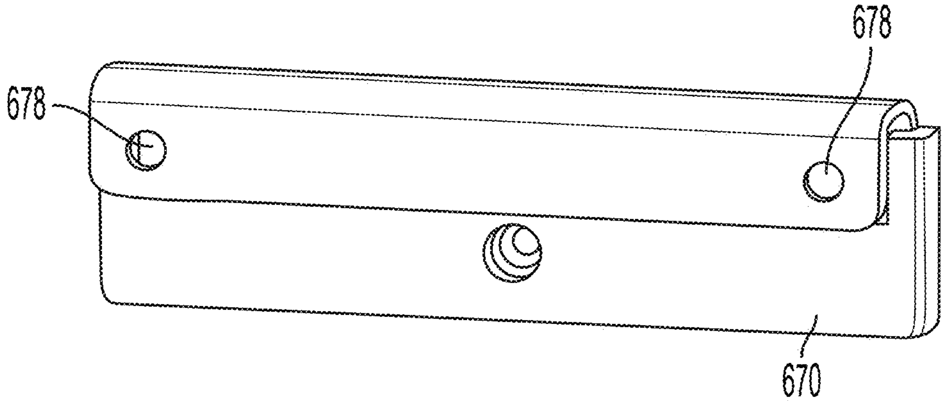
FIG. 29 is a perspective view of an embodiment of a clamping assembly of the power tool accessory system of FIG. 27A.
Figure 30:
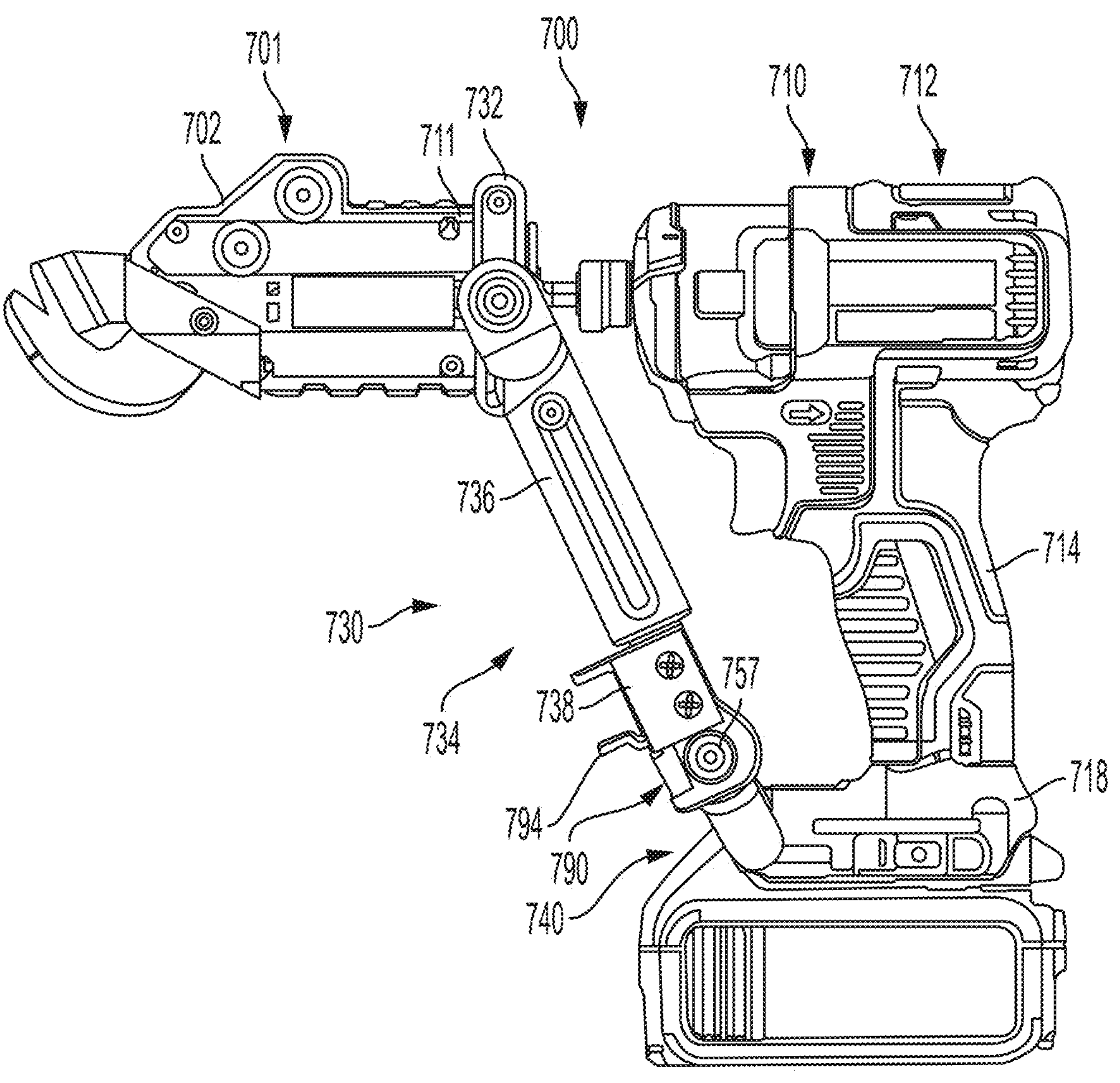
FIG. 30 is a side view of another embodiment of a power tool accessory system.
Figure 31:
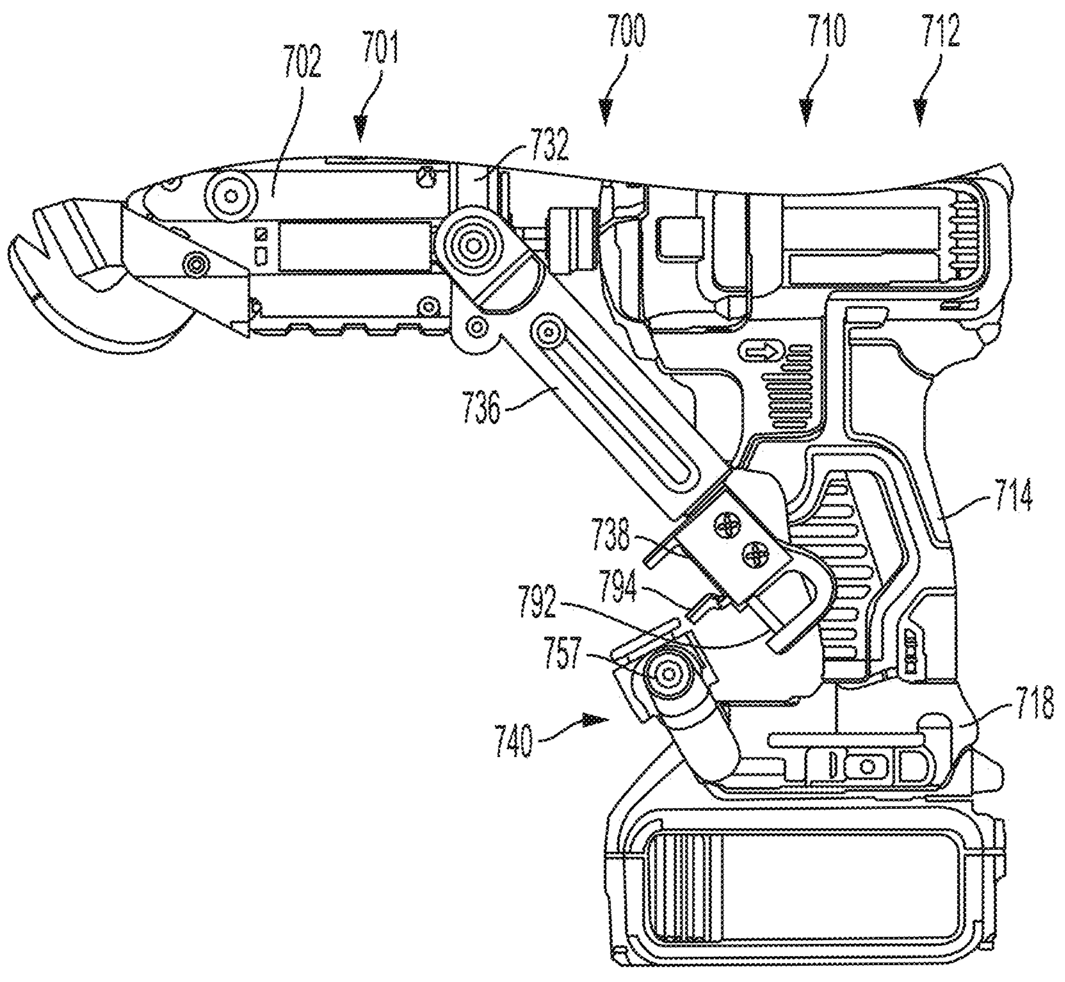
FIG. 31 is a side view of the power tool accessory system of FIG. 30 with the arm assembly decoupled from the clamping assembly.
Figure 32:
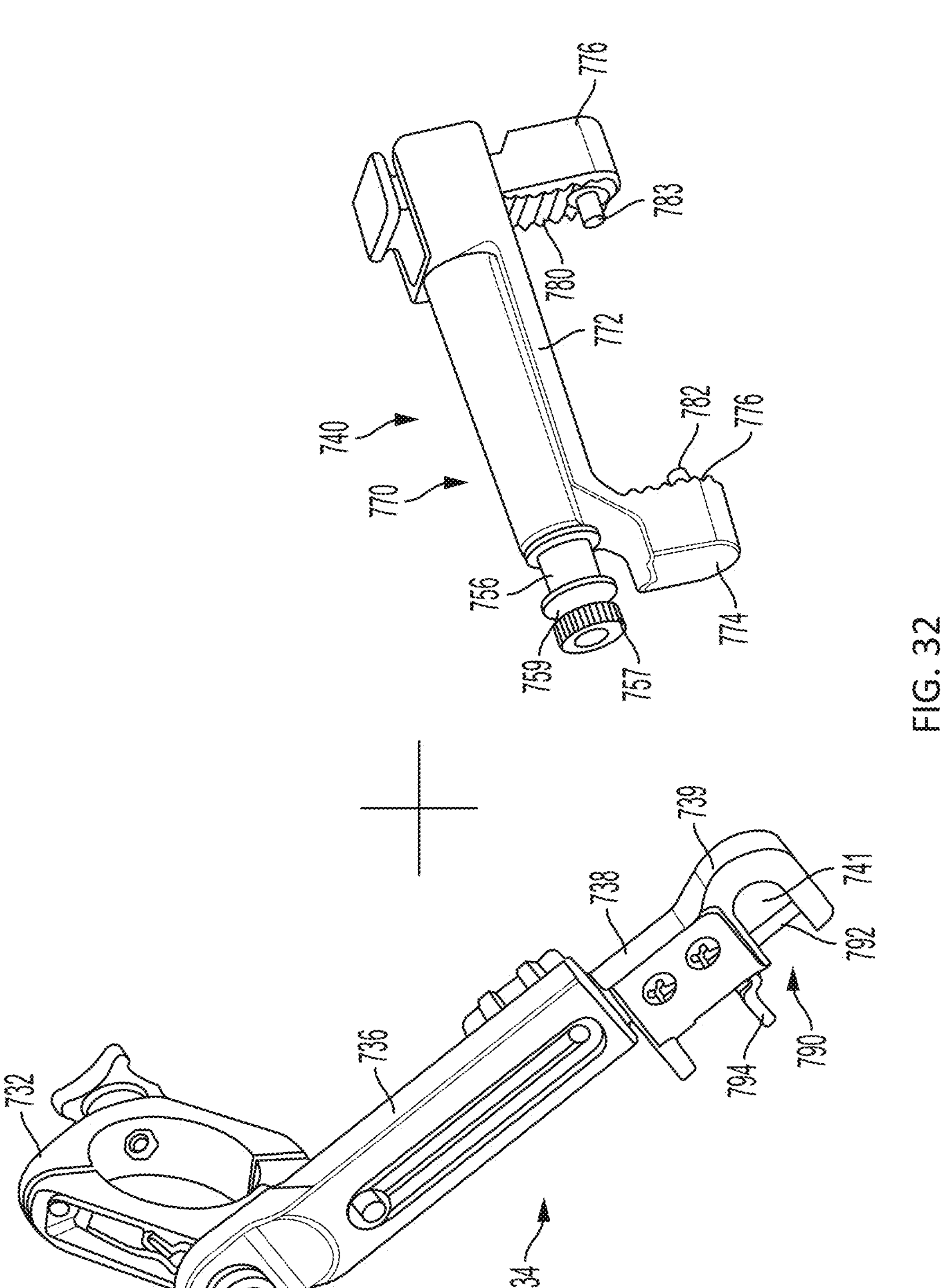
FIG. 32 is an exploded view of embodiments of an arm assembly and a clamping assembly of the power tool accessory system of FIG. 30.
Figure 33:
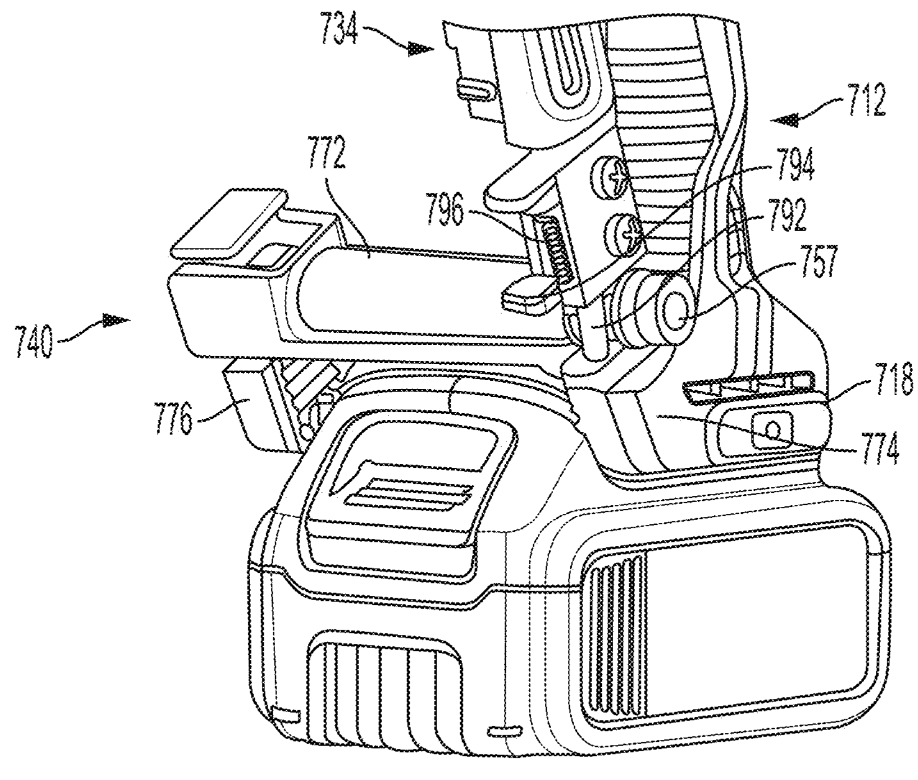
FIG. 33 is a close-up perspective view of a portion of the power tool accessory system of FIG. 30.
Figure 34:
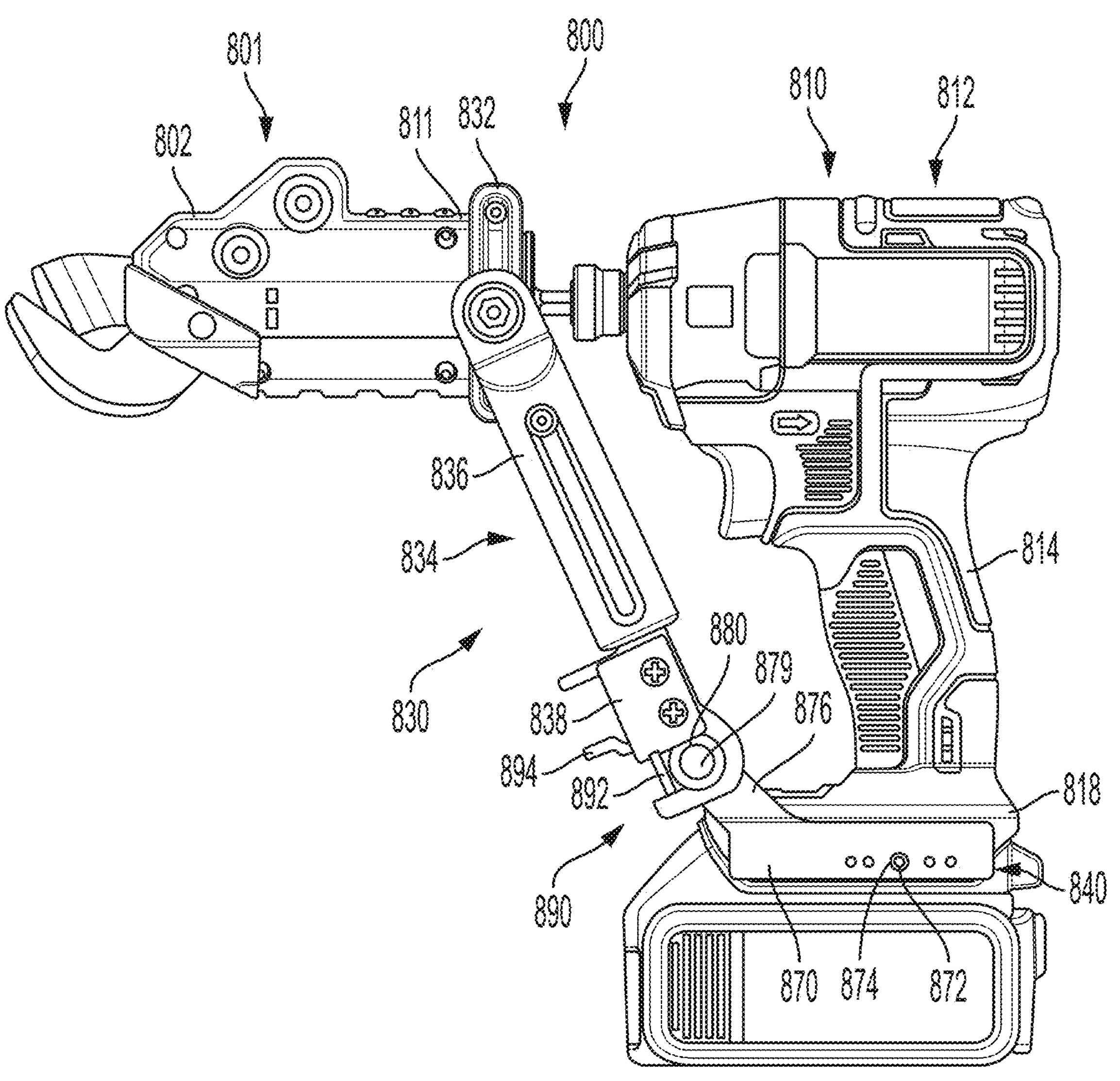
FIG. 34 is a side view of another embodiment of a power tool accessory system.
Figures 35A, 35B:
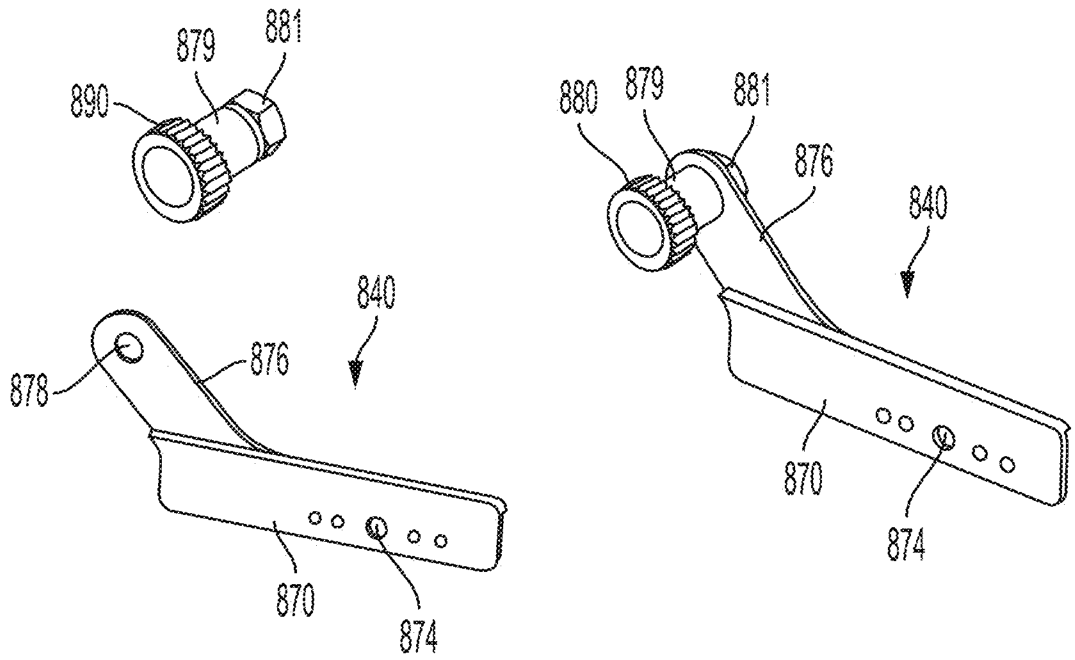
FIG. 35A is an exploded view of a portion of the clamping assembly of the power tool accessory system of FIG. 34.
FIG. 35B is an assembled view of a portion of the clamping assembly of the power tool accessory system of FIG. 34.

Referring to FIGS. 21-22, in another embodiment, a power tool accessory system 400 includes a power tool accessory 401 (which is substantially similar to one of the power tool accessories described above) and a brace 430 that are removably coupled to a power tool 410 (which is the substantially the same as the power tool 10, described above). The brace 430 is configured to adjustably, removably, and rigidly couple the accessory housing 402 to the power tool housing 412 while the input shaft of the accessory 401 rotates relative to the accessory housing 402. The brace 430 includes a collar 432, an arm assembly 434, and a clamping assembly 440 that are substantially similar to the collar 332, arm assembly 334, and clamping assembly 340 illustrated in FIGS. 19-21, with the following differences. Instead of a cord 375, front ends 477*a*, 477*b* of legs 470*a*, 470*b* of the clamping assembly are coupled by a supplemental internally threaded cylinder 475*a* coupled to the first leg 470*a* and a supplemental threaded screw 475*b* coupled to the second leg 470*b*. The supplemental threaded screw 475*b* is threadably received in the supplemental threaded cylinder 475*a*. The screw 475*b* can be rotated in a tightening direction to draw the front ends 477*a*, 477*b* of the legs 470*a*, 470*b* together for enhanced clamping on the base 18 of the power tool housing 12 and can be rotated in a loosening direction to allow removal of the clamping assembly 470 from the base 18 of the power tool housing 12.

Referring to FIGS. 23-26, in another embodiment, a power tool accessory system 500 includes a power tool accessory 501 (which is substantially similar to one of the power tool accessories described above) and a brace 530 that are removably coupled to a power tool 510 (which is the substantially the same as the power tool 10, described above). The brace 530 is configured to adjustably, removably, and rigidly couple the accessory housing 502 to the power tool housing 512 while the input shaft of the accessory 501 rotates relative to the accessory housing 502. The brace 530 includes a collar 532 coupled to a rear end 511 of the accessory housing 502 (which is substantially similar to the collar 132, described above), an arm assembly 534 pivotably coupled to the collar 532, and a clamping assembly 540 configured to be removably and rigidly attached to the base 518 of the handle 514 of the power tool housing 512. The clamping assembly 540 comprises a single leg 570 that is removably attached to either side of the base 518 of the power tool housing 512, e.g., by a threaded fastener 572 that extends through an opening 574 in the leg 570 and into a hole on the base 518 (e.g., a threaded hole that can also receive a threaded fastener for installing a belt clip (not shown). Advantageously, the clamping assembly 540 is removably attachable to either side of the base 518. The leg 570 also includes a flange 576 with one or more U-shaped recesses 578 that are open downward away from the base 518 of the power tool housing 512.

The arm assembly 534 includes a first arm portion 536 and a second arm portion 538. The first arm portion 536 includes a first end portion 535 that is pivotably attached to the collar 532. The second arm portion 538 is telescopically received in a longitudinal opening 560 in the first arm portion 536 and includes a second end portion 537. The second end portion 537 carries a quick release connector 590, e.g., in the form of a handle 592 and a projection (not shown) that is removably receivable in one of the U-shaped recesses 578 in the leg 570. A tension spring 539 couples the first arm portion 536 to the second arm portion 538 and biases the second arm portion 538 toward the first arm portion. In use, the handle 592 of the quick release connector 590 may pull the second arm portion 538 partially out of the first arm portion 536 and to remove the projection 594 from the U-shaped recess to release the arm assembly 534 from the clamping assembly 570, without the use of a secondary tool, while the clamping assembly remains rigidly coupled to the base 518 of the power tool housing 512. When it is desired to decouple the arm assembly 534 from the clamping assembly 570, the quick release connector 590 is actuated to pull the second arm portion partially out of the first arm portion, which pulls the projection of the quick release connector 590 out of the U-shaped recess. This enables the arm assembly 534 to be removable from the clamp assembly 540, without the use of a secondary tool, while the clamp assembly 540 remains rigidly coupled to the tool housing 512 to enable removal of the power tool accessory 501 from the power tool 510.

Referring to FIGS. 27A-29, in another embodiment, a power tool accessory system 600 includes a power tool accessory 601 (which is substantially similar to one of the power tool accessories described above) and a brace 630 that are removably coupled to a power tool 610 (which is the substantially the same as the power tool 10, described above). The brace 630 is configured to adjustably, removably, and rigidly couple the accessory housing 602 to the power tool housing 612 while the input shaft of the accessory 601 rotates relative to the accessory housing 602. The brace 630 includes a collar 632 coupled to a rear end 611 of the accessory housing 602 (which is substantially similar to the collar 132, described above), an arm assembly 634 pivotably coupled to the collar 632, and a clamping assembly 640 configured to be removably and rigidly attached to either side of the base 618 of the handle 614 of the power tool housing 612. The arm assembly 634 and the clamping assembly 640 are substantially similar to the arm assembly 534 and clamping assembly 540, with the following differences.

The clamping assembly 640 includes a single leg 670 and a flange 676, similar to the single leg 570 and flange 576, except for the following differences. The flange 676 has one or more circular openings 678. The arm assembly 634 has a second end portion 637 that carries a quick release connector 690, e.g., in the form of a handle 692 and a push button 691. The push button 691 engages a pin 693, which in turn engages a release arm 694 that is removably received between the flange 676 and the base of the power tool. When it is desired to decouple the arm assembly 634 from the clamping assembly 670, the push button 691 is actuated, pushing the pin 691 to move the release arm 694 away from the flange 676, which enables removal of the arm assfrom the clamping assembly 640. This enables the arm assembly 634 to be removable from the clamp assembly 640, without the use of a secondary tool, while the clamp assembly 640 remains rigidly coupled to the tool housing 612 to enable removal of the power tool accessory 601 from the power tool 610.

Referring to FIGS. 30-33, in another embodiment, a power tool accessory system 700 includes a power tool accessory 701 (which is substantially similar to one of the power tool accessories described above) and a brace 730 that are removably coupled to a power tool 710 (which is the substantially the same as the power tool 10, described above). The brace 730 is configured to adjustably, removably, and rigidly couple the accessory housing 702 to the power tool housing 712 while the input shaft of the accessory 701 rotates relative to the accessory housing 702. The brace 730 includes a collar 732 coupled to a rear end 711 of the accessory housing 702 (which is substantially similar to the collar 132, described above). The brace 730 also includes an arm assembly 734 and a clamping assembly 740 that are substantially similar to the arm assembly 134 and clamping assembly 140 described in the aforementioned U.S. Pat. No. 9,701,032, with the following differences.

The clamping assembly 740 includes a bracket 770 with a cross-bar 772, a first leg 774 connected to one end of the cross-bar 772, and a second leg 778 coupled to an opposite end of the cross-bar 772. The cross-bar 772 receives a threaded rod 756 with a knurled head 757 and an annular recess 759 adjacent the head 757. Knurled head 757 is rotatable by a user in a tightening direction to draw the legs 774, 778 toward one another to rigidly engage a front of the base 718 of the tool housing 712 and is rotatable by the user in a loosening direction to disengage the clamping assembly 740 from the tool housing 712. The legs 774, 778 each may include a plurality of ridges or protrusions 776, 780 and/or a spike or pin 782, 783. The ridges or protrusions 776, 780 and the spikes or pins 782, 783 enhance gripping of the power tool housing 712 by the legs 774, 778 of the clamping assembly 740.

The arm assembly 734 includes a first arm portion 736 and a second arm portion 738. The first arm portion 736 is pivotably attached to the collar 732. The second arm portion 738 is telescopically received in a longitudinal opening in the first arm portion 736 so that the length of the arm assembly 734 is user adjustable. The second arm portion 738 includes a hook 739 defining a U-shaped recess 741 at its bottom end 737 that is configured to removably engage the annular recess 759 on the threaded rod 756. The open end of the U-shaped recess 741 includes a quick release connector 790 comprised of a moveable pin 792 and an actuator switch 794. The pin 792 is biased by a spring 796 toward a closed position in which the pin 742 closes the U-shaped recess 771. The actuator switch 794 is moveable parallel to the arm assembly against the force of the spring 796 to retract the pin 792 from the hook 739 and unblock the U-shaped recess 771. When it is desired to decouple the arm assembly 734 from the clamping assembly 770, the actuator switch 794 of the quick release connector 790 is actuated against the force of the spring 796 to unblock the U-shaped recess 791. This enables the arm assembly 734 to be removable from the clamp assembly 740, without the use of a secondary tool, while the clamp assembly 740 remains rigidly coupled to the tool housing 712 to enable removal of the power tool accessory 701 from the power tool 710.

Referring to FIGS. 34-38, in another embodiment, a power tool accessory system 800 includes a power tool accessory 801 (which is substantially similar to one of the power tool accessories described above) and a brace 830 that are removably coupled to a power tool 810 (which is the substantially the same as the power tool 10, described above). The brace 830 is configured to adjustably, removably, and rigidly couple the accessory housing 802 to the power tool housing 812 while the input shaft of the accessory 801 rotates relative to the accessory housing 802. The brace 830 includes a collar 832 coupled to a rear end 811 of the accessory housing 802 (which is substantially similar to the collar 132, described above). The brace 830 also includes an arm assembly 834 that is substantially similar to the arm assembly 734 described above.

Figure 36B:
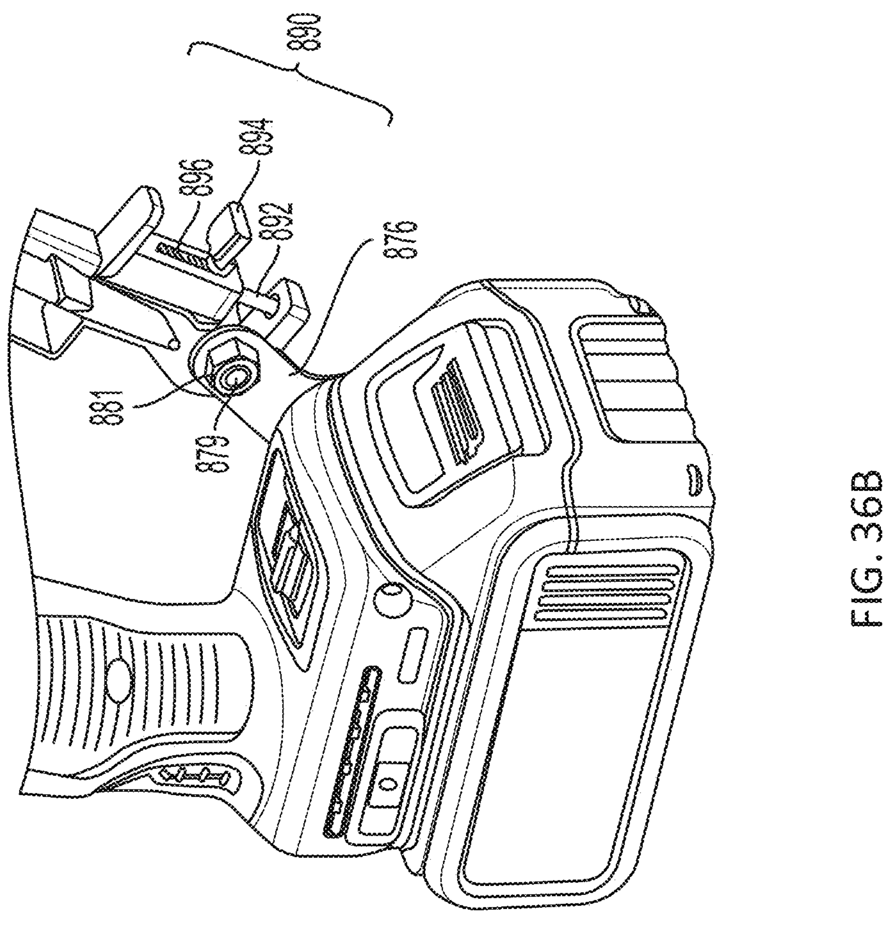
FIGS. 36A and 36B are close-up perspective views of portions of the power tool accessory system of FIG. 34.
Figure 36A:
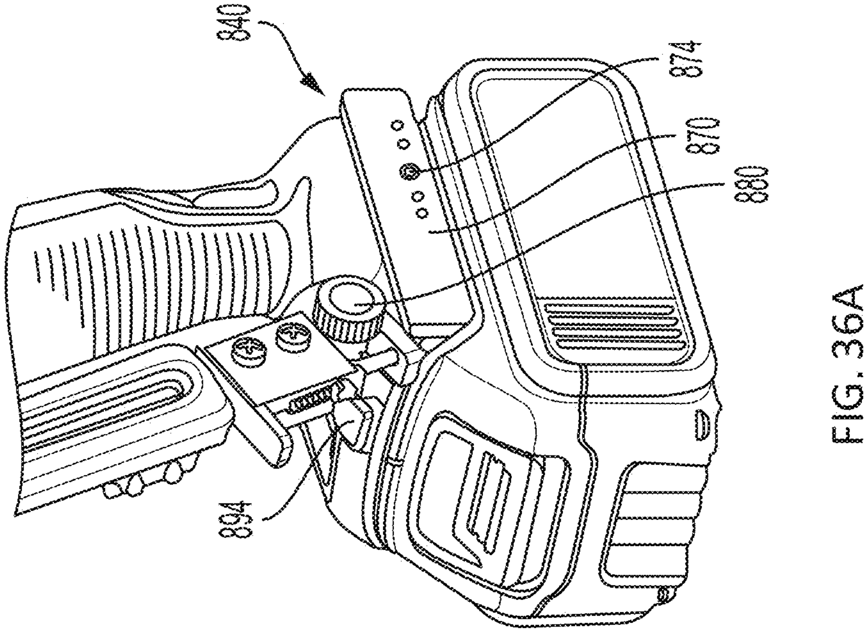
Figure 37:
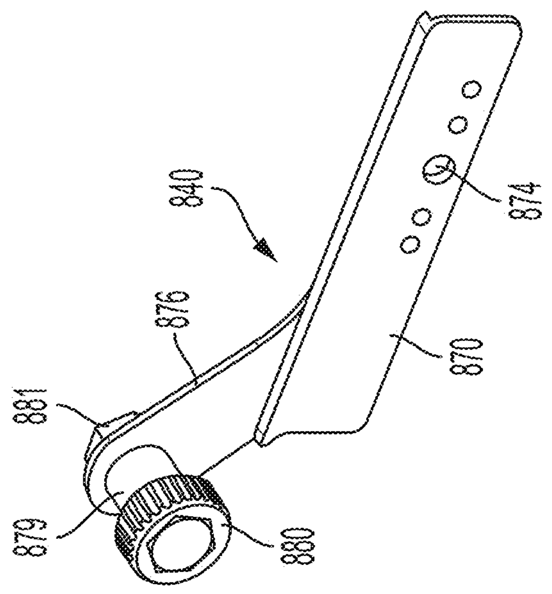
FIG. 37 is an exploded view of embodiments of an arm assembly and a clamping assembly of the power tool accessory system of FIG. 30.
Figure 37:
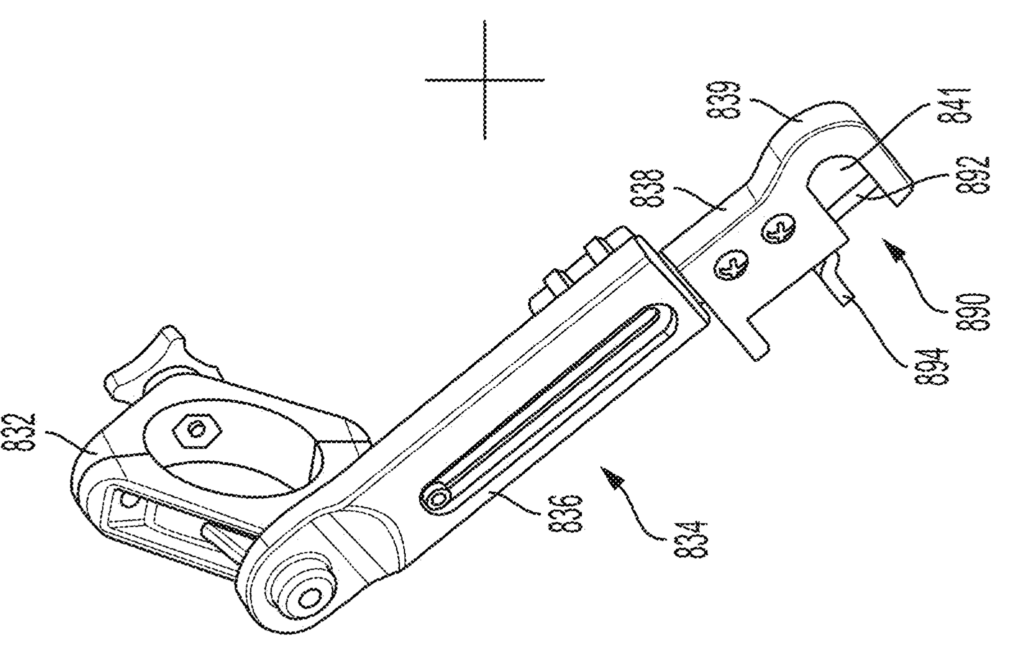
Figure 38:
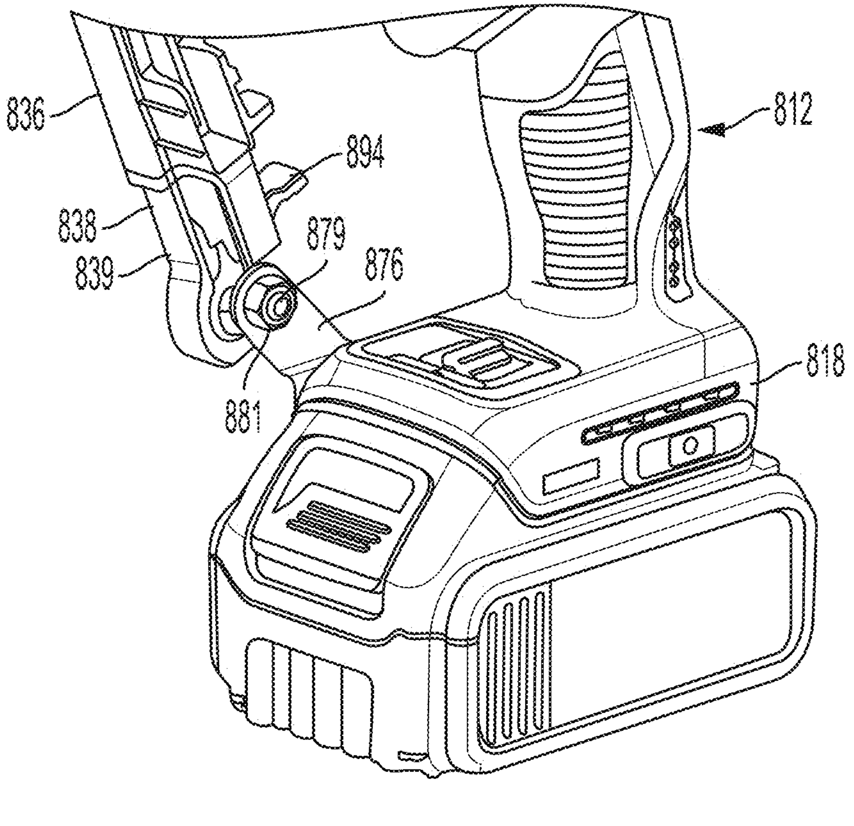
FIG. 38 is aclose-up perspective views of portions of the power tool accessory system of FIG. 34.

The brace 830 also includes a clamping assembly 840 configured to be removably and rigidly attached to the base 818 of the handle 814 of the power tool housing 812. The clamping assembly 840 comprises a single leg 870 that is removably attached to either side of the base 818 of the power tool housing 812, e.g., by a threaded fastener 872 that extends through an opening 874 in the leg 870 and into a hole on the base 818 (e.g., a threaded hole that can also receive a threaded fastener for installing a belt clip (not shown). Advantageously, the clamping assembly 840 is removably attachable to either the right side (as shown in FIGS. 36A-36B) or the left side (as shown in FIG. 38) of the base 818. The leg 870 also includes an angled flange 876 with a hole 878 that removably receives a shaft 879 with an enlarged head 890 and a locking nut 881.

Like the arm assembly 734, the arm assembly 834 includes a second arm portion 838 telescopically received in a first arm portion 836 with a hook 839 defining a U-shaped recess at a bottom end 837 of the second arm portion 838. The hook and U-shaped recess are configured to removably engage the shaft 879 that is coupled to the clamping assembly 840 between the enlarged head 880 and the angled flange 876. The open end of the U-shaped recess includes a quick release connector 890 comprised of a moveable pin 892 and an actuator switch 894. The pin 892 is biased by a spring 896 toward a closed position in which the pin 842 closes the U-shaped recess 871. The actuator switch 894 is moveable parallel to the arm assembly against the force of the spring 896 to retract the pin 892 from the hook 839 and unblock the U-shaped recess 871. When it is desired to decouple the arm assembly 834 from the clamping assembly 870, the actuator switch 894 of the quick release connector 890 is actuated against the force of the spring 896 to unblock the U-shaped recess 891. This enables the arm assembly 834 to be removable from the clamp assembly 840, without the use of a secondary tool, while the clamp assembly 840 remains rigidly coupled to the tool housing 812 to enable removal of the power tool accessory 801 from the power tool 810.

Figure 39:
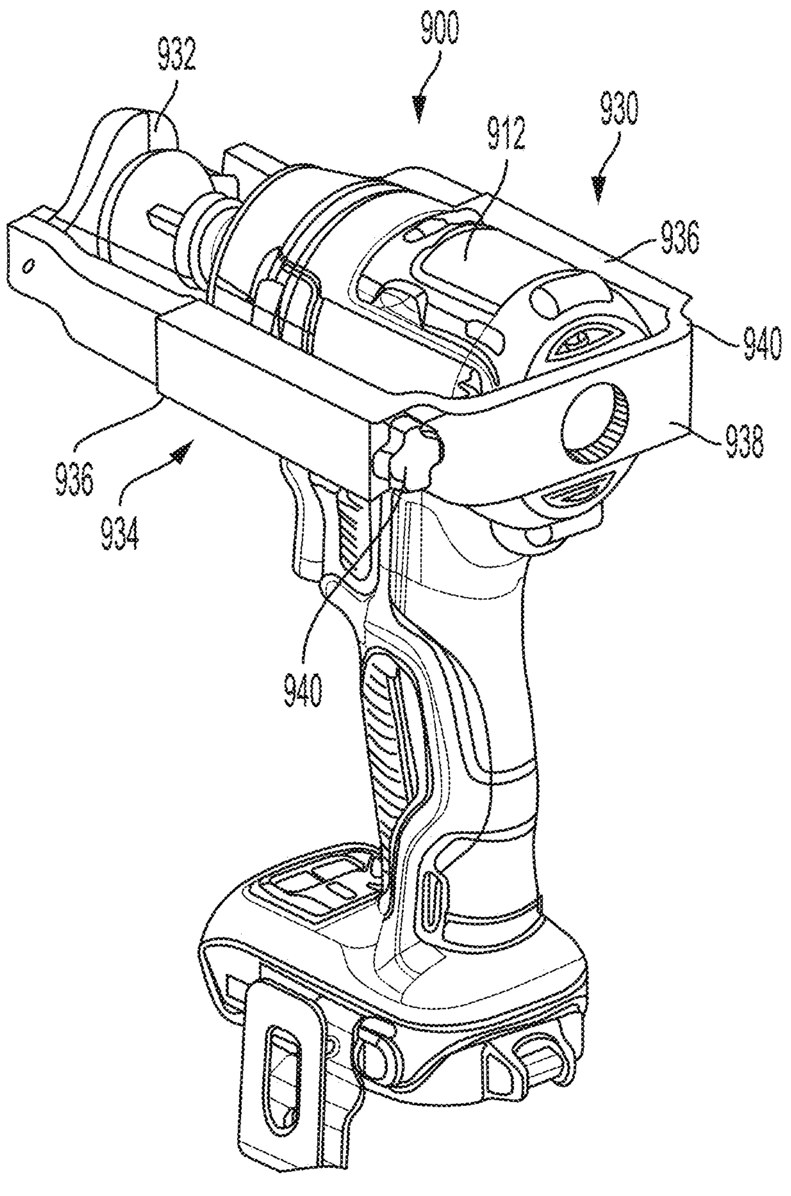
FIG. 39 is a perspective view of another embodiment of a power tool accessory system.
Figure 40:
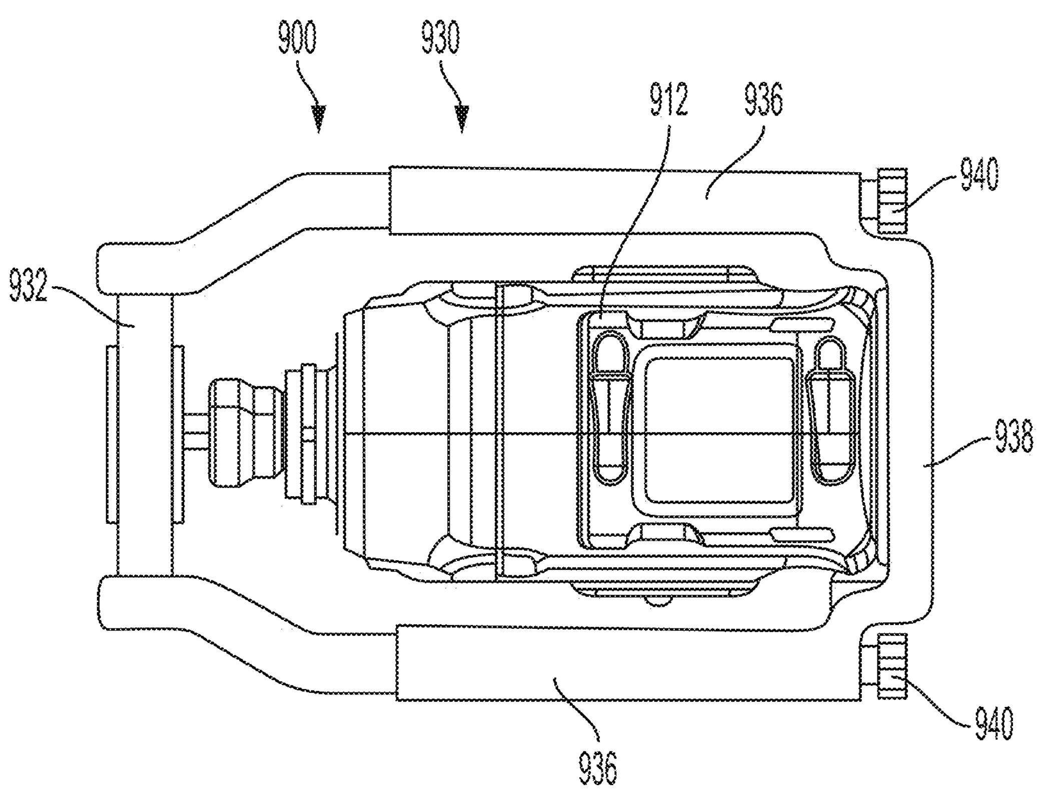
FIG. 40 is a top view of the power tool accessory system of FIG. 39.

Referring to FIGS. 39-40, in another embodiment, a power tool accessory system 900 includes a brace 930 with a collar 932 coupled to a housing of a power tool accessory (not shown) and an arm assembly 934 pivotally coupled to the collar 932. The arm assembly 934 includes a pair of parallel arms 936, each telescopically adjustable for length, and a rear clamping plate 938 connected to the parallel arms 936. A pair of threaded rods 940 are received in the rear clamping plate 938 and in the parallel arms 936 and can be rotated to telescopically adjust the length of the arms 936 and draw the rear clamping plate 938 toward a rear end of the tool housing 912 to clamp the arm assembly 934 to the tool housing 912.

Figure 41:
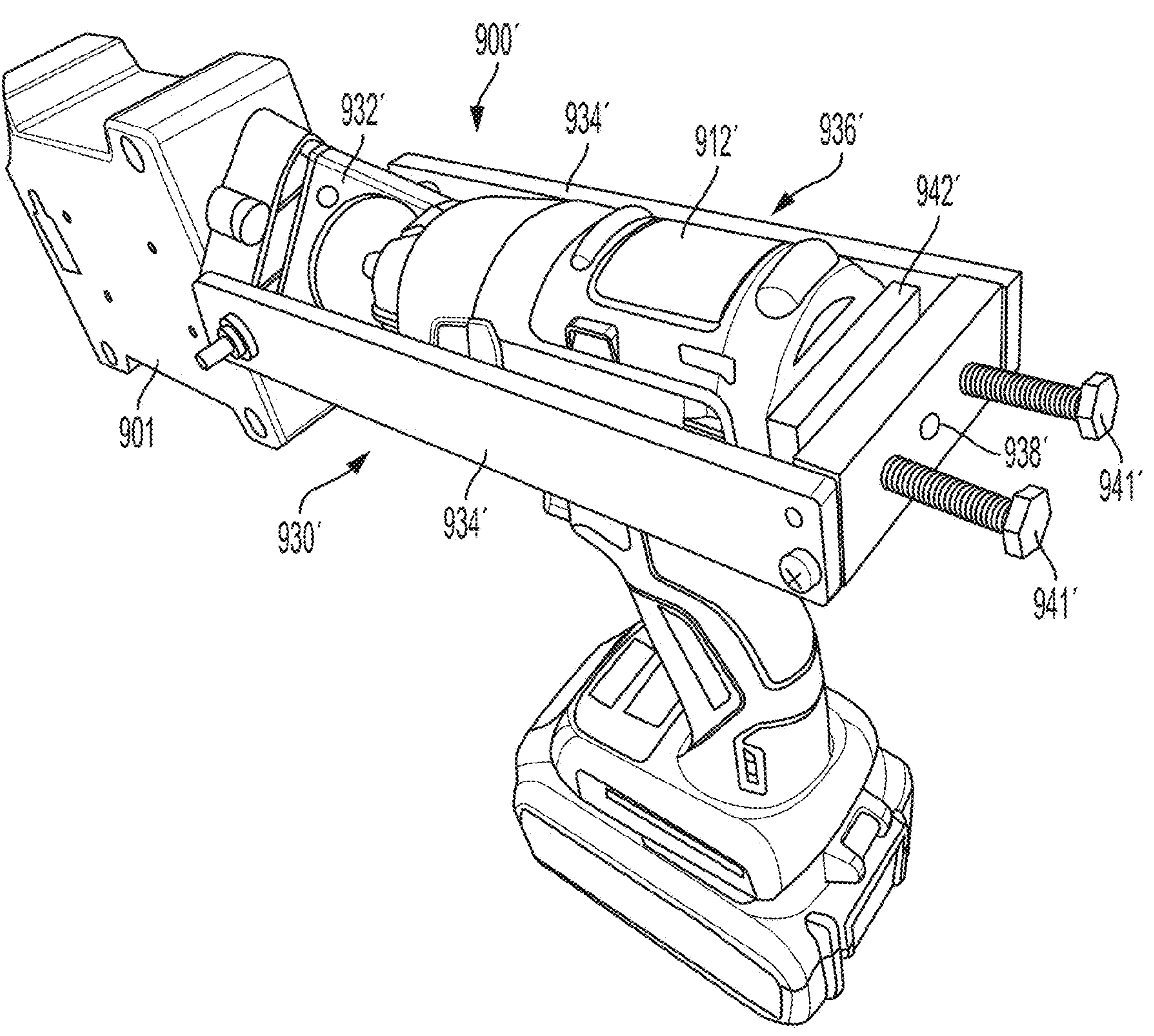
FIG. 41 is a perspective view of another embodiment of a power tool accessory system.

Referring to FIG. 41, in another embodiment, a power tool accessory system 900' is substantially similar to the power tool accessory system 900, except for the following differences. The power tool accessory system 900' includes a brace 930' with an arm assembly 936' including non-telescoping parallel arms 934' pivotally coupled to a collar 932' that engages a housing of a power tool accessory 901'. Coupled to arms 936' is a rear cross-bar 938'. The cross-bar 938' carries one or more clamping screws 941', which are coupled to a rear clamping plate 942'. The clamping screws 941' can be rotated to axially move the rear clamping plate 942' to engage a rear end of the tool housing 912' to clamp the arm assembly 934' to the tool housing 912'.

Figure 42:
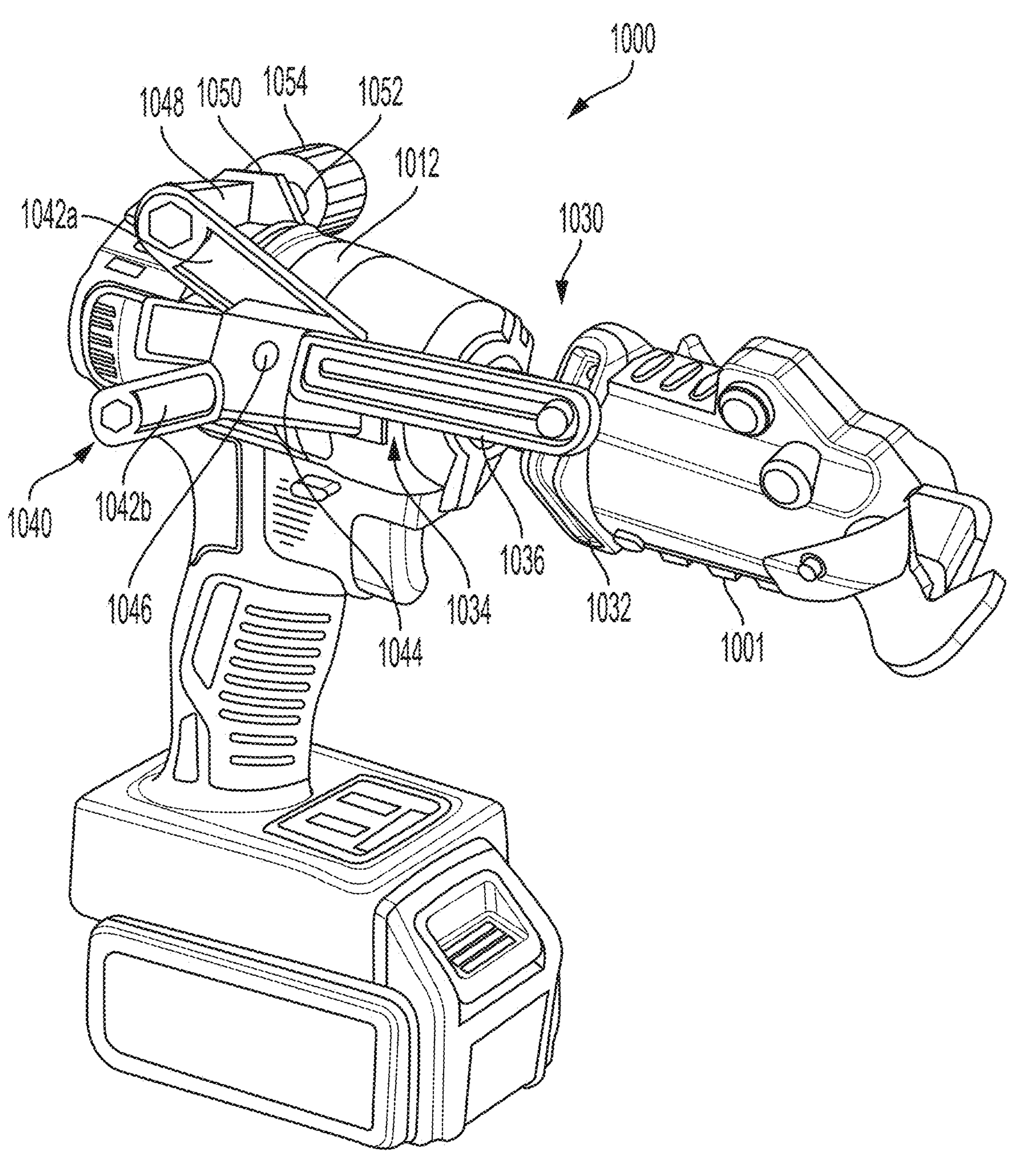
FIG. 42 is a perspective view of another embodiment of a power tool accessory system.

Referring to FIG. 42, in another embodiment, a power tool accessory system 1000 includes a brace 1030 with a collar 1032 coupled to a housing of a power tool accessory 1001 and an arm assembly 1034 pivotally coupled to the collar 1032. The arm assembly 1034 includes one or more arms 1036 (e.g., a single arm as illustrated or two parallel arms) pivotally coupled at a front end to the collar 1032 and at a rear end to a clamping assembly 1040. The arm 1036 is configured to extend along a side of the tool housing 1012 generally parallel to a tool axis. The clamping assembly 1040 includes two legs 1042*a*, 1042*b* connected in a V-shape at a vertex portion 1044 and configured to rest against a side of the tool housing 1012. The vertex portion 1044 includes a slot that telescopically receives the arm 1036 and a set screw 1046 for engaging the arm 1036 to releasably retain the arm in an axial position relative to the legs 1042*a*, 1042*b*. At an opposite end of at least one of the legs 1042*a*, 1042*b* is a cross-bar 1048 configured to extend across a top and/or bottom of the tool housing 1012. The other end of the cross-bar is coupled to a clamping plate 1050 configured to engage the opposite side of the tool housing 1012. The cross bar 1048 receives a threaded shaft 1052 with an adjustment knob 1054. The adjustment knob 1054 can be rotated to draw the clamping plate 1050 toward the legs 1042*a*, 1042*b* to releasably clamp the clamping assembly 1040 to the tool housing 1012. The set screw 1046 can be loosened to allow removal of the arm assembly 1034 from the clamping assembly 1040, without use of a secondary tool, while the clamping assembly 1040 remains rigidly attached to the tool housing 1012.

Figure 43:
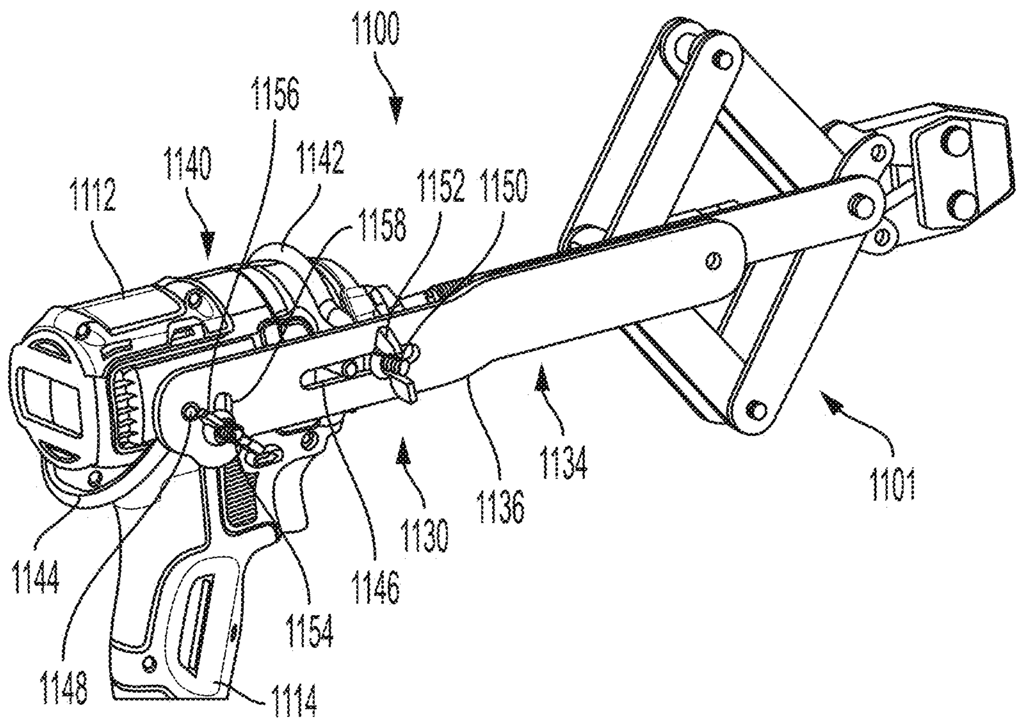
FIGS. 43-46 are perspective views of another embodiment of a power tool accessory system.
Figure 44:
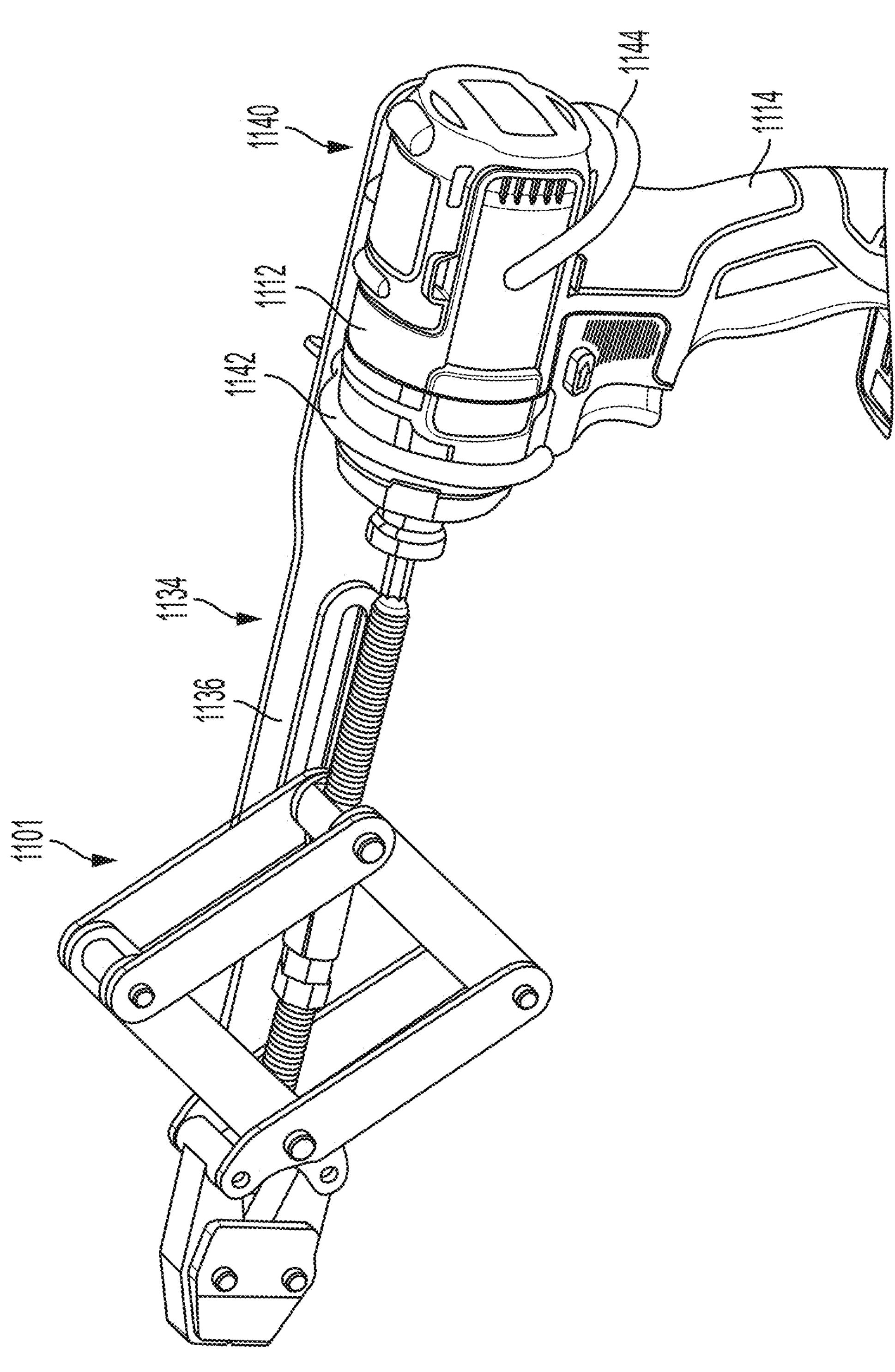
Figure 45:
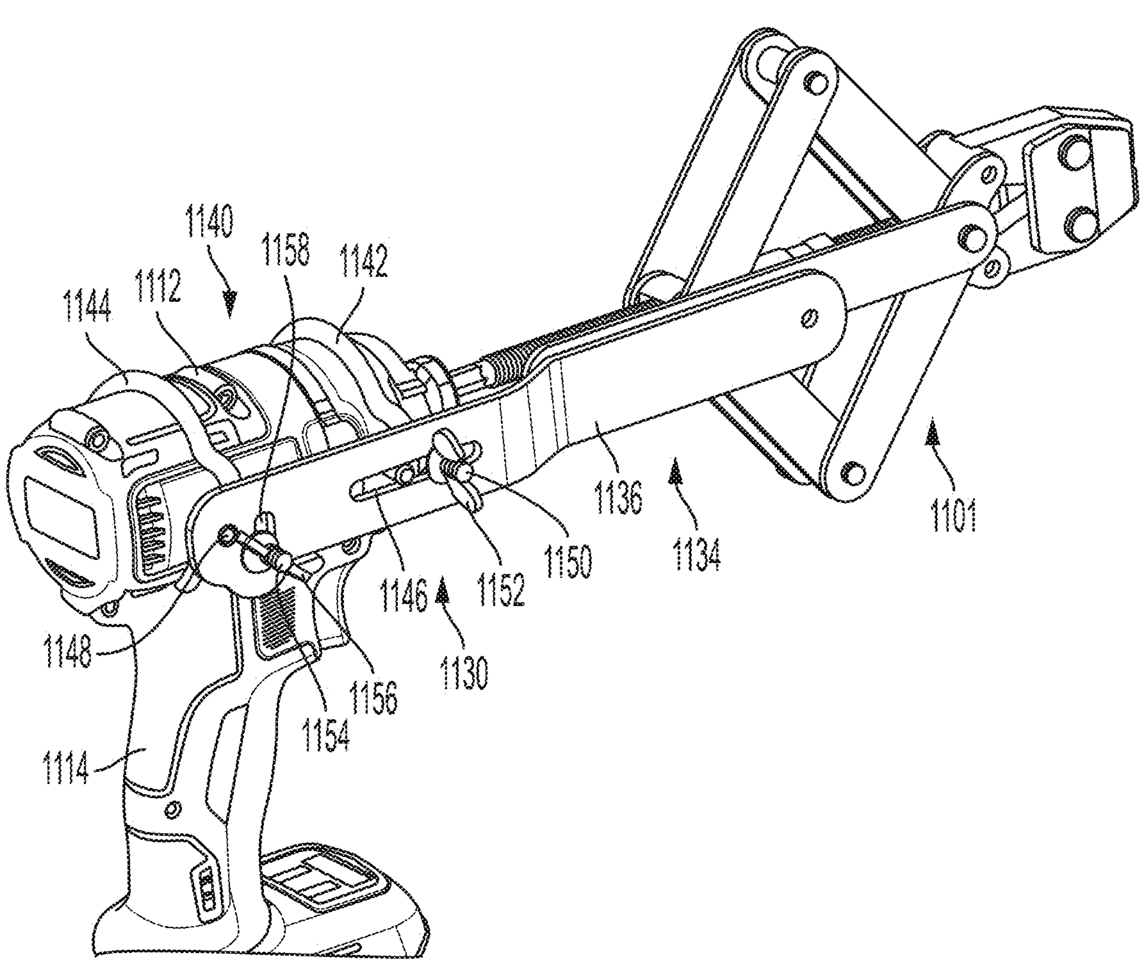
Figure 46:
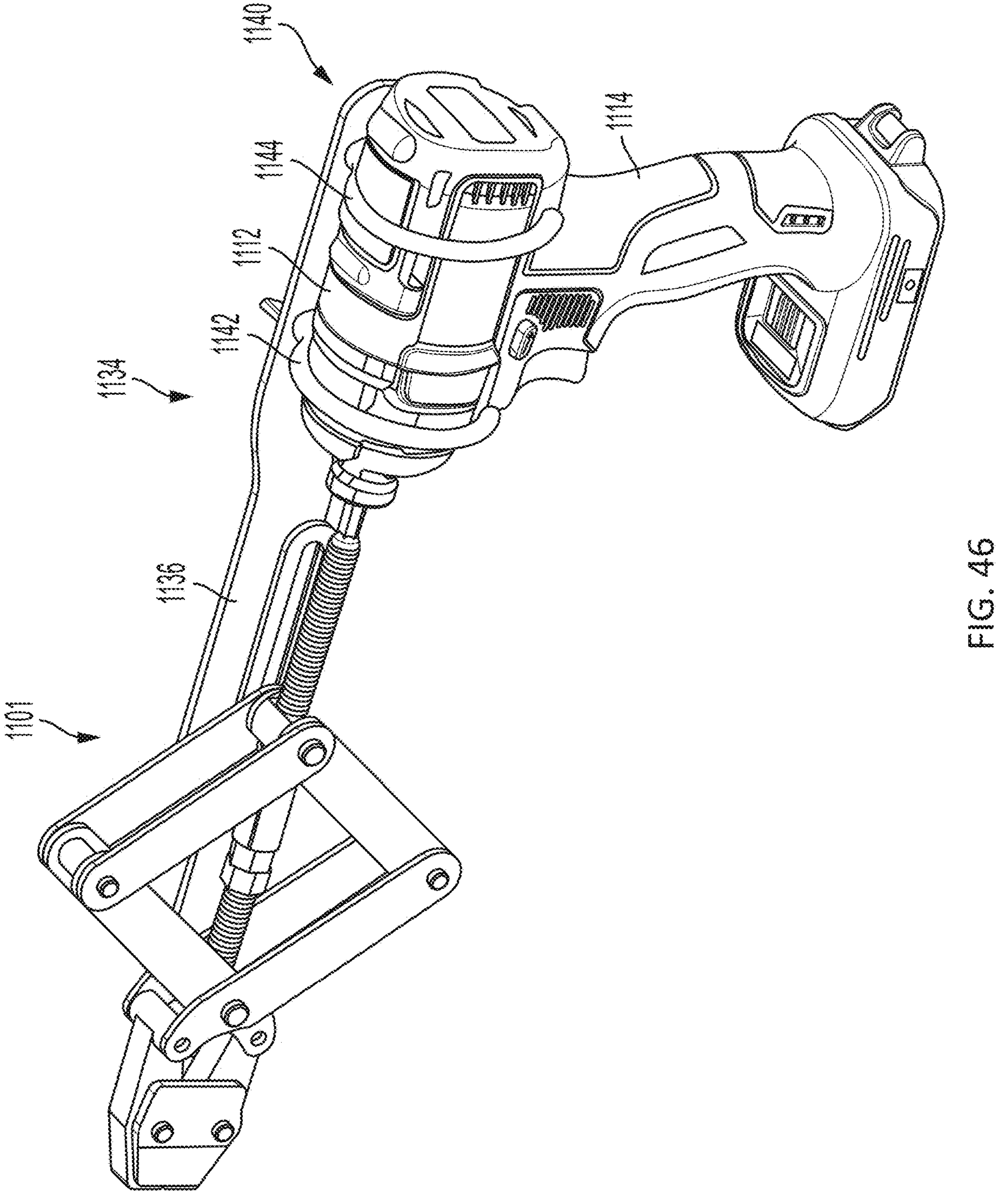

Referring to FIGS. 43-46, in another embodiment, a power tool accessory system 1100 includes a brace 1130 pivotally coupled to a power tool accessory 1101. The brace 1130 includes a clamping assembly 1140 and an arm assembly 1134 that includes one or more arms 1136 (e.g., a single arm as illustrated or two parallel arms) configured to extend along a side of the tool housing 1112 generally parallel to a tool axis. The clamping assembly 1140 includes two C-shaped legs 1142, 1144 pivotally coupled to the arm 1136. The front leg 1142 is received in a longitudinal slot 1146 to be axially movable relative to the arm 1136. The rear leg 1144 is pivotally connected to the arm 1136 at a fixed point 1148. The front C-shaped leg 1142 is configured to be coupled across a top of the tool housing 1112 in front of the handle 1114 and can be axially adjustable along the tool housing 1112. The rear C-shaped leg 1144 is configured to be coupled across a bottom of the tool housing 1112 (as shown in FIGS. 43-44) or across a top of the tool housing 1112 (as shown in FIGS. 45-46) rearward of the handle 1114. The longitudinal slot 1146 also carries a front threaded screw 1150 coupled to a front wing nut 1152. The front wing nut 1152 can be tightened to clamp the front threaded screw 1150 against a side of the tool housing 1112. The rear end of the arm 1136 includes a vertical slot 1158 that receives a rear threaded screw 1154 coupled to a rear wing nut 1156. The rear wing nut 1156 can be tightened to clamp the rear threaded screw 1154 against a side of the tool housing 1112.

Figure 47:
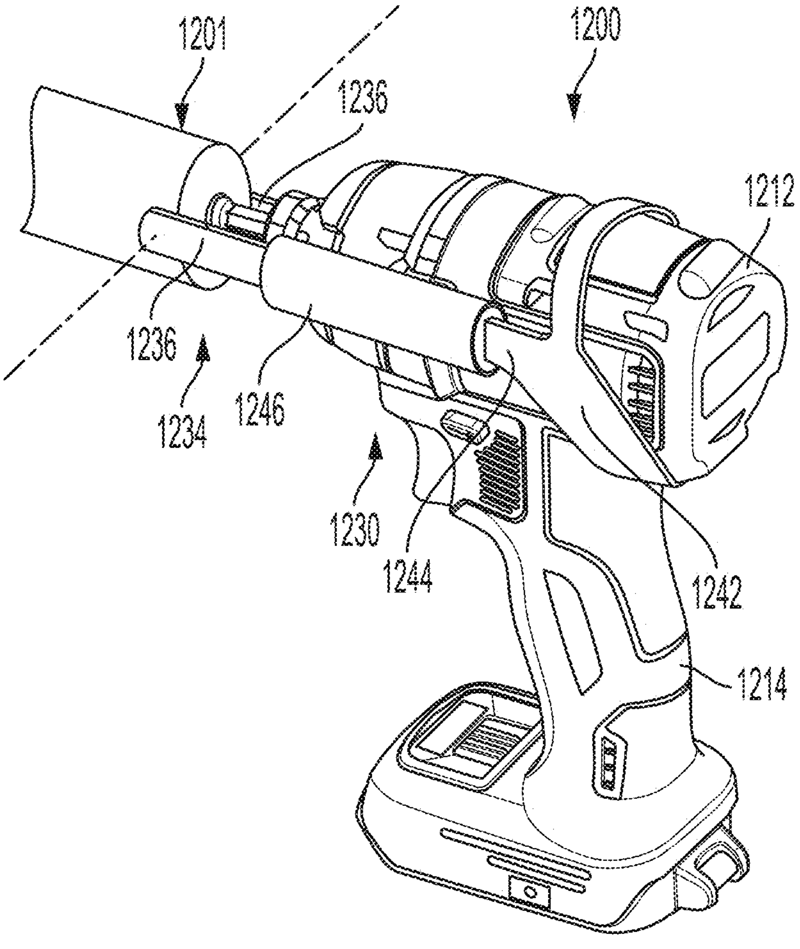
FIG. 47 is a perspective view of another embodiment of a power tool accessory system.
Figure 48:
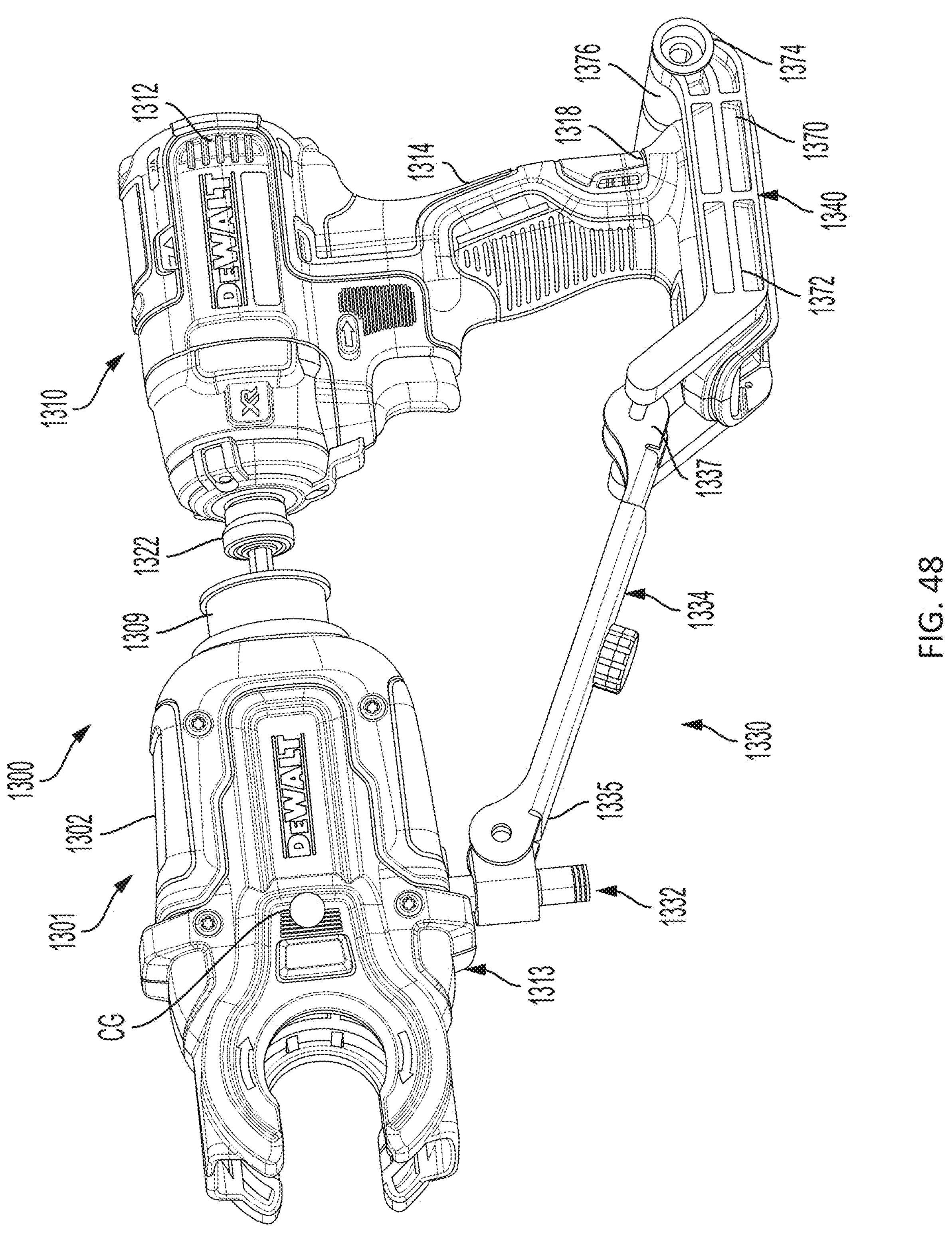
FIG. 48 is a perspective view of another embodiment of a power tool accessory system.

Referring to FIG. 47, in another embodiment, a power tool accessory system 1200 includes a brace 1230 pivotally coupled to a power tool accessory 1201. The brace 1230 includes an arm assembly 1234 and a clamping assembly 1240. The arm assembly 1234 includes a pair of parallel front arms 1236 pivotably coupled to the housing of the power tool accessory 1201. Alternatively, the arms 1236 may be pivotably coupled to a collar, similar to collar 132, with the collar 132 coupled to the housing of the power tool accessory in a manner similar to the above-described embodiments. The clamping assembly 1240 includes a C-shaped or annular ring 1242 configured to wrap around the power tool housing 1212 rearward of the handle 1214 and across the top of the tool housing 1212 and a pair of legs 1244 extending axially forward from the collar 1242. The arms 1236 and the legs 1244 are adjustably received in an adjustment shaft 1246 that includes a threaded adjustment member with tension springs (not shown). The adjustment shaft 1246 can be rotated to draw the arms 1236 and legs 1244 toward one another so that the ring 1242 exerts a clamping force on the housing 1212.

Referring to FIGS. 48-56, in another embodiment, a power tool accessory system 1300 includes a power tool accessory 1301 (e.g., a pipe cutting accessory like the one described in with respect to FIG. 11C above) and a brace 1330 that are removably coupled to a power tool 1310 (which is the substantially the same as the power tool 10, described above). The brace 1330 is configured to adjustably, removably, and rigidly couple the accessory housing 1302 to the base or battery receptacle of the power tool housing 1312 while the input shaft of the accessory 1301 rotates relative to the accessory housing 1302. The brace 1330 includes a holder 1332 that can be releasably coupled to a mid-portion 1313 of the accessory housing 1302 approximately in line with the center of gravity CG of the accessory 1301, a clamping assembly 1340 configured to be removably and rigidly attached to the base 1318 of the handle 1314 of the power tool housing 1312, and an arm assembly 1334 having a first end portion 1335 pivotally coupled to the holder 1332 and an opposite second end portion 1337 pivotally coupled to the clamping assembly 1340. As described further below, the second end portion 1337 of the arm assembly 1334 is configured to be removable from the clamp assembly 1340, without the use of a secondary tool, while the clamp assembly 1340 remains rigidly coupled to the tool housing 1312 to enable removal of the power tool accessory 1301 from the end effector 1322 of the power tool 1310. In other embodiment, removal of the arm assembly from the clamp assembly may require the use of a secondary tool.

Figure 49:
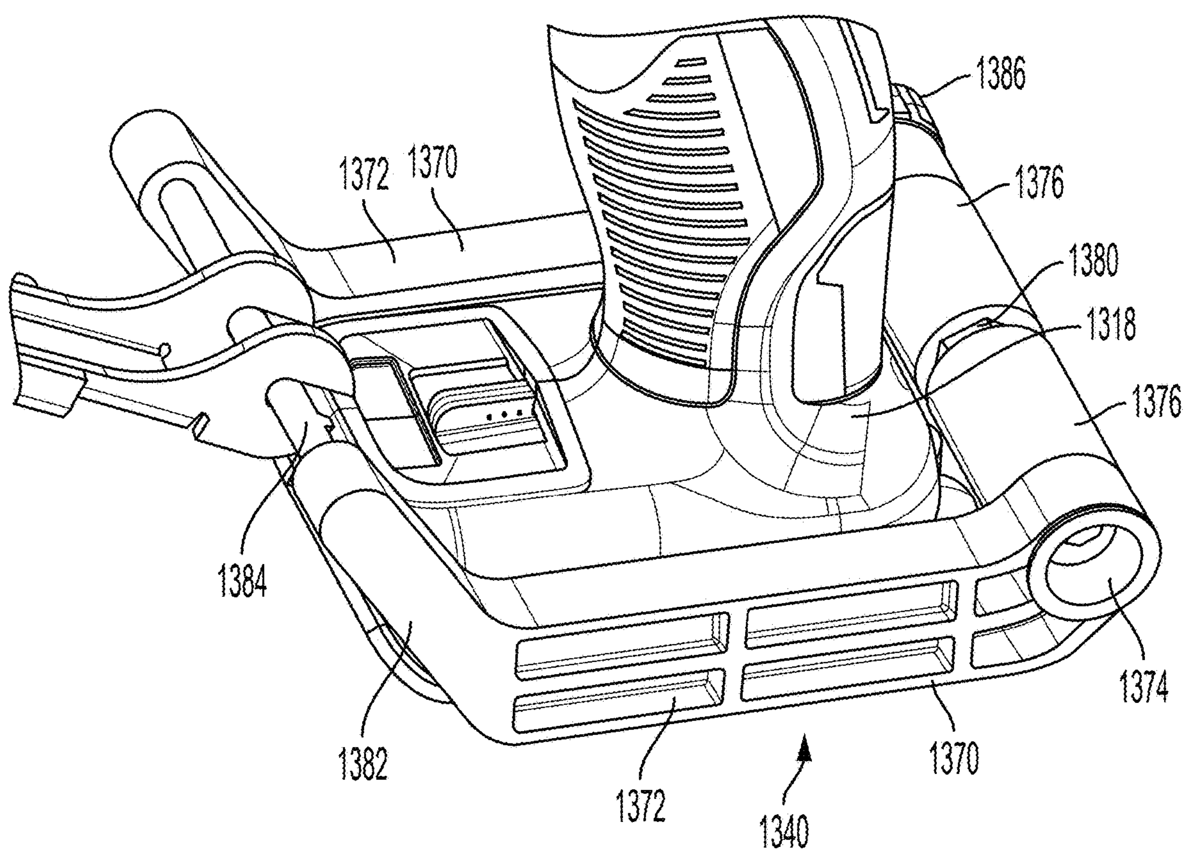
FIG. 49 is a close-up perspective view of the clamping assembly of the power tool accessory system of FIG. 48.

Referring also to FIG. 49, the clamping assembly 1340 is similar to the clamping assembly 140 described above and includes a pair of first legs 1370 configured to face toward lateral sides of the base 1318 of the handle 1314. Like the clamping assembly 140, each leg 1370 includes a horizontal portion 1372 that is generally parallel to and adjacent the base 1318, a rear angled portion 1374 that extends upward and rearward from the horizontal portion 1372 at an angle, and an inward projecting cylindrical portion 1376 that are movably coupled to one another by a threaded member 1380 coupled to a knurled knob 1386. Like the clamping assembly 140, rotating the knob 1386 in a tightening (e.g., clockwise) direction draws the legs 1370 toward one another to clamp the clamp assembly 1340 to the base 1318 and rotating the knob 1386 in a loosening (e.g., counterclockwise) direction moves the legs 1370 away from one another to remove the clamp assembly from the base 1318. Unlike the clamping assembly 140, each leg 1370 further includes a front angled portion 1382 that extends upward and forward from the horizontal portion 1370 at an angle and a lateral connecting rod 1384 connecting the front angled portions 1382.

Figure 50:
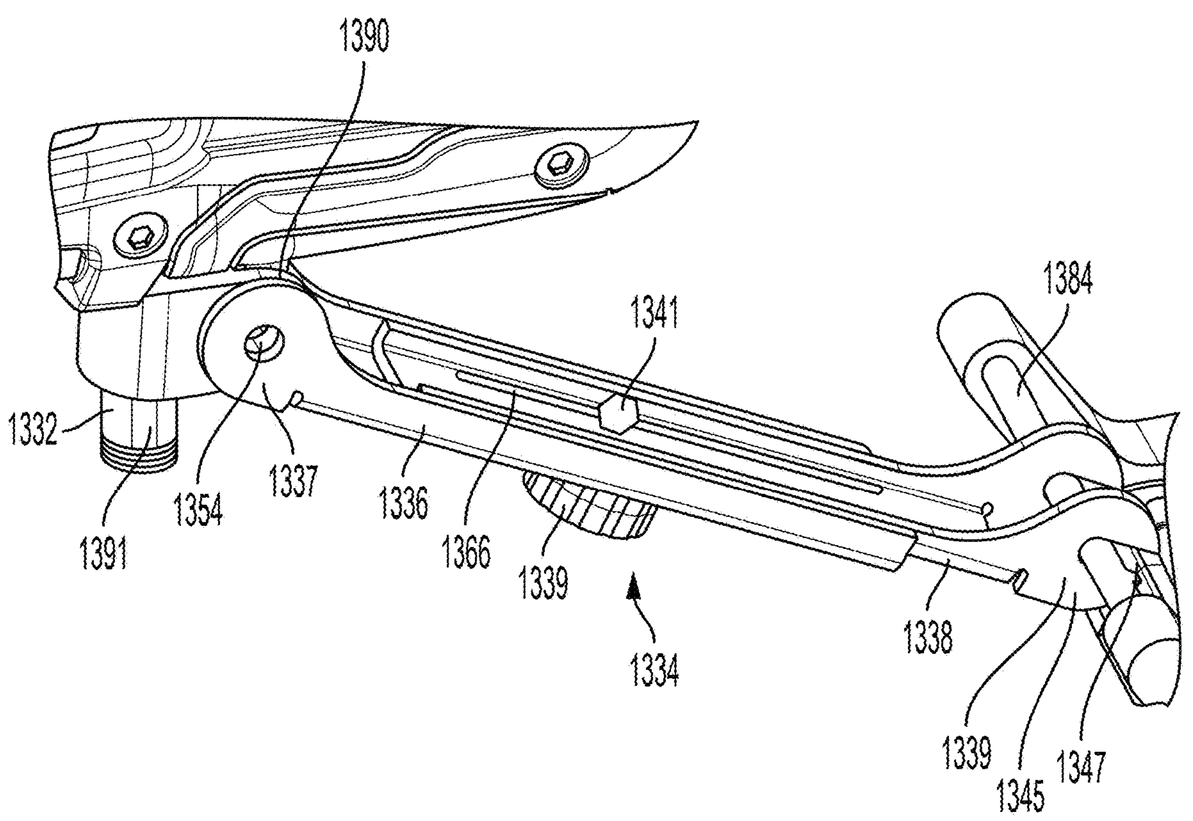
FIG. 50 is a close-up perspective view of the arm assembly of the power tool accessory system of FIG. 48.

Referring also to FIG. 50, the arm assembly 1334 includes a first arm portion 1336 and a second arm portion 1338. The first arm portion 1336 includes the first end portion 1335 and is pivotally attached to the holder 1332 by a pivot pin 1354 that is transverse to the first arm portion 1336. The second arm portion 1338 is telescopically movable relative to the first arm portion 1336 via a threaded bolt with a knurled head 1339 at one end and a nut 1341 at the other end. The bolt is received in a longitudinal slot 1366 in one or both of the first arm portion 1336 or the second arm portion 1338. This telescopic connection allows the length of the arm assembly 1334 to be adjustable by a user, while the knurled head 1339 and nut 1341 retain the arm assembly at a desired length. In other embodiments, other adjustment mechanisms may be used such as a spring biased positioning pin to allow for indexed movement of the second arm portion 1338 relative to the first arm portion 1336 (e.g., as shown in FIGS. 42-43 of the aforementioned U.S. patent application Ser. No. 14/186,088, which is incorporated by reference).

Figure 51:
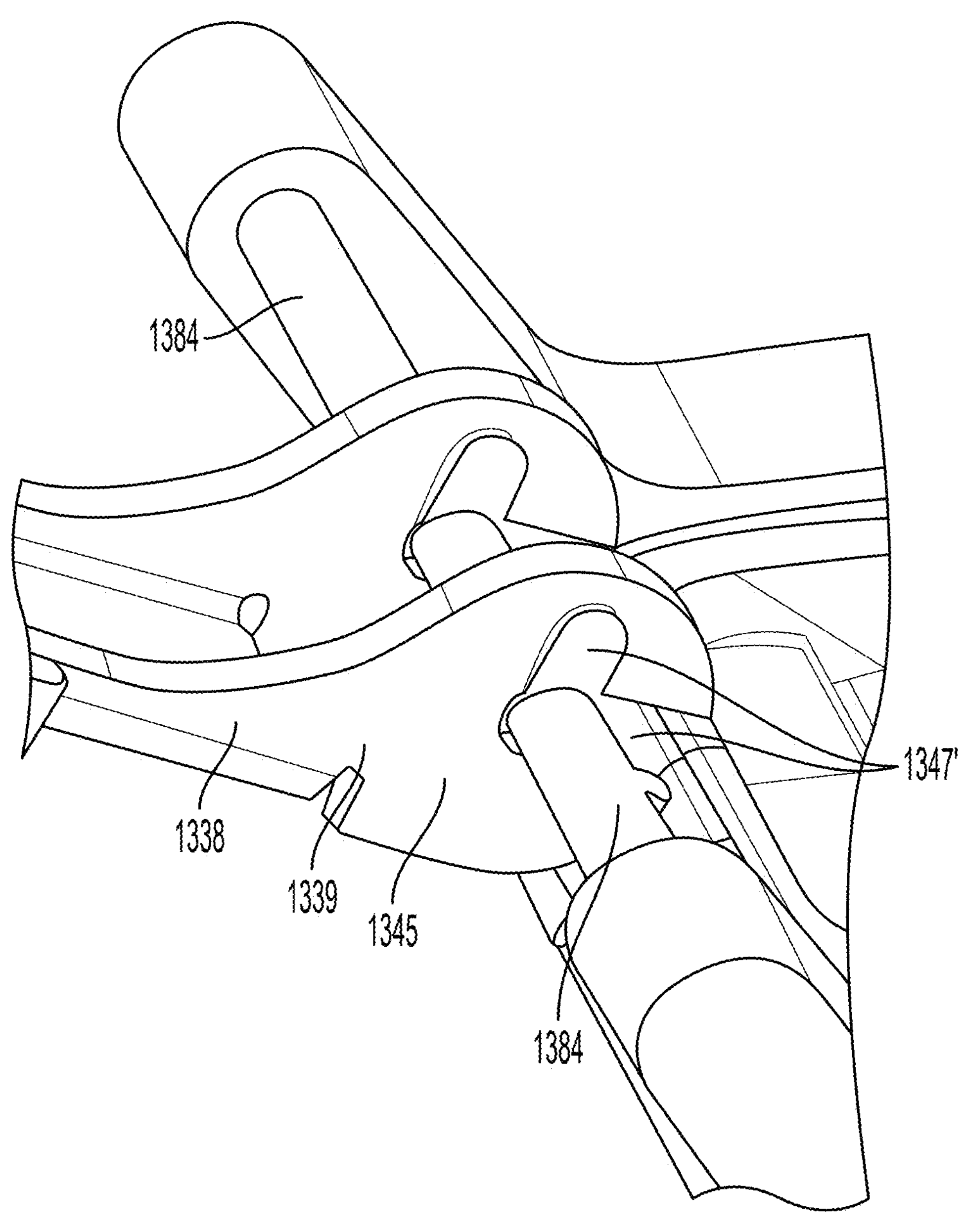
FIG. 51 is a close-up perspective view of portions of the clamping assembly and arm assembly of the power tool accessory system of FIG. 48.

Referring also to FIG. 51, the second arm portion 1338 has a second end portion 1339 with a pair of ears 1345. Each ear 1345 includes either a U-shaped slot 1347 (as shown in FIG. 50) or an L-shaped slot 1347' (as shown in FIG. 51), both of which are open to a rear end of the ear 1347. The U-shaped slot 1347 or the L-shaped slot 1347' can receive the connecting rod 1384 of the clamping assembly 1340 to releasably retain the arm assembly 1334 relative to the clamp assembly 1340 while the clamp assembly 1340 remains attached to the base 1318 of the tool housing. In other embodiments, the U-shaped slot or the L-shaped slot may be open to a side edge of the ear.

Figure 52:
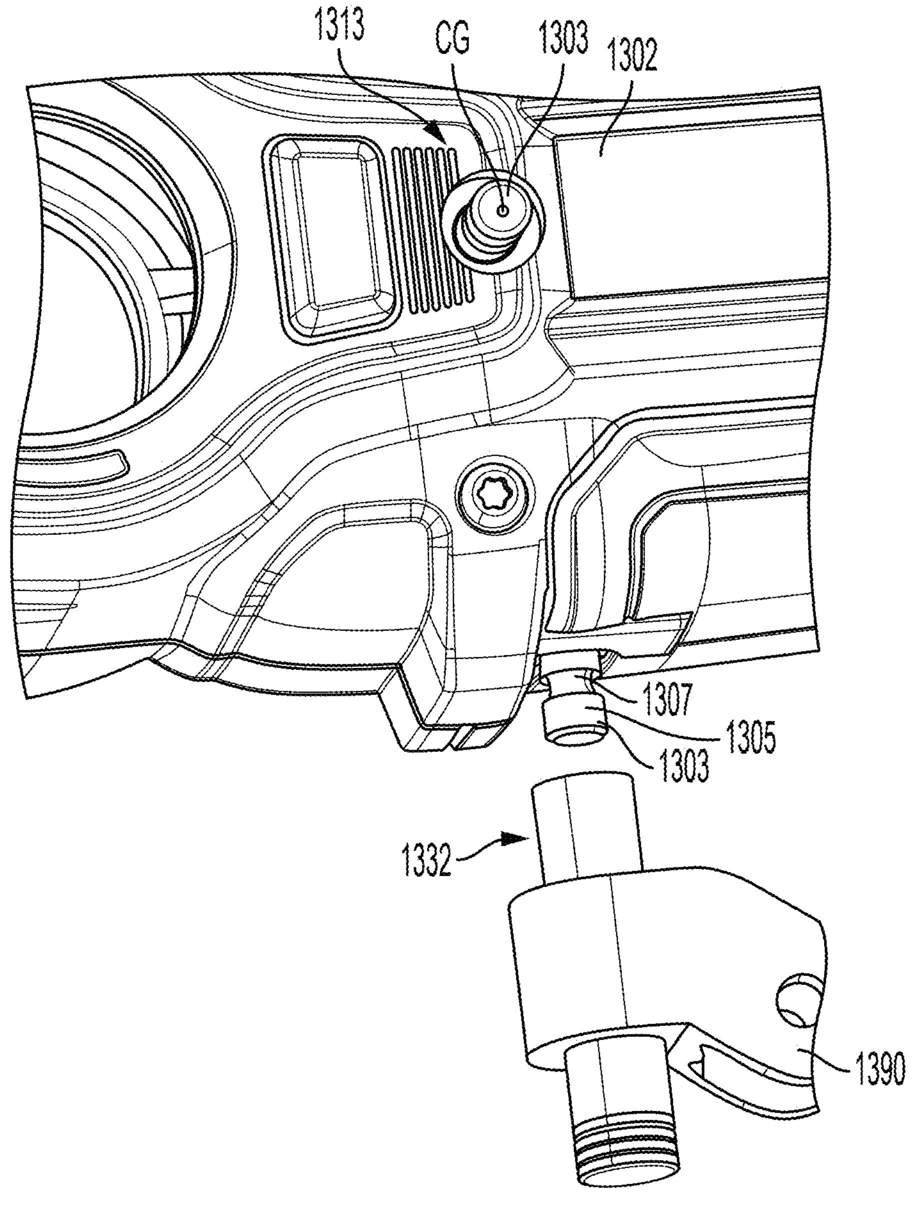
FIGS. 52 and 53 are close-up perspective views of portions of the clamping assembly and accessory housing of the power tool accessory system of FIG. 48.
Figure 53:
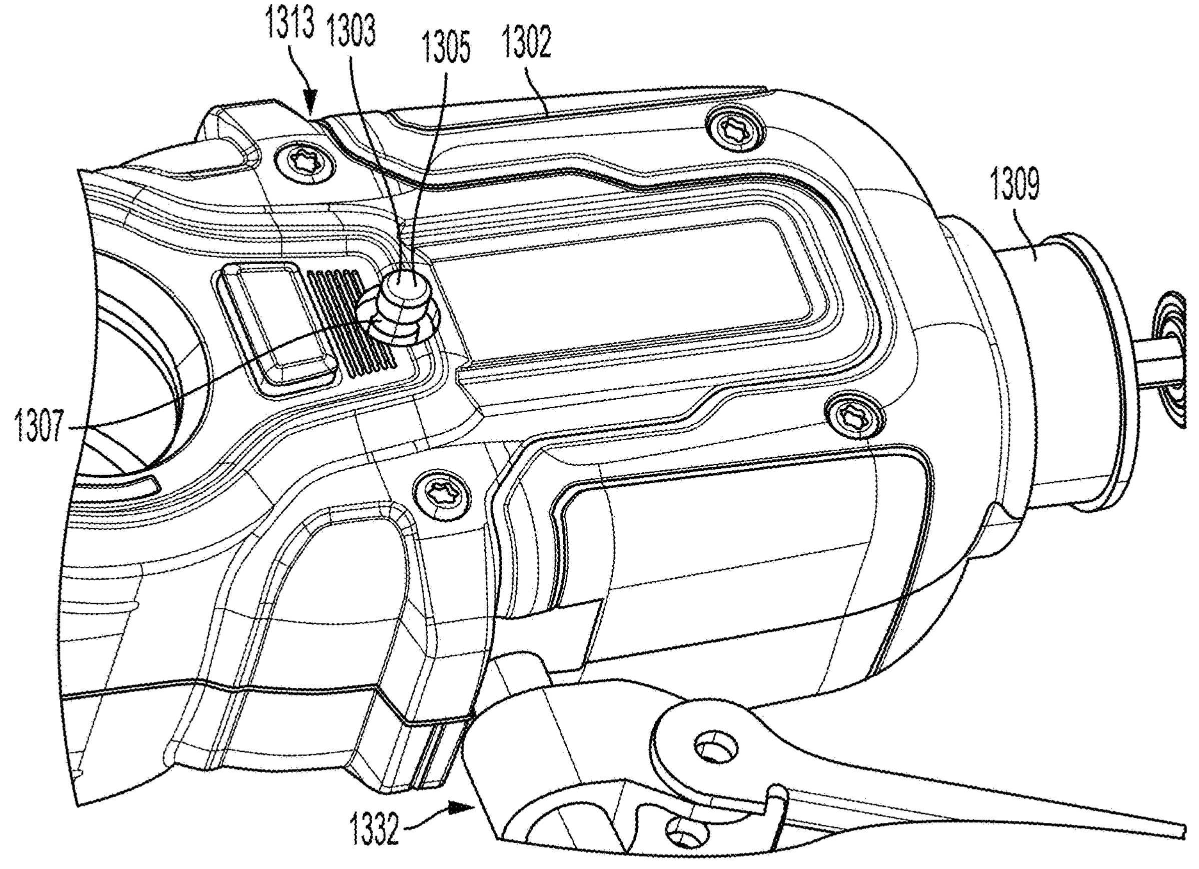

Referring also to FIGS. 52-53, the accessory housing 1302 includes a plurality of studs 1303 extending radially outward from the mid-portion 1313 of the accessory housing 1302 at various angular positions around the accessory housing 1302. Each stud 1303 includes a round or polygonal shaft 1305 with an annular groove 1307. The studs 1303 enable the accessory housing 1302 to be releasably coupled to the holder 1332 brace 1320 at a plurality of angular positions, as described further below. As illustrated, there are two studs 1303 located 90 degrees apart from one another. However, there may be a smaller or greater number of studs or only a single stud, such as four studs spaced 90 degrees apart from one another about the hosuing. The studs 1303 may be generally aligned with a center of gravity CG of the accessory 1301 to enable support of the accessory 1301 without creating a moment or torque around the holder 1332, e.g., due to the mass or operation of the accessory. The accessory housing 1302 also includes a cylindrical rear projection 1309 that enables the accessory housing 1302 to be alternatively coupled a collar on one of the other braces described above (such as collar 132), enabling use of the other braces instead of the brace 1340.

Figure 54:
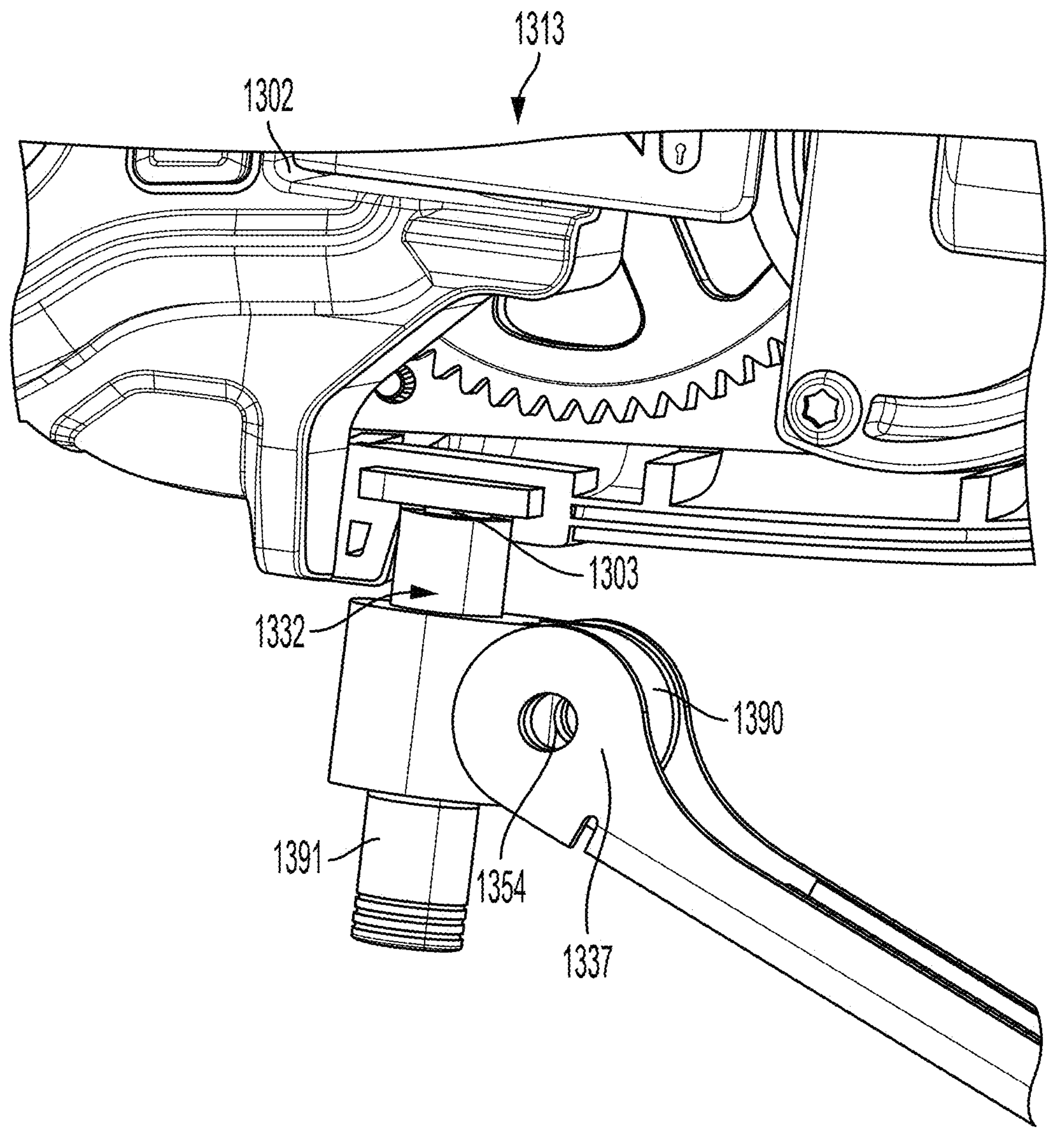
FIG. 54 is a close-up perspective view, partially in section, of portions of the clamping assembly and accessory housing of the power tool accessory system of FIG. 48.
Figure 55:
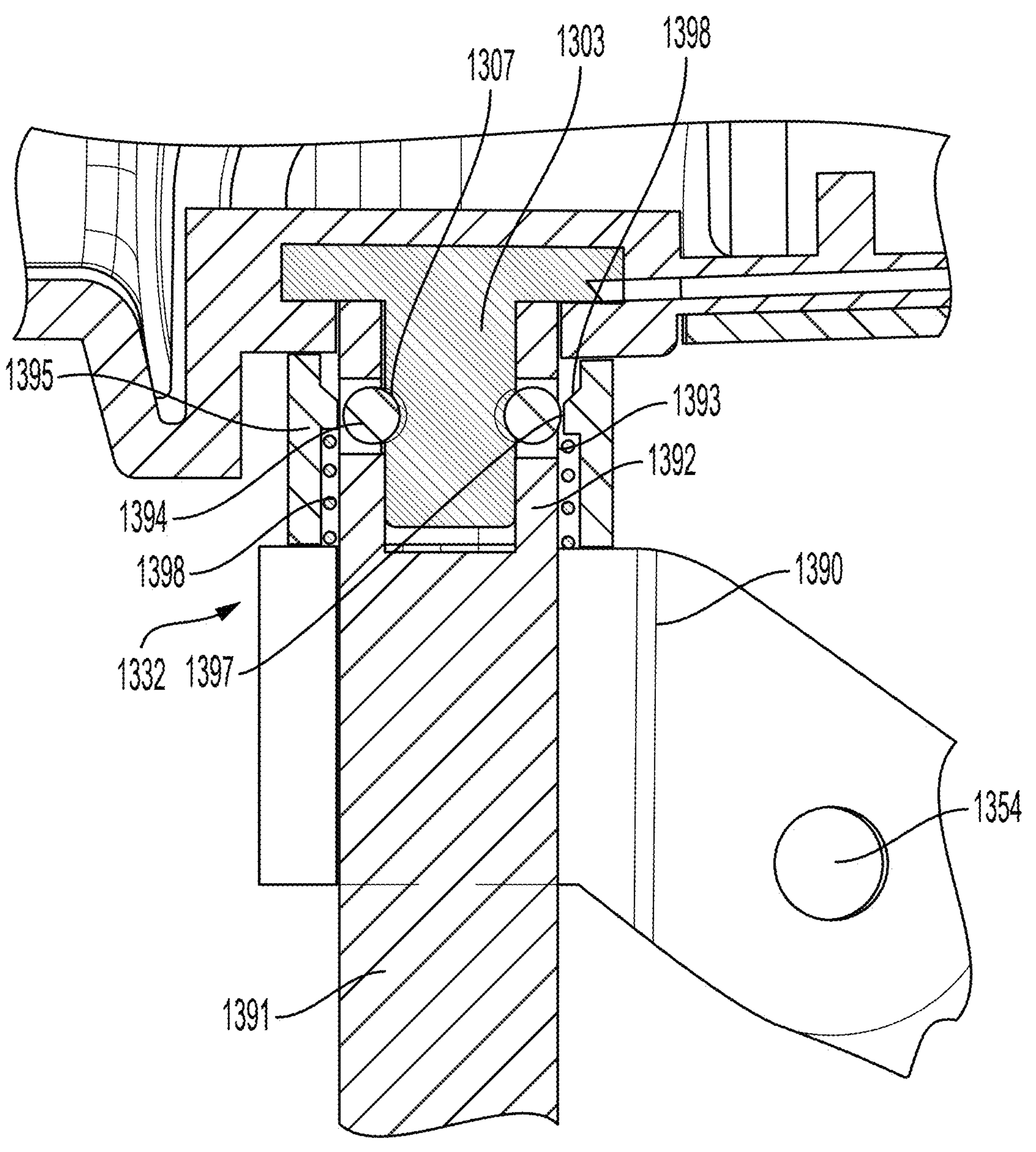
FIGS. 55 and 56 are close-up side views, partially in section, of portions of the clamping assembly and accessory housing of the power tool accessory system of FIG. 48.
Figure 56:
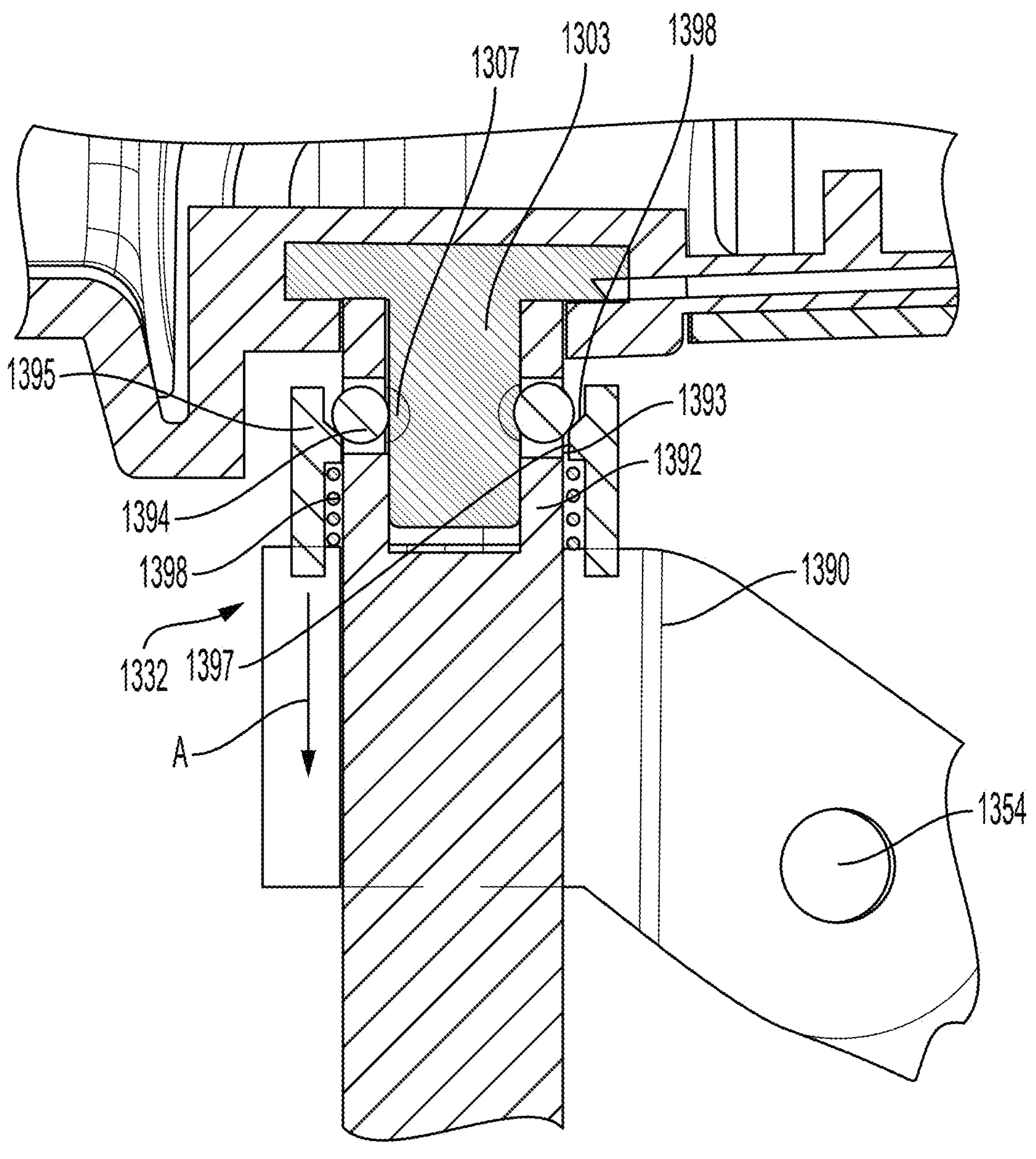
Figure 57:
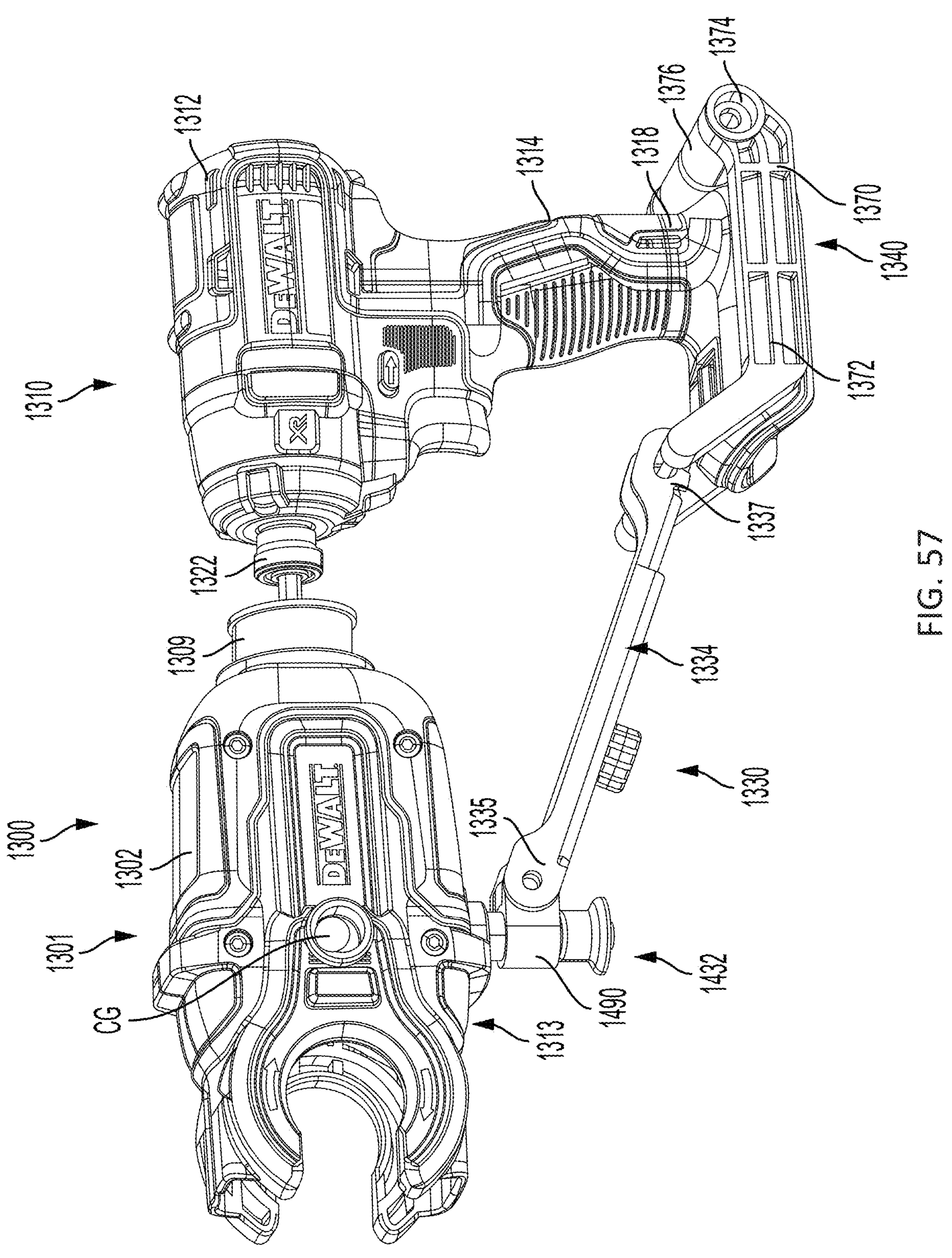
FIG. 57 is a perspective view of another embodiment of a power tool accessory system.
Figure 58:
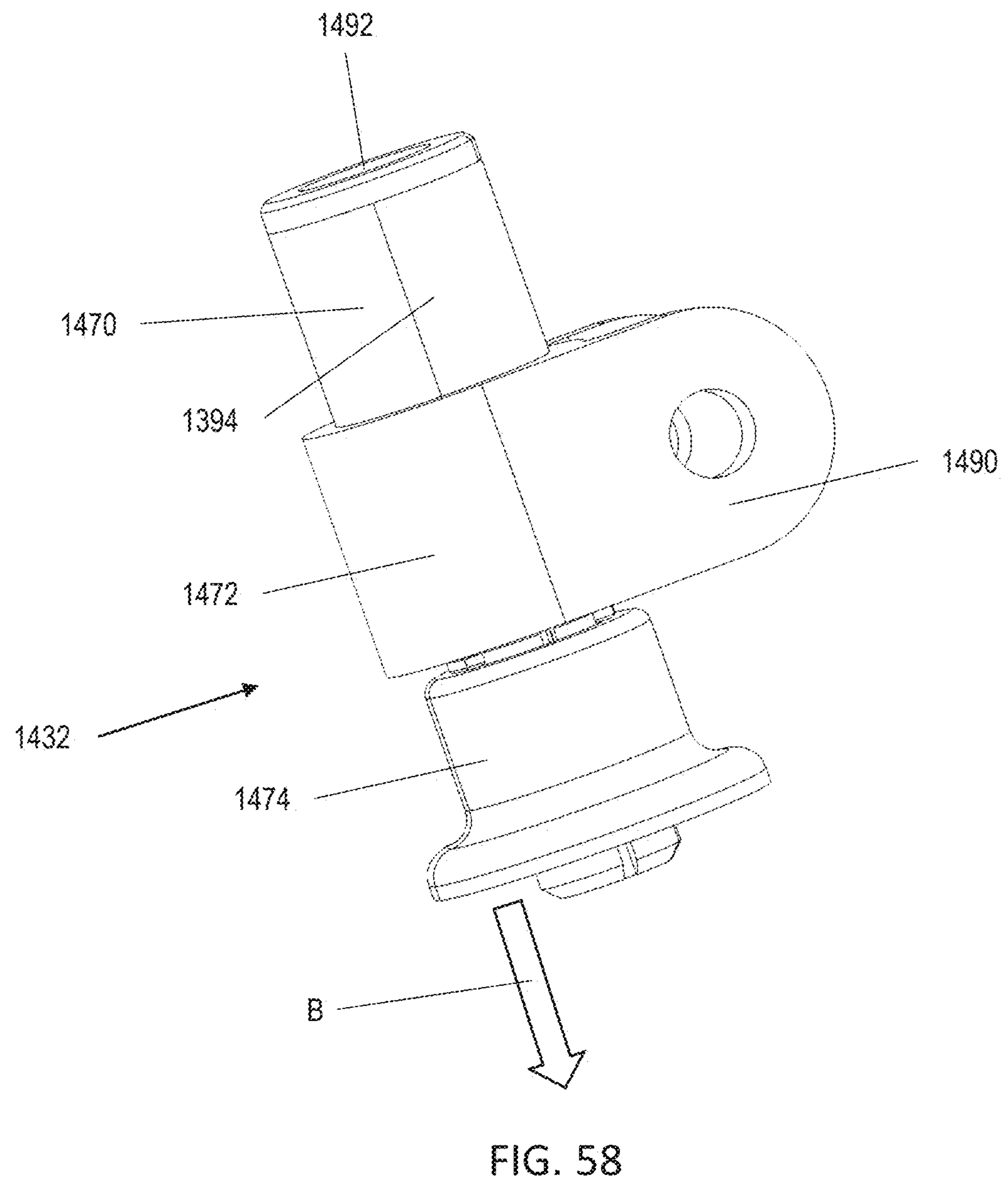
FIG. 58 is a perspective view of a holder of the power tool accessory system of FIG. 57.
Figure 59:
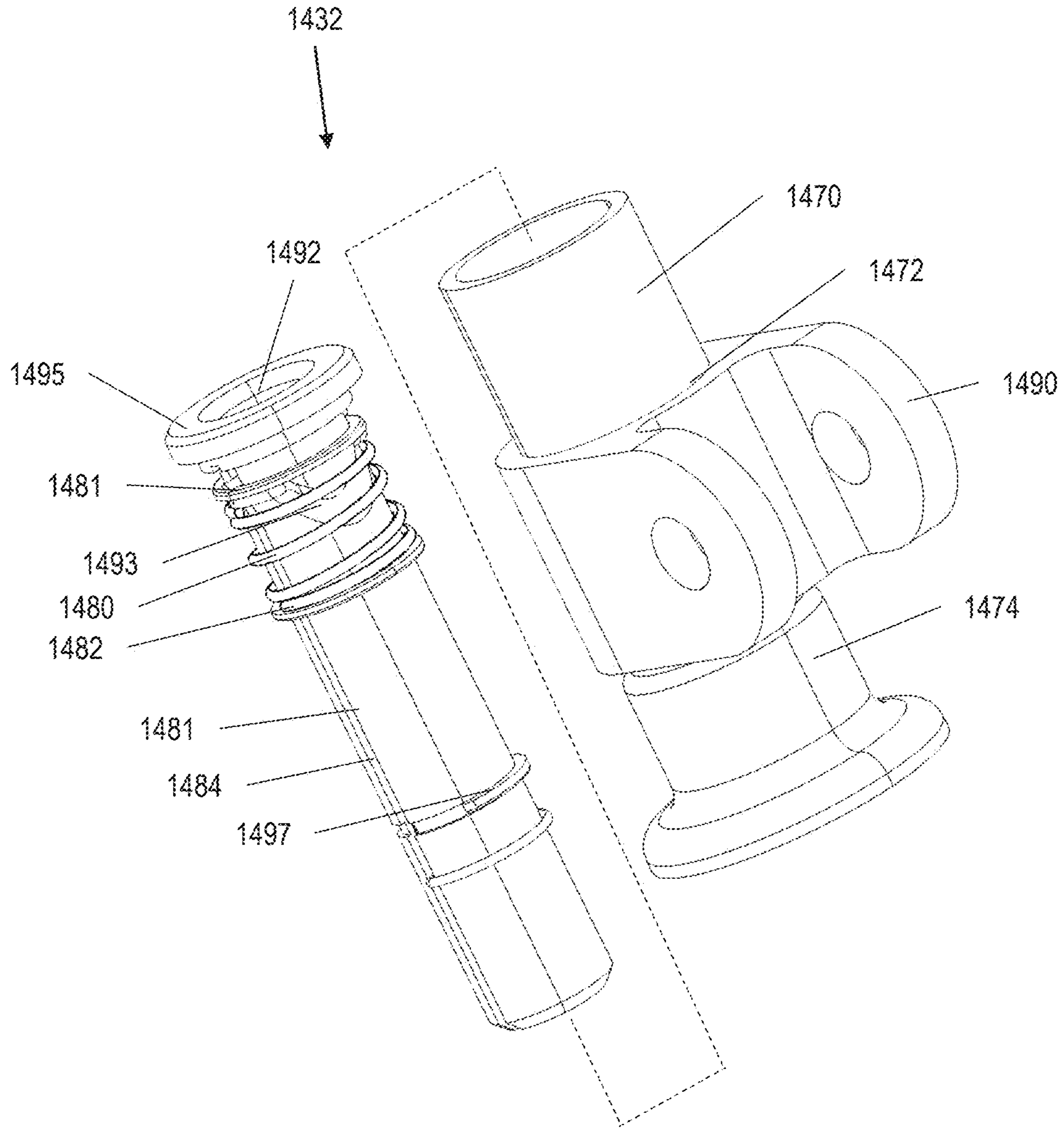
FIGS. 59 and 60 are exploded views of the holder of the power tool accessory system of FIG. 57.
Figure 60:
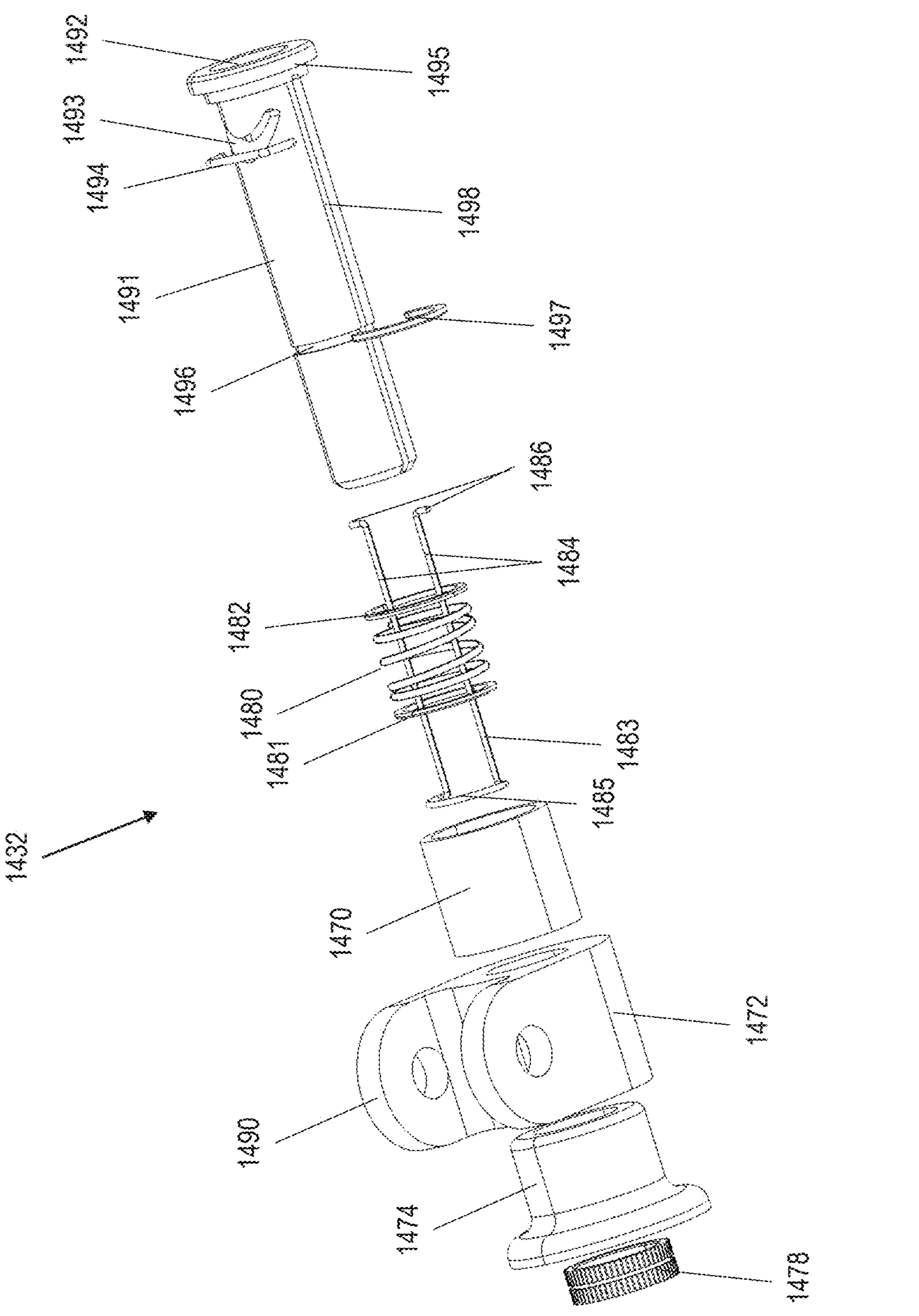
Figure 62:
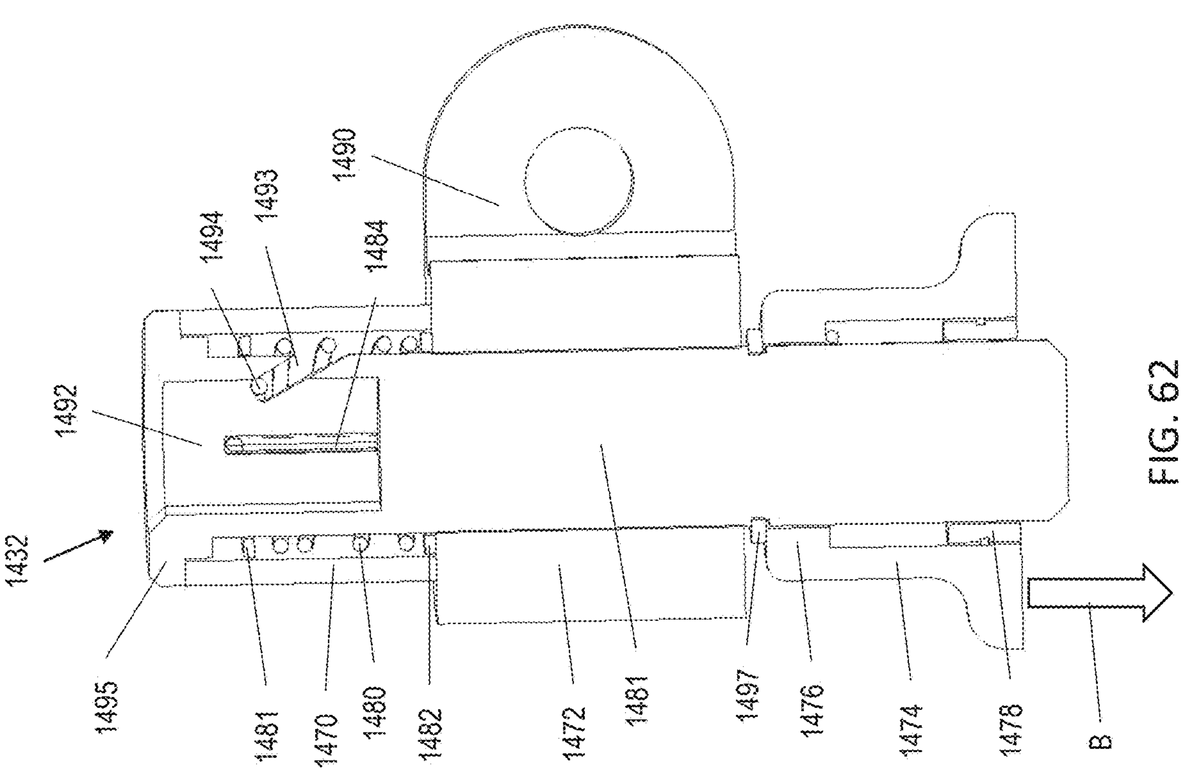
FIGS. 61 and 62 are cross-sectional views of the holder of the power tool accessory system of FIG. 57.
Figure 61:
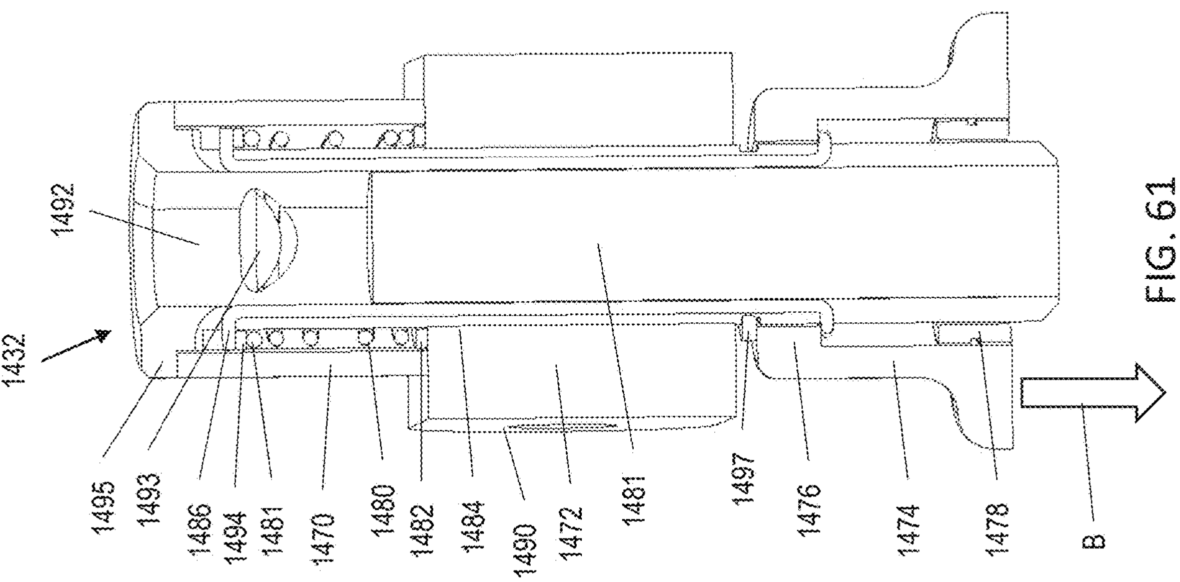

Referring also to FIGS. 54-56, the stud holder 1332 includes a yoke collar 1390 pivotally coupled to the front end portion 1335 of the arm assembly 1334 by the pivot pin 1354 and a cylindrical shaft 1391 coupled to the yoke collar 1390. For example, as shown, the cylindrical shaft 1391 includes a longitudinal cylindrical bore 1392 for receiving the stud 1303 and one or more radial windows 1393 in communication with the bore 1392. In other embodiments, the shaft and/or the bore may have a non-cylindrical shape such as having a polygonal cross-section or a rectilinear shape. The windows 1393 receive one or more retaining balls 1394 configured to move radially into the bore 1392 and engage the annular groove 1307 in the stud 1303. Surrounding the cylindrical shaft 1391 is a sleeve 1395 configured to move axially along the shaft 1391. The sleeve 1395 includes one or more ramped surfaces 1396 and retaining surfaces 1397 configured to hold the balls in the groove 1307 or to allow the balls to move out of the groove 1307. The sleeve is biased axially toward the accessory housing by a compression spring 1398. As shown in FIG. 55, when the sleeve 1395 is in the axially forward position, the retaining surfaces 1397 force the balls 1394 radially inward to engage the groove 1307 in the stud 1303 to retain the stud 1303 in the stud holder 1332. As shown in FIG. 56, when the sleeve is pulled axially rearward in the direction of arrow A and against the force of the compression spring 1398, the balls 1394 are able to ride radially outward along the ramped surfaces 1396, disengaging from the annular groove 1307 and enabling removal of the stud 1303 from the holder 1332. Once released, the accessory housing can be rotated to a different angular position and one of the other studs 1303 can be retained in the holder 1332.

Referring also to FIGS. 57-62, in another embodiment, a stud holder 1432 for use with the power tool accessory system 1300 includes a yoke collar 1490 pivotally coupled to the front end portion 1335 of the arm assembly 1334 by the pivot pin 1354 and a cylindrical shaft 1491 coupled to the yoke collar 1490. The cylindrical shaft 1491 includes a longitudinal bore 1492 for receiving the stud 1303 and a U-shaped radial window 1493 in communication with the bore 1492. The window 1493 receives a retaining clip 1494 configured to move partially radially into the bore 1492 and engage the annular groove 1307 in the stud 1303. The shaft 1491 also includes an annular flange 1495 at its front end and an annular groove 1496 at an intermediate portion that receives a C-clip 1497. The shaft 1491 also includes a pair of longitudinal grooves 1498 formed in its outer wall.

Received over the shaft 1491 between the retaining clip 1494 and the C-clip 1497 is a compression spring 1480 with a front washer 1481 that abuts the retaining clip 1494 and a rear washer 1482 that abuts the C-clip 1497. A rigid wire 1483 includes a pair of longitudinal legs 1484 received in the longitudinal grooves 1498 within the compression spring 1480 and the washers 1481, 1482, and a C-shaped base 1485 that connects the rear ends of the longitudinal legs 1484. Each leg 1484 includes a radial outward projection 1486 at its front end which projects radially outward from the longitudinal grooves and that abuts the front face of the retaining clip 1494.

Received over a front portion of the shaft 1491, the spring clip 1494, the compression spring 1480, the washers 1481, 1482, and an front portion of the longitudinal legs 1484 is a front collar 1470 that abuts the flange 1495 and is stationary relative to the shaft 1491. Received over an intermediate portion of the shaft 1491 and an intermediate portion of the longitudinal legs 1484 is a cylindrical portion 1472 of the yoke collar 1490, which abuts the flange front collar 1470 and the rear washer 1482 at its front end, that abuts the C-clip 1487 at its rear end, and that is stationary relative to the shaft 1491. Received over a rear portion of the shaft 1491 and the C-shaped base 1485 of the wire 1483 is an actuation sleeve 1474. A front end of the actuation sleeve 1474 includes a radial inward projection 1476 that abuts the C-shaped base 1485. The actuation sleeve 1474 is axially moveable rearward and forward relative to the shaft 1491. A positioning ring 1478 is received in the rear end portion of the actuation sleeve 1474 to help retain the actuation sleeve 1474 on the shaft 1491.

In use, the stud holder 1432 can be coupled to one of the studs 1303 on the accessory housing 1302 by inserting the stud 1303 into the axial bore 1492 in the shaft 1491 with the spring clip 1494 engaging the annular groove 1307 in the stud 1303. The force of the compression spring 1480 and front collar 1482 on the spring clip 1482 will keep the spring clip 1494 engaged with the annular groove 1307. To remove the stud holder 1432 from the stud 1303, the user pulls the actuation sleeve 1474 rearward in the direction of arrow B. This pulls the C-shaped base 1485, the legs 1483, and the projections 1486 of the wire 1483 axially rearward in the direction of arrow B. The rearward movement of the projections 1486 pull the spring clip 1494 axially rearward in the direction of arrow B and partially out of the U-shaped opening 1493 to disengage the spring clip 1494 from the annular groove 1307 in the stud 1303, enabling the stud 1303 to be removed from the axial bore 1492. This movement also compresses the compression spring 1480. When the actuation sleeve 1474 is released, the spring force of the compression spring 1480 causes the actuation sleeve 1474, the wire 1483, and the spring clip 1494 to move axially forward in a direction opposite arrow B and restore them to their original position.

In other embodiments, the stud holder of the accessory system 1332 may have a similar configuration to a tool bit holder used on a power tool or a power tool accessory. For example, the stud holder can have a similar configuration to a DEWALT RAPID LOAD® holder, e.g., as described in U.S. Pat. No. 6,929,266, which is incorporated by reference. In another example, the stud holder can have a similar configuration to a bit holder described in U.S. Pat. No. 8,622,401, which is incorporated by reference. In yet further examples, the stud holder can have a similar configuration to one of the bit holders described in U.S. Pat. Nos. 9,227,309, 9,505,108, 9,943,946, and 10,150,205, each of which is incorporated by reference.

Figure 63A:
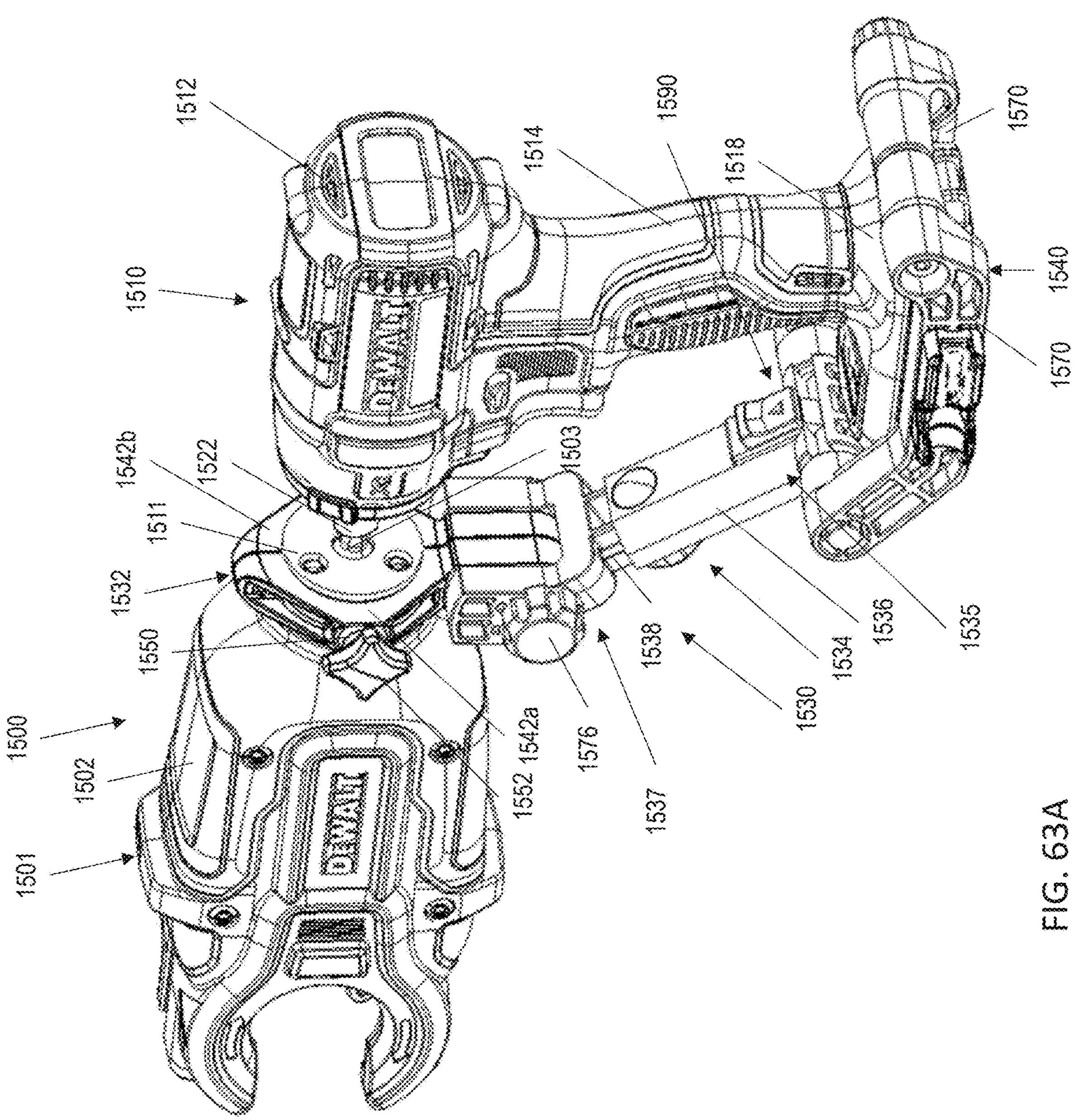
FIG. 63A is a perspective view of another embodiment of a power tool accessory system
Figure 63B:
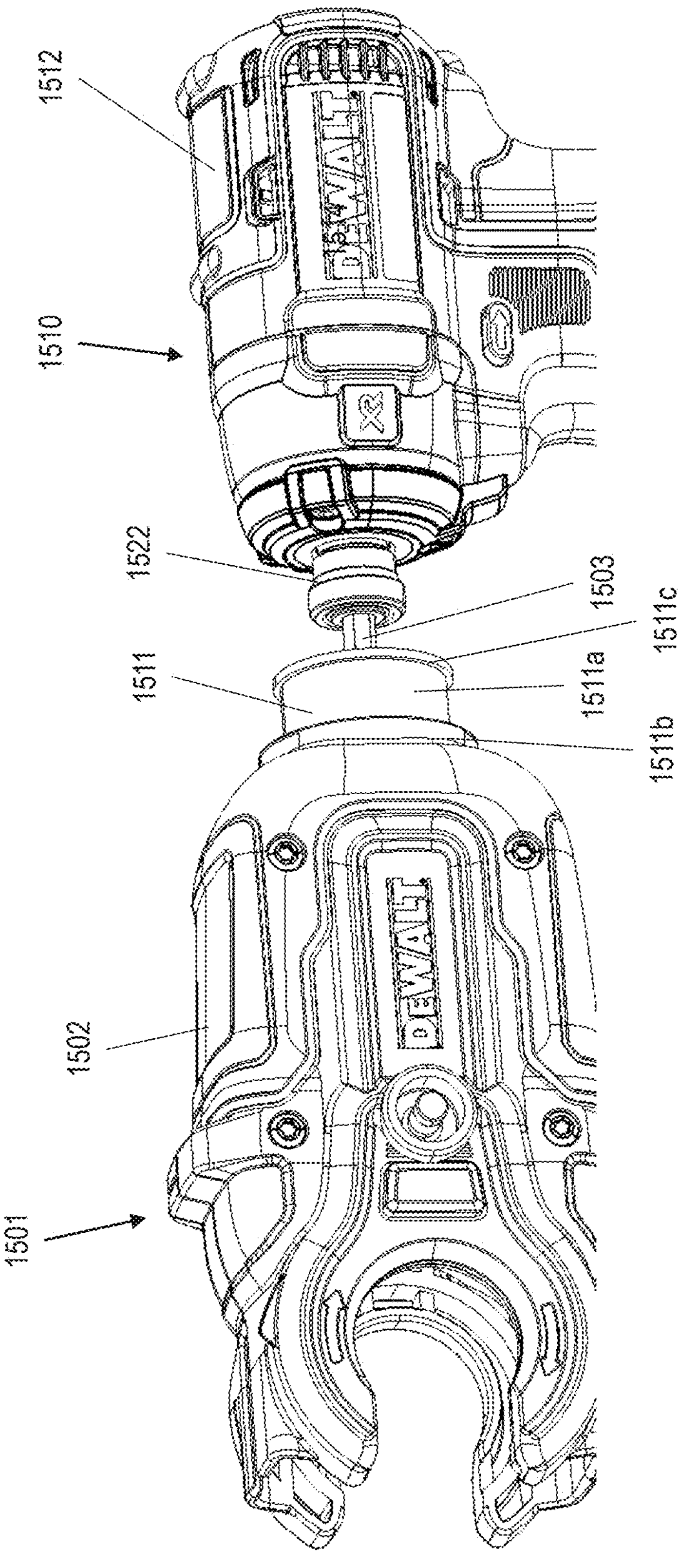
FIG. 63B is a perspective view of the accessory housing and power tool of the power tool accessory system of FIG. 63A.

Referring to FIGS. 63A-63B, in another embodiment, a power tool accessory system 1500 includes a power tool accessory 1501 (e.g., a pipe cutting accessory like the one described in with respect to FIG. 11C above) and a brace 1530 that are removably coupled to a power tool 1510 (which is the substantially the same as the power tool 10, described above). The brace 1530 is configured to adjustably, removably, and rigidly couple the accessory housing 1502 to the base or battery receptacle 1518 of the power tool housing 1512 while the input shaft 1503 of the accessory 1501 rotates relative to the accessory housing 1502.

The brace 1530 includes a clamping assembly 1540 configured to be removably and rigidly attached to the base 1518 of the handle 1514 of the power tool housing 1512, a collar assembly 1532 configured to be coupled to the accessory housing 1502, and an arm assembly 1534 having a first end portion 1535 releasably coupled to the clamping assembly 1540 and an opposite second end portion 1537 pivotably coupled to the collar assembly 1532. As described further below, the second end portion 1535 of the arm assembly 1534 includes a quick release connector 1590 that is configured so the arm assembly 1534 is removable from the clamp assembly 1540, without the use of a secondary tool, while the clamp assembly 1540 remains rigidly coupled to the tool housing 1512 to enable removal of the power tool accessory 1501 from the power tool housing 1510.

Figure 64:
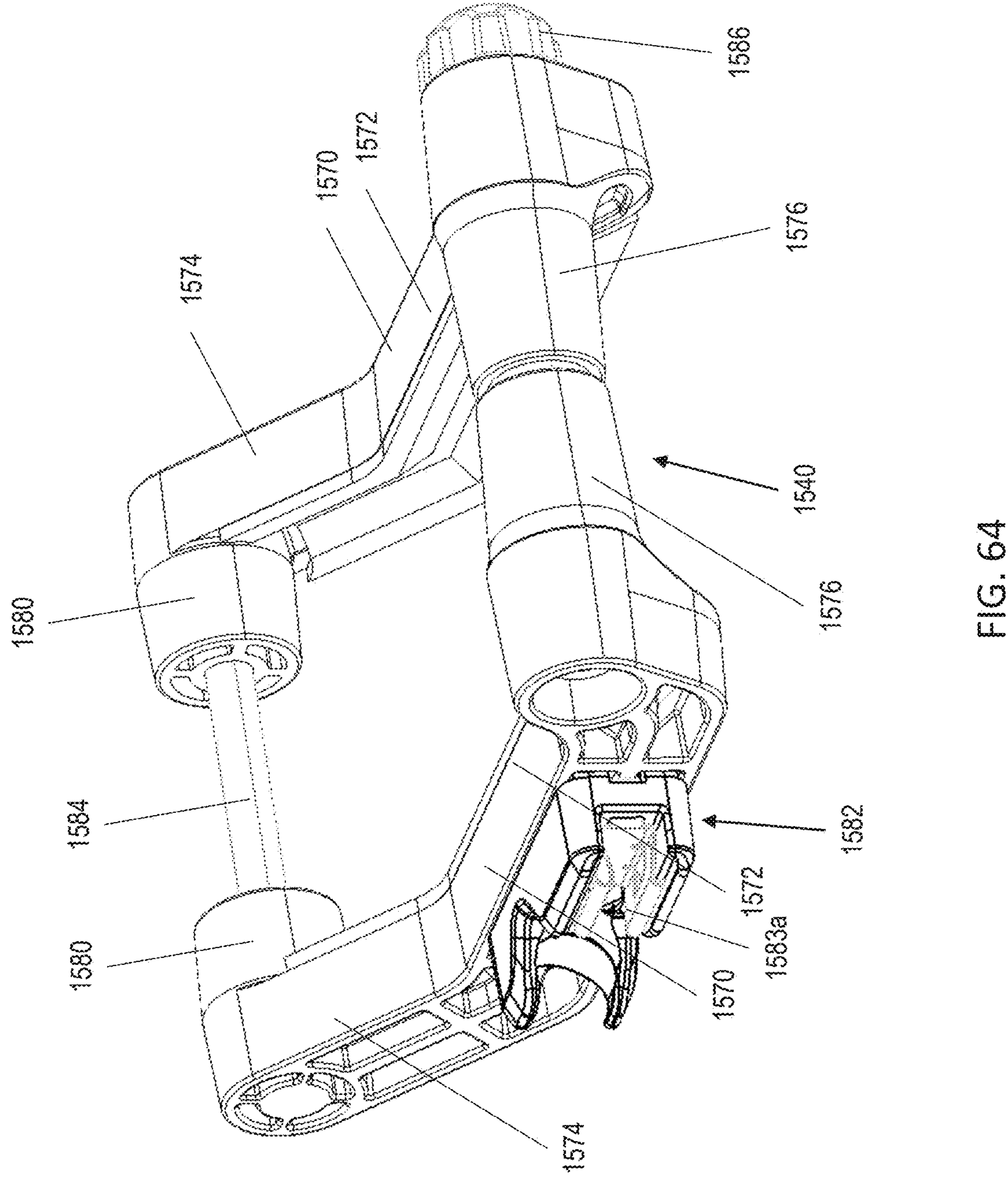
FIG. 64 is a perspective view of the clamping assembly of the power tool accessory system of FIG. 63A.
Figure 65:
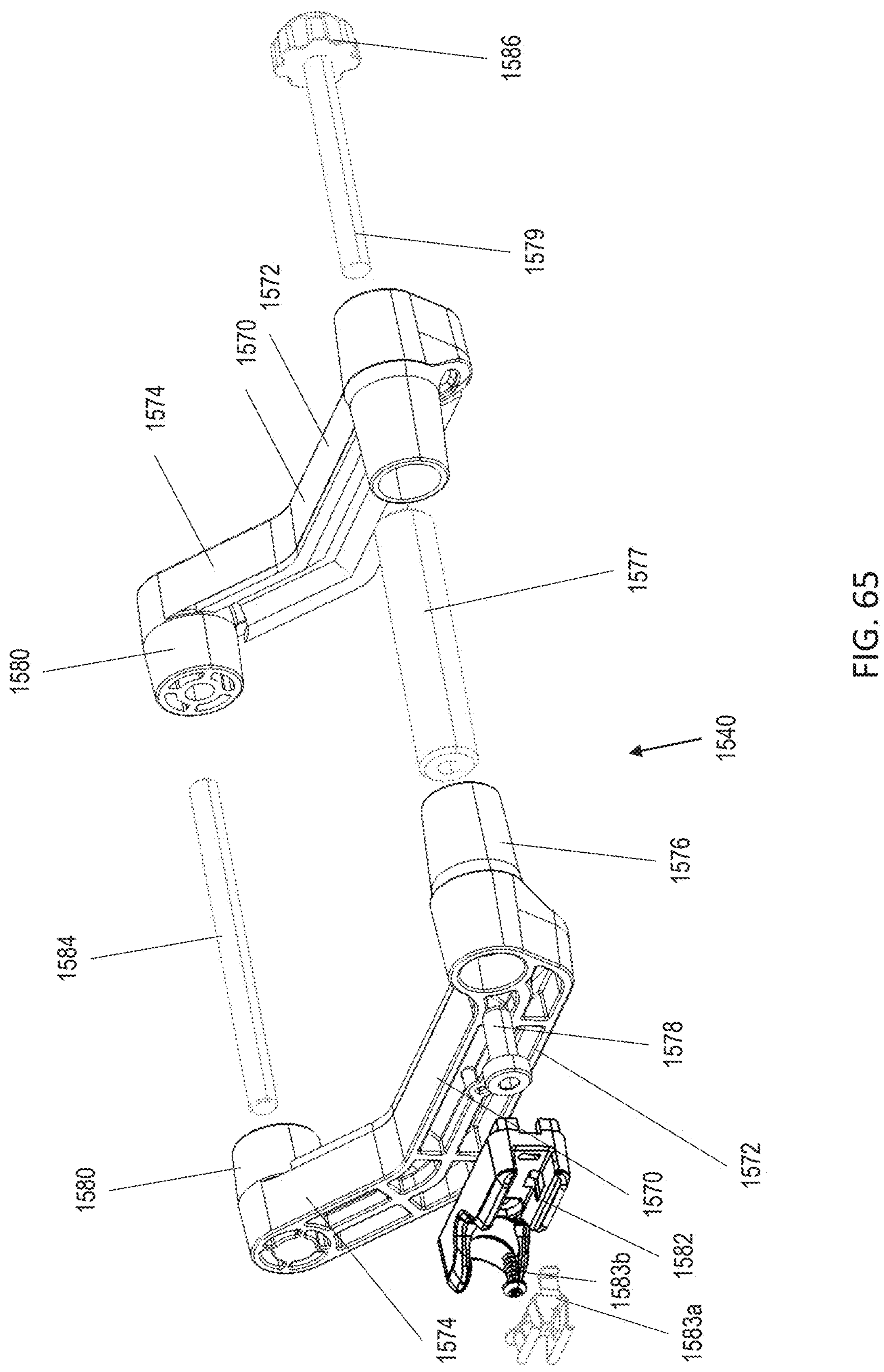
FIG. 65 is an exploded view of the clamping assembly of the power tool accessory system of FIG. 63A.
Figure 66:
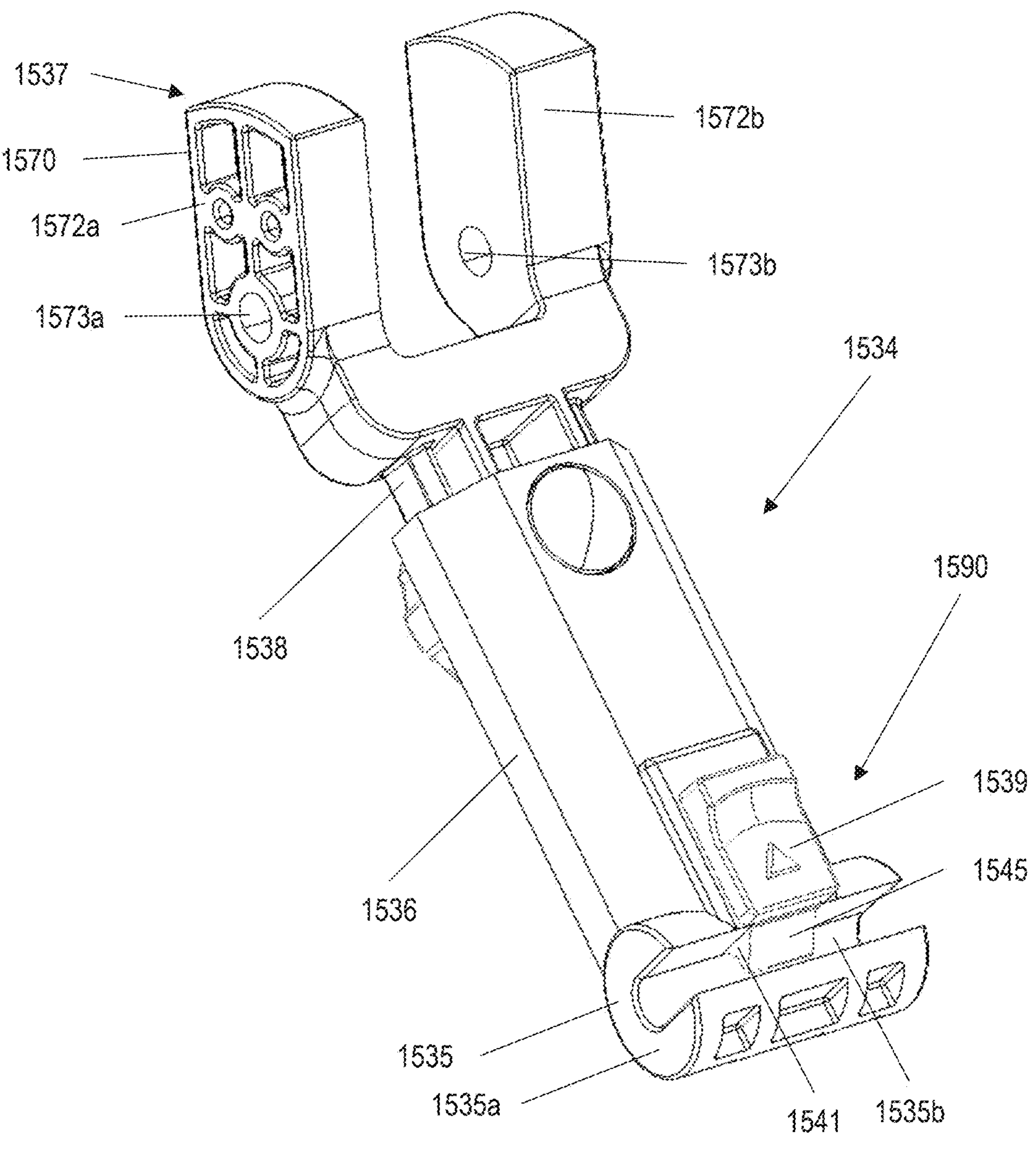
FIG. 66 is a perspective view of the arm assembly of the power tool accessory system of FIG. 63A.
Figure 67:
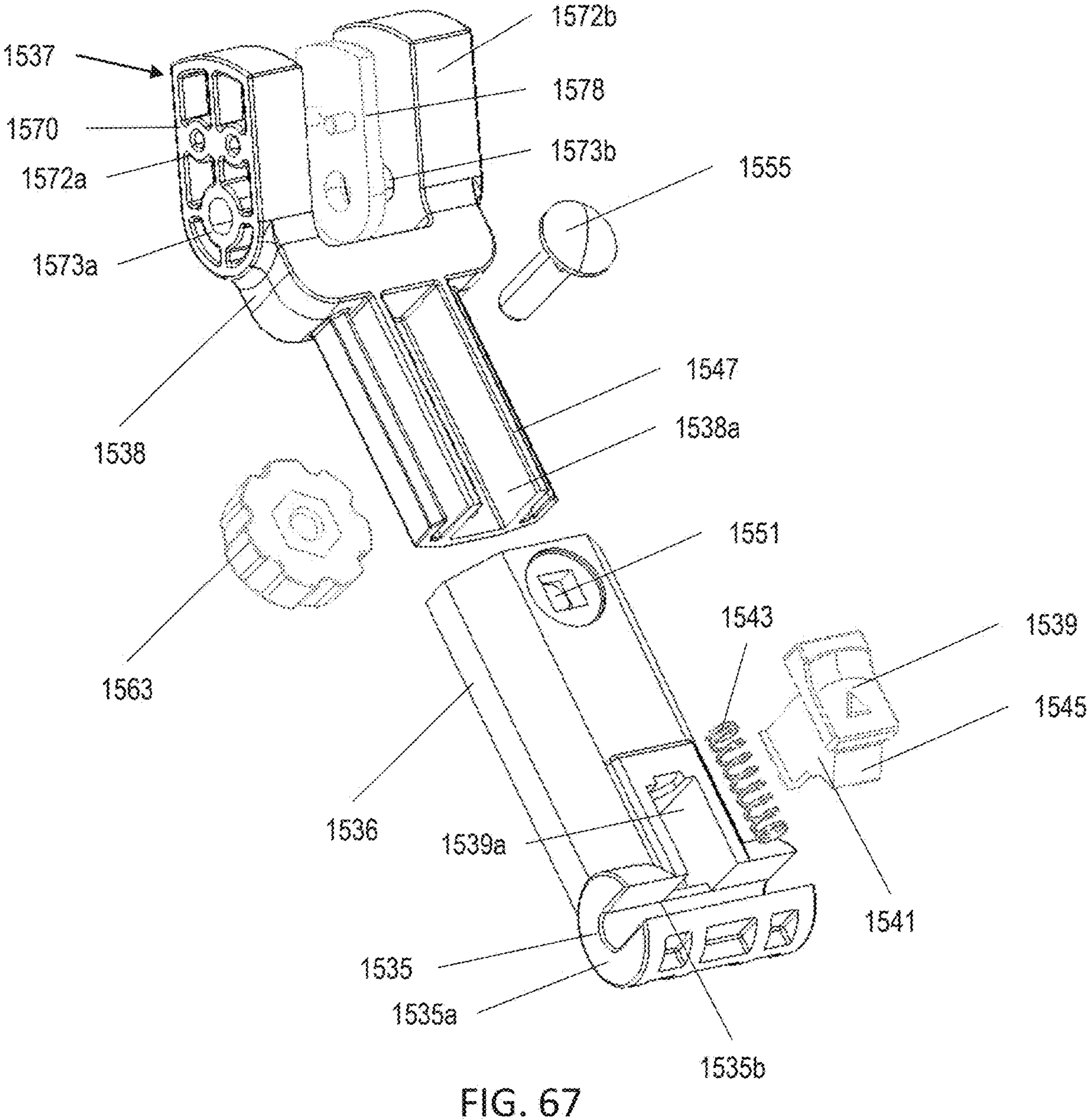
FIG. 67 is an exploded view of the arm assembly of the power tool accessory system of FIG. 63A.
Figure 68:
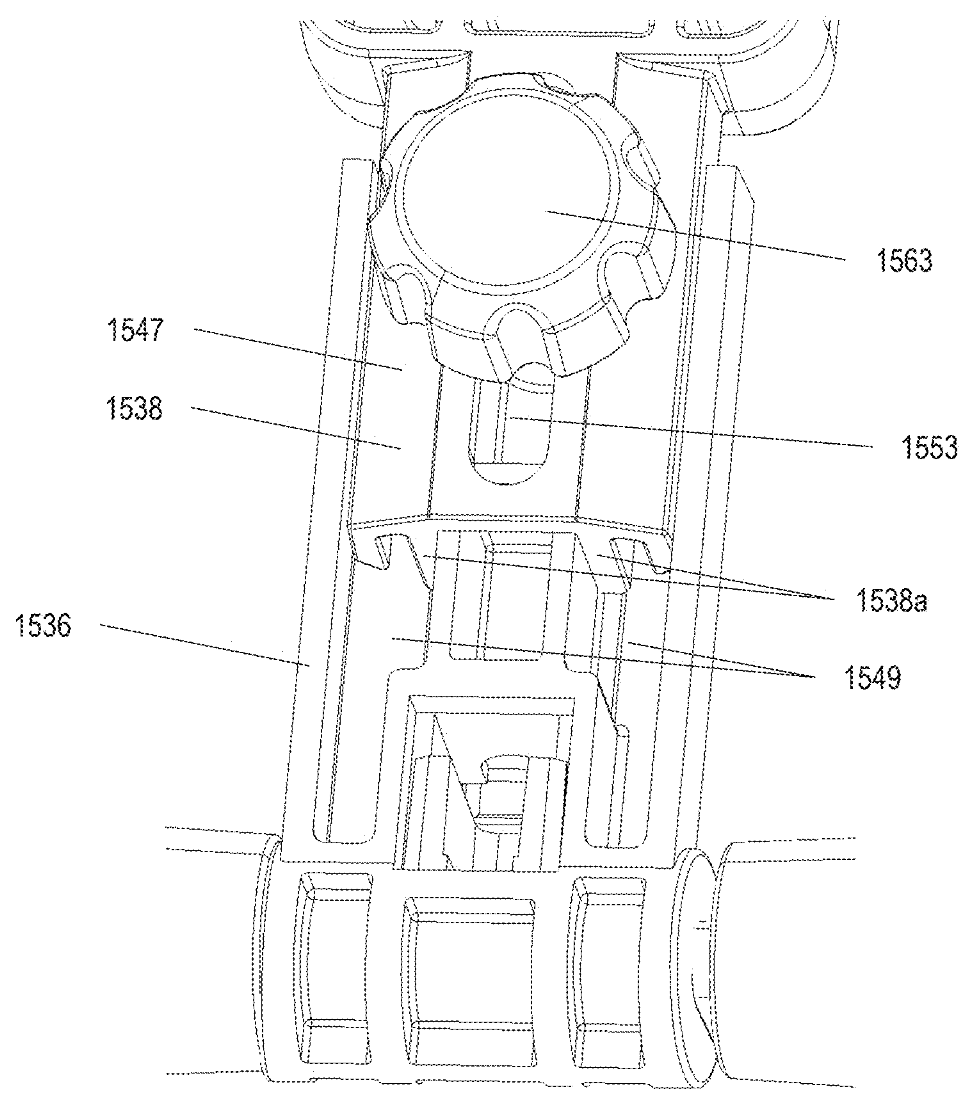
FIG. 68 is a close-up perspective view of a portion of the arm assembly of the power tool accessory system of FIG. 63A.
Figure 69:
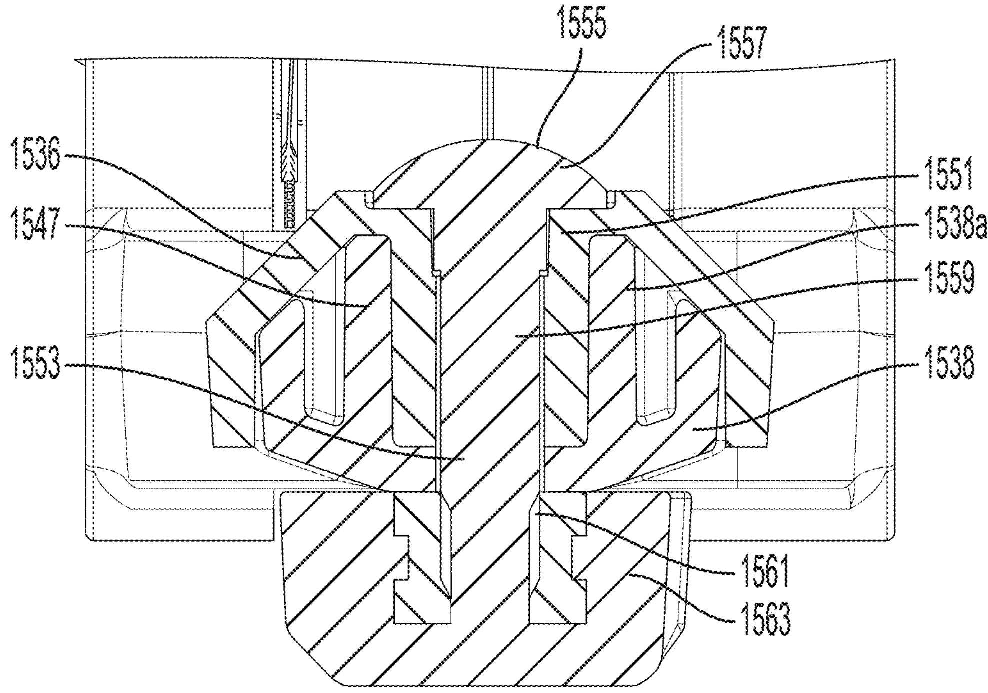
FIG. 69 is a cross-sectional view of a portion of the arm assembly of the power tool accessory system of FIG. 63A.
Figure 70A:
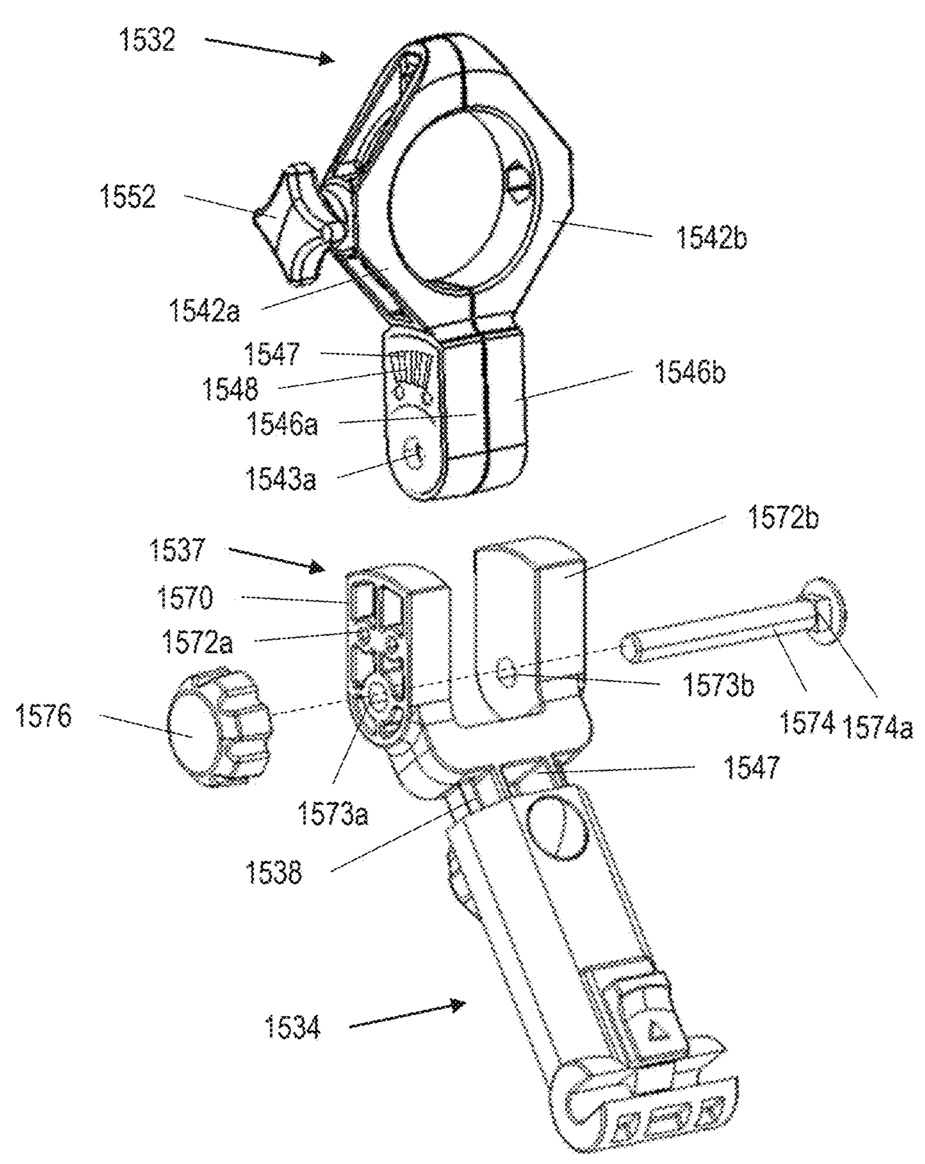
FIGS. 70A and 70B are exploded views of the arm assembly and collar of the power tool accessory system of FIG. 63A.
Figure 70B:
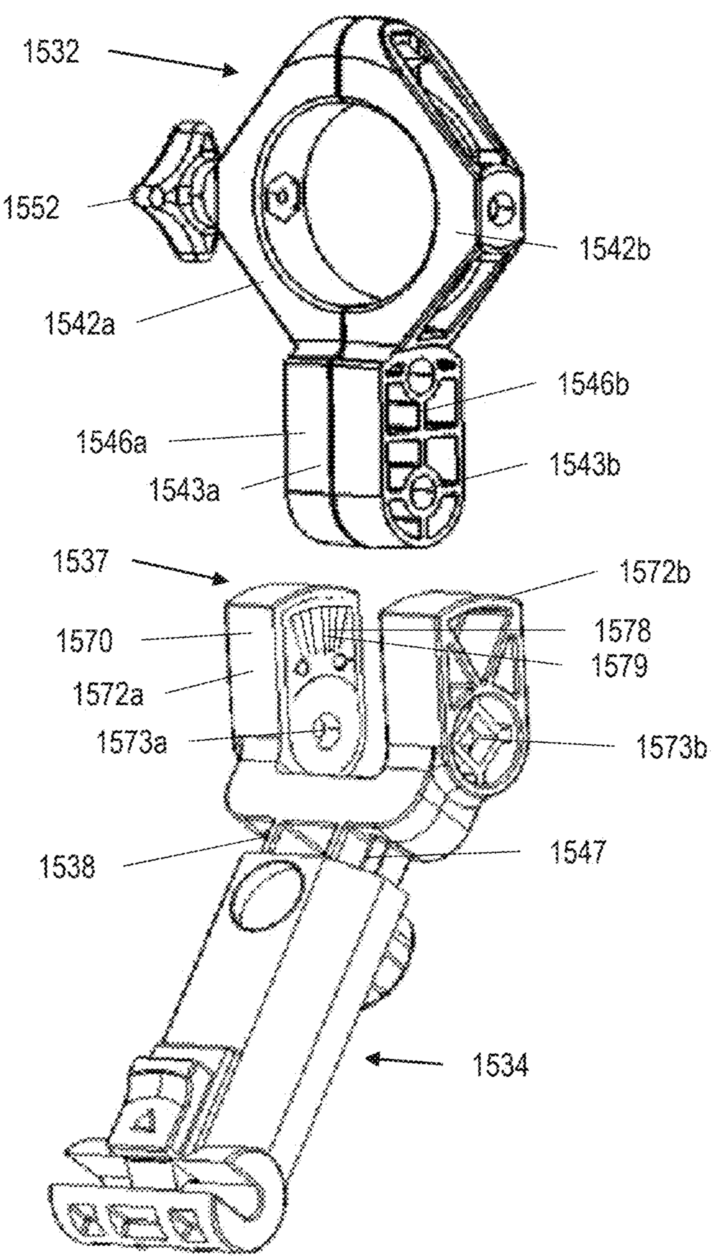
Figure 71:
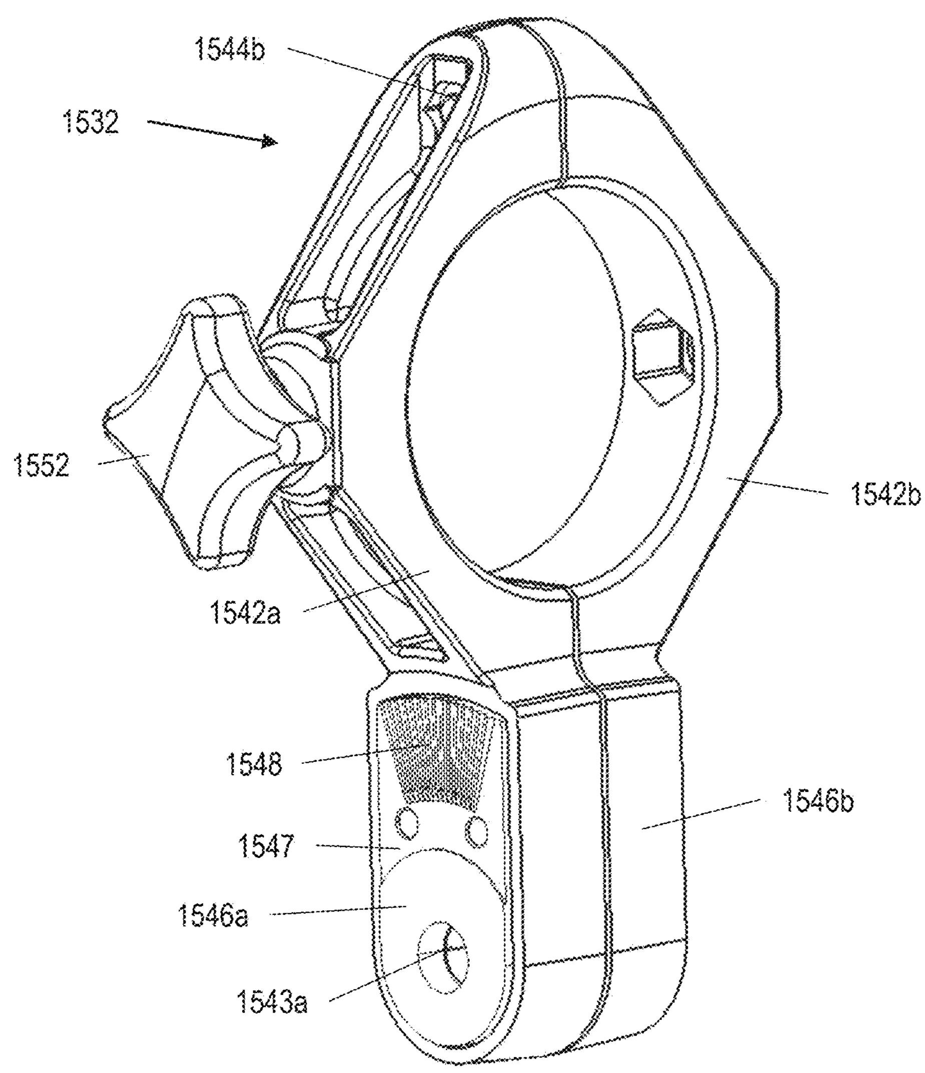
FIG. 71 is a perspective view of the collar of the power tool accessory system of FIG. 63A.
Figure 72:
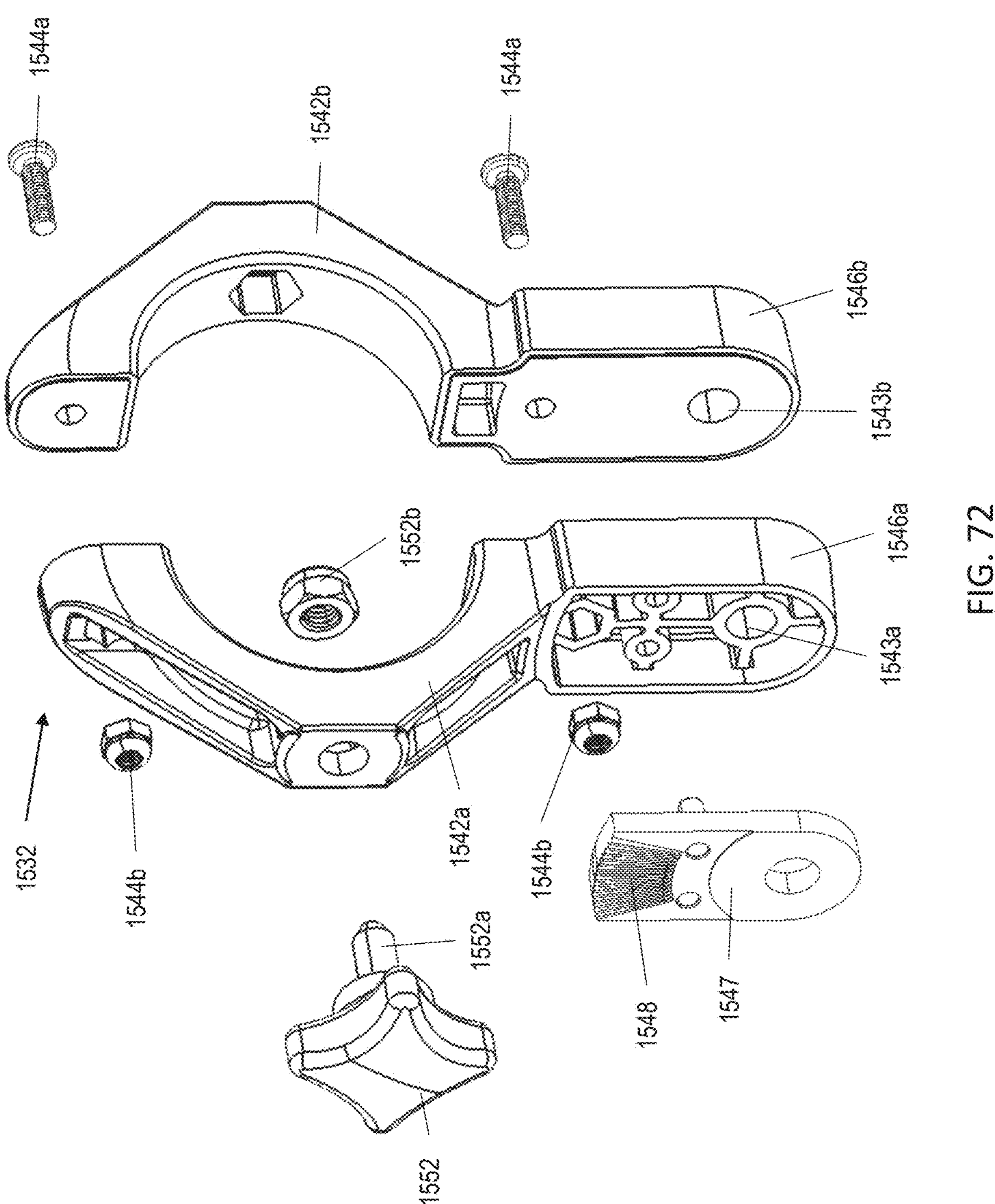
FIG. 72 is an exploded view of the collar of the power tool accessory system of FIG. 63A.

Referring also to FIGS. 64-65, the clamping assembly 1540 is similar to the clamping assembly 140 described above and includes a pair of first legs 1570 configured to face toward lateral sides of the base 1518 of the handle 1514. Like the clamping assembly 140, each leg 1570 includes a horizontal portion 1572 that is generally parallel to and adjacent the base 1518 and a front angled portion 1574 that extends upward and forward from the horizontal portion 1572 at an angle. Each horizonal portion 1572 of the legs 1570 include an inward projecting cylindrical portion 1576 that are movably coupled to one another by an internally threaded rod 1577 received through both cylindrical portions 1576, an externally threaded bolt 1578 received in one end of the internally threaded rod 1577 and an externally threaded shaft 1579 received in the other end of the internally threaded rod 1577 and fixedly coupled to a knurled knob 1586. Each front angled portion 1574 includes an inward projecting cylindrical portion 1580 that are coupled together by a cross-bar 1584. Like the clamping assembly 140, rotating the knob 1586 in a tightening (e.g., clockwise) direction draws the legs 1570 toward one another to clamp the clamp assembly 1540 to the base 1518 and rotating the knob 1586 in a loosening (e.g., counterclockwise) direction allows the legs 1570 to be moved away from one another to remove the clamp assembly from the base 1518. A tool bit holder assembly 1582 that holds a tool bit with a magnet or a spring loaded clip 1583*a* may be removably attached to one or both of the legs 1570 (e.g., by screw 1583*b*).

Referring also to FIGS. 66-69, the arm assembly 1534 includes a first arm portion 1536 and a second arm portion 1538. The first arm portion 1536 includes the first end portion 1535 that is releasably and pivotably attached to the cross-bar 1584 of the clamping assembly 1540. The first end portion 1535 includes a quick release connector including a cylindrical member 1535 a with a U-shaped recess 1535 *b* that receives the cross-bar 1584. Coupled to the first end portion 1535 is an actuator switch 1539 received in a slot 1539 *a* with a retaining leg 1541 that is movable along the first arm portion 1536 between a closed position where the leg 1541 engages the cross-bar 1584 to retain the cross-bar 1584 in the U-shaped recess 1535 *b* and an open position the enables removal of the cross-bar 1584 from the U-shaped recess. The actuator switch 1539 is biased toward the closed position by a spring 1543. The top surface of the leg 1541 has a ramped surface 1545 that acts as a cam to push the actuator switch 1539 toward the open position when the cross-bar 1584 is pressed against the ramped surface 1545, after when the spring 1543 pushes the actuator switch 1539 back toward the closed position to retain the cross-bar in the recess 1535 *b*.

The second arm portion 1538 includes longitudinal portion 1547 with a generally U-shaped cross-section 1538*a* that is telescopically received in a U-shaped underside 1549 in the first arm portion 1536. The first arm portion 1536 includes a polygonal (e.g., square) opening 1551 and the second arm portion 1538 includes an elongated slot 1553 that receives a carriage bolt 1555 with a round head 1557, a polygonal (e.g., square) intermediate portion 1559 received in the polygonal opening 1551, and a threaded shaft 1561 received in the elongated slot 1553. A washer 1562 (e.g., a spring washer such as a Belville spring) is received over the threaded shaft 1563 on an opposite side of the arm portion 1547 from the head 1557. An internally threaded knob 1563 is threaded onto the threaded shaft 1561. In use, to adjust the length of the arm assembly 1534, the knob 1563 is loosened while the carriage bolt 1555 remains stationary, allowing the second arm portion 1538 to be telescopically adjusted relative to the first arm portion 1536. Once a desired length is achieved, the knob 1563 is tightened, securing the second arm portion 1538 relative to the first arm portion 1536.

Referring also to FIGS. 70A-72, the second end portion 1537 of the second arm portion 1538 includes a U-shaped fork 1570 that is pivotably coupled to the collar assembly 1532. The fork 1570 includes first and second prongs 1572*a*, 1572*b* each including a lateral through hole 1573*a*, 1573*b*. The collar assembly 1532 includes first and second generally C-shaped concave ears 1542*a*, 1542*b* that are connected to one another by a pair of screws 1544*a* and nuts 1544*b*. Each ear 1542*a*, 1542*b* includes a downward extension 1546*a*, 1546*b* that are received between the first and second prongs 1572*a*, 1572*b* of the U-shaped fork 1570. Each downward extension 1546*a*, 1546*b* includes a lateral through hole 1543*a*, 1543*b* that are in line with the lateral through holes 1573*a*, 1573*b* on the prongs 1572*a*, 1572*b*. A threaded bolt 1574 with a square head 1574*a* is received through the lateral through holes 1573*a*, 1573*b* in the prongs 1572*a*, 1572*b* and the lateral through holes 1543*a*, 1543*b* in the downward extensions 1546*a*, 1546*b* and is capped by an internally threaded knob 1576.

In addition, at least the first downward extensions 1546*a* includes an indexing assembly including a first wear plate 1547 with a first plurality of radial ridges 1548 and a second wear plate 1578 on the first prong 1572*a* with a second plurality of radial ridges 1579, with the second wear plate 1578 facing the first wear plate 1547. The first and second wear plates 1547, 1578 facilitate angular adjustment of the collar assembly 1532 relative to the fork 1570 with the first and second radial ridges 1548, 1579 providing positive locking in a selected angular position. The wear plates and ridges also provide additional structural support to counteract a moment arm exerted by the accessory due to the center of mass of the accessory being located forward of the fork. To adjust the angular position of the collar assembly 1532 relative to the form 1570, the knob 1576 is loosened, which allows the wear plates to separate. Once the desired angular position is reached, the knob 1576 is tightened so that the ridges on the wear plates engage each other.

Similar to collar 132 described above, the C-shaped concave ears 1542*a*, 1542*b* facilitate coupling the brace 1530 to the housing 1502 of the power tool accessory 1501. As also shown in FIG. 63B, the accessory housing 1502 includes a rearward extension 1511 through which the input shaft 1503 extends for coupling the power tool accessory to a tool holder or end effector 1522 of the power tool 1510. The rearward extension 1511 includes a generally cylindrical coupling portion 1511*a* between a first flange 1511*b* and a second flange. As also shown in FIG. 63A, the concave ears 1542*a*, 1544*b* surround the coupling portion 1511*a* of the rearward extension 1511 between the first and second flanges 1511*a*, 1511*b* so that the accessory housing 1502 is axially retained while being able to rotate relative to the collar 1532. A knob 1552 with a threaded stem 1552*a* is coupled to one of the concave ears 1542*a* with the threaded stem 1552*a* extending radially inward through an aperture in the concave ear 1542*a* and capped by a threaded nut 1552*b*. The knob 1552 and the threaded stem 1552*a* can be rotated relative to the nut 1552*b* between a locked position and an unlocked position. In the locked position, the nut 1552*b* tightly engages the surface of the coupling portion 1511*a* to prevent rotation of the accessory housing 1502 relative to the collar 1532. In the unlocked position, the nut 1552*b* does not engage or only loosely engages the coupling portion 1511*a* to allow rotation of the accessory housing 1502 relative to the collar 1532. This enables the accessory housing 1502 to be rotated and locked in a plurality of different rotational positions relative to the collar 1532 and the power tool 1510 while the brace 1530 rigidly attaches the accessory 1500 to the power tool housing 1512. Thus, the accessory 1500 can be used to make cuts in a plurality of different directions without changing the orientation of the power tool 1510.

In other embodiments, the rear end 1511 of the accessory housing 1502 may include a plurality of recesses that receive the threaded stem 1550 to provide indexed rotational adjustment of the accessory housing 1502 relative to the collar 1532. The threaded stem 1550 may alternatively or additionally be replaced with a spring biased pin, ball, or detent that engages recesses in the accessory housing 1502 to provide a quick-release indexed rotational adjustment of the angular position of the accessory housing 1502 relative to the collar 1532. Other embodiments that enable indexed rotational adjustment of the accessory housing 1502 relative to the collar 1532 can be found, for example, in FIGS. 9A-16 and 35 of U.S. patent application Ser. No. 14/186,088, filed Feb. 21, 2014, which is incorporated by reference in its entirety.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. For example, in each of the above embodiments, the arm assembly may be directly coupled to the power tool housing, e.g., via a threaded fastener that screws into a threaded opening such as the opening that receives a belt clip or via a quick release fastener, such as one of the quick release assemblies described above. In this embodiment, the arm assembly may be pivotable away from the base of the power tool housing while the accessory input shaft remains received in the end effector of the power tool. These and other implementations are within the scope of this application.

What is claimed is:

1. A power tool accessory system for use with a power tool having a tool housing, an end effector that is rotatable relative to the tool housing, and a handle extending transverse from the tool housing, the power tool accessory system comprising:

a power tool accessory including an accessory housing, an input shaft at least partially received in the accessory housing and configured to be coupled to and rotatably driven by the end effector, and a working tool coupled to the accessory housing and configured to be driven to perform an operation upon rotation of the input shaft; and a brace configured to removably couple the accessory housing to the power tool and to inhibit movement of the accessory housing relative to the power tool while the input shaft rotates relative to the accessory housing, the brace including a clamp assembly configured to be fixedly coupled to a base of the handle, and an arm assembly having a first end portion configured to be coupled to the accessory housing and a second end portion configured to be removably coupled to the clamp assembly, wherein the second end portion of the arm assembly includes a connector comprising at least one of a button, a switch, or a knob that is actuatable to remove the arm assembly from the clamp assembly while the clamp assembly remains fixedly coupled to the tool housing to enable removal of the power tool accessory from the end effector.

2. The power tool accessory system of claim 1, wherein the arm assembly is configured to be removable from the clamp assembly, without the use of a secondary tool, while the clamp assembly remains fixedly coupled to the tool housing.

3. The power tool accessory system of claim 1, wherein the brace further includes a collar configured to couple the arm assembly to the accessory housing with the first end portion of the arm assembly pivotable relative to the collar.

4. The power tool accessory system of claim 3, wherein the collar is configured to allow selective rotation of the accessory housing relative to the collar while the input shaft is coupled to the end effector and the arm assembly couples the collar to the clamp assembly.

5. The power tool accessory system of claim 4, wherein the collar includes a locking element having a locked configuration in which the accessory housing is non-rotatably fixed relative to the collar and an unlocked configuration in which the accessory housing is rotatable relative to the collar.

6. The power tool accessory system of claim 3, further comprising an indexing assembly disposed between the collar and the arm assembly and configured to facilitate angular adjustment of the collar relative to the arm assembly.

7. The power tool accessory system of claim 6, wherein the indexing assembly includes a first wear plate with a first plurality of radial ridges coupled to the collar and a second wear plate with a second plurality of radial ridges configured to engage the first plurality of radial ridges.

8. The power tool accessory system of claim 1, wherein at least one of the first end portion of the arm assembly is pivotable relative to the accessory housing or the second end portion of the arm assembly is pivotable relative to the clamp assembly.

9. The power tool accessory system of claim 1, wherein the arm assembly comprises a first arm portion couplable to the accessory housing and a second arm portion couplable to the clamp assembly with one of the first arm portion and the second arm portion being telescopically adjustable relative to a remaining one of the first arm portion and the second arm portion to adjust a length of the arm assembly.

10. The power tool accessory system of claim 1, wherein the clamp assembly includes a first leg configured to face toward a first lateral side of the base, a second leg configured to face toward an opposite second lateral side of the base, and a threaded member configured to couple the first leg to the second leg such that rotation of the threaded member is configured to draw the first leg and the second leg toward one another to clamp the clamp assembly to the base.

11. The power tool accessory system of claim 10, wherein each of the first leg and the second leg is configured to extend along the base from a forward point axially forward of the handle on a same side of the handle as the end effector to a rearward point axially rearward of the handle on an opposite side of the handle from the end effector.

12. The power tool accessory system of claim 1, wherein the clamp assembly comprises a single leg configured to be coupled to one lateral side of the base by a fastener.

13. The power tool accessory system of claim 1, wherein the second end portion of the arm assembly includes a U-shaped opening configured to facilitate removal of the arm assembly from the clamp assembly while the clamp assembly remains fixedly coupled to the base.

14. A brace configured to removably and rigidly couple an accessory housing of a power tool accessory to a tool housing of a power tool, the power tool accessory having a rotatable input shaft configured to be coupled to a rotatable end effector of the power tool, the brace comprising:

a clamp assembly configured to be fixedly coupled to a base of a handle of the tool housing; and an arm assembly having a first end portion configured to be coupled to the accessory housing and a second end portion configured to be removably coupled to the clamp assembly, such that the arm assembly is at an angle to the rotatable input shaft when the arm assembly is coupled to the accessory housing and to the clamp assembly, wherein the second end portion of the arm assembly includes a connector comprising at least one of a button, a switch, or a knob that is actuatable to remove the arm assembly from the clamp assembly while the clamp assembly remains fixedly coupled to the tool housing to enable removal of the power tool accessory from the rotatable end effector.

15. The brace of claim 14, wherein the arm assembly is configured to be removable from the clamp assembly, without use of a secondary tool, while the clamp assembly remains fixedly coupled to the tool housing.

16. The brace of claim 14, wherein the brace further includes a collar configured to couple the arm assembly to the accessory housing with the first end portion of the arm assembly pivotable relative to the collar, wherein the collar is configured to allow selective rotation of the accessory housing relative to the collar while the rotatable input shaft is coupled to the rotatable end effector and the arm assembly couples the collar to the clamp assembly.

17. The brace of claim 14, wherein the arm assembly comprises a first arm portion couplable to the accessory housing and a second arm portion couplable to the clamp assembly with one of the first arm portion and the second arm portion being telescopically adjustable relative to a remaining one of the first arm portion and the second arm portion to adjust a length of the arm assembly.

18. A power tool accessory system for use with a power tool having a tool housing, an end effector that is rotatable relative to the tool housing, and a handle extending transverse from the tool housing, the power tool accessory system comprising:

a plurality of power tool accessories, each including an accessory housing, an input shaft at least partially received in the accessory housing and configured to be coupled to and rotatably driven by the end effector, and a working tool coupled to the accessory housing and configured to be driven to perform an operation upon rotation of the input shaft; and a brace configured to removably and interchangeably couple the accessory housing of each power tool accessory to the power tool while the input shaft rotates relative to the accessory housing, the brace including:

a clamp assembly configured to be fixedly coupled to a base of the handle;

a collar configured to be coupled to the accessory housing to allow selective rotation of the accessory housing relative to the collar while the input shaft is coupled to the end effector;

an arm assembly having a first end portion coupled to the collar and a second end portion configured to be removably coupled to the clamp assembly, such that the arm assembly is at an angle to the input shaft when the arm assembly is coupled to the accessory housing and to the clamp assembly, the arm assembly being telescopically adjustable to adjust a length of the arm assembly; and a connector comprising at least one of a button, a switch, or a knob that is actuatable to remove the second end portion of the arm assembly from the clamp assembly, wherein the brace is configured to rigidly couple the accessory housing of each accessory to the tool housing to inhibit movement of each accessory housing relative to the tool housing while the input shaft is being rotated by the end effector, and wherein the connector is configured to remove the arm assembly from the clamp assembly while the clamp assembly remains fixedly coupled to the tool housing.

19. The power tool accessory of claim 1, wherein the connector includes one or more of a rotatable knob, a push button, or a slidable switch.

* * * * *